(12) United States Patent
Mori

(10) Patent No.: US 7,859,709 B2
(45) Date of Patent: Dec. 28, 2010

(54) PRINT DATA GENERATION APPARATUS AND CONTROL METHOD THEREFOR, COMPUTER PROGRAM, AND STORAGE MEDIUM

(75) Inventor: Yasuo Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 943 days.

(21) Appl. No.: 11/693,303

(22) Filed: Mar. 29, 2007

(65) Prior Publication Data

US 2007/0229904 A1    Oct. 4, 2007

(30) Foreign Application Priority Data

Mar. 31, 2006  (JP) .............................. 2006-100392

(51) Int. Cl.
  G06F 15/00   (2006.01)
  G06K 1/00    (2006.01)
  G06K 15/00   (2006.01)
  G06F 3/12    (2006.01)
(52) U.S. Cl. ..................................... 358/1.18; 358/1.13
(58) Field of Classification Search .................. 358/1.1, 358/1.13, 1.14, 1.15, 1.18, 1.4, 3.27; 715/276, 715/243
See application file for complete search history.

(56) References Cited

U.S. PATENT DOCUMENTS

| 7,203,898 B2 | 4/2007 | Miyazato et al. | |
| 7,685,517 B2 * | 3/2010 | Tomita et al. | 715/276 |
| 7,788,578 B1 * | 8/2010 | Poozhiyil et al. | 715/243 |
| 2005/0243371 A1 | 11/2005 | Kanaya et al. | |
| 2005/0289460 A1 | 12/2005 | Tomita et al. | |
| 2006/0171002 A1 | 8/2006 | Mori | |

FOREIGN PATENT DOCUMENTS

JP    2003-312083    11/2003

\* cited by examiner

*Primary Examiner*—Douglas Q Tran
(74) *Attorney, Agent, or Firm*—Fitzpatrick, Cella, Harper & Scinto

(57) ABSTRACT

A print data generation apparatus that accepts a setting as to whether or not to control the position of trimming marks for document data to be printed, determines the imposition setting of the document data to be printed, and decides the position of the trimming marks on the printing paper on which the document data to be printed is placed, in accordance with the determination findings and according to the setting to perform the position control. Drawing data that represents the trimming marks is generated according to the position of the trimming marks so decided, in order to generate the print data. The drawing data that represents the trimming marks is generated such that the trimming marks are added to the trimming marks on the first sheet of the batch of sheets of printing paper, and not to the other sheets of the batch of sheets of printing paper.

24 Claims, 51 Drawing Sheets

FIG. 5A

| No | ATTRIBUTE (501) | SETTING VALUE (502) | COMMENTS (503) |
|---|---|---|---|
| 1 | PRINT METHOD | SINGLE-SIDED OR DOUBLE-SIDED | |
| 2 | PRINT PAPER SIZE | DOCUMENT SIZE, OR FIXED SIZE | • FIXED SIZE INCLUDES SUCH STANDARD PRINT PAPER SIZES AS LETTER OR A4, AS WELL AS USER-DEFINED PRINT PAPER SIZES<br>• PRINT PAPER SETTING COMBINATIONS, SUCH AS A4+A3, B4+B3, OR LETTER+11×17, ARE POSSIBLE |
| 3 | PRINT PAPER ORIENTATION | PORTRAIT OR LANDSCAPE | • AVAILABLE ONLY WITH FIXED SIZES |
| 4 | IMPOSITION METHOD | LEAFLET, SADDLE STITCH, QUARTO | • NO. OF IMPOSITIONS MAY BE SPECIFIED WHEN LEAFLET IMPOSITION IS SELECTED |
| 5 | FINISHING SIZE | SAME AS OUTPUT PRINT PAPER, OR FIXED SIZE | • FIXED SIZE IS SIMILAR TO PRINT PAPER SIZE<br>• FINISHING SIZE CAN ALSO BE AUTOMATICALLY ADJUSTED, BASED ON NO. OF IMPOSITIONS AND PRINT PAPER SIZE |
| 6 | N-up PRINT | 1×1, 2×1, 2×2, 3×3... | • DETAILED SETTING MAY BE SPECIFIED, SUCH AS PLACEMENT ORDER, BORDERS BETWEEN PAGES, AND METHOD OF PLACEMENT WITHIN A GIVEN REGION |
| 7 | BINDING ORIENTATION | REGULAR, WRAPPING, SADDLE STITCH, QUARTO | |

FIG. 5B

| | | | |
|---|---|---|---|
| 8 | ENLARGEMENT OR REDUCTION | ON, OFF | |
| 9 | HEADER AND FOOTER | | • HEADERS AND FOOTERS MAY BE SPECIFIED ON A PER DOCUMENT OR PER FINISHING SIZE BASIS |
| 10 | WATERMARK | SADDLE STITCH, QUARTO | • HEADERS AND FOOTERS MAY BE SPECIFIED ON A PER DOCUMENT OR PER FINISHING SIZE BASIS |
| 11 | FINISHING | STAPLE, Z FOLD, HOLE PUNCH | • SETTINGS ARE NOT EXCLUSIVE MULTIPLE SIMULTANEOUS SPECIFICATIONS ARE POSSIBLE |
| 12 | BINDING MARGIN | | • MAY BE SHIFTED OR REDUCED |
| 13 | FRONT AND BACK COVER | | • SPECIFIES PAPER FEED METHOD |
| 14 | INDEX PAPER | | • SPECIFIES PAPER FEED METHOD<br>MAY ALSO SPECIFY DRAWING OF TABS |
| 15 | INSERTING PAPER | | • SPECIFIES PAPER FEED METHOD<br>• SPECIFIES WHETHER OR NOT TO PRINT INSERTING PAPER |
| 16 | CHAPTER SEGMENTATION | NONE, PAGE BREAK, PRINT PAPER BREAK | • TREATS SPECIFICATION OF INDEX OR INSERTING PAPER AS PRINT PAPER CHANGE<br>• PAGE CHANGE AND PRINT PAPER CHANGE ARE IDENTICAL WHEN PRINTING SINGLE-SIDED |
| 17 | PRINTER'S MARKS, BLEED | PRINTER'S MARKS ON OR OFF, BLEED PERIMETER VALUE | |

FIG. 6

| No | ATTRIBUTE | SETTING VALUE | COMMENTS |
|---|---|---|---|
| 1 | PRINT PAPER SIZE | MANUSCRIPT SOURCE SIZE, OR INTRINSIC SIZE | • FIXED SIZE INCLUDES SUCH STANDARD PRINT PAPER SIZES AS LETTER OR A4, AS WELL AS USER-DEFINED PRINT PAPER SIZES<br>• PRINT PAPER SETTING COMBINATIONS, SUCH AS A4+A3, B4+B3, OR LETTER+11×17, ARE POSSIBLE |
| 2 | PRINT PAPER ORIENTATION | PORTRAIT OR LANDSCAPE | • AVAILABLE ONLY WITH FIXED SIZES |
| 3 | N-up PRINT | 1×1, 2×1, 2×2, 3×3... | • DETAILED SETTING MAY SPECIFIED, SUCH AS PLACEMENT ORDER, BORDERS BETWEEN PAGES, AND METHOD OF PLACEMENT WITHIN A GIVEN REGION |
| 4 | ENLARGEMENT OR REDUCTION | ON OR OFF | |
| 5 | WATERMARK | | • MAY SPECIFY WHETHER OR NOT TO DISPLAY WATERMARK SPECIFIED IN BOOK |
| 6 | HEADER AND FOOTER | | • MAY SPECIFY WHETHER OR NOT TO DISPLAY HEADER OR FOOTER SPECIFIED IN BOOK |
| 7 | FINISHING | STAPLE | • MAY BE SPECIFIED TO BE SWITCHED OFF WHEN STAPLING IS SPECIFIED IN BOOK |

| No | ATTRIBUTE | SETTING VALUE | COMMENTS |
|---|---|---|---|
| 1 | PAGE ROTATION SPECIFICATION | 0, 90, 180, OR 270 DEGREES | |
| 2 | WATERMARK | | • MAY SPECIFY WHETHER OR NOT TO DISPLAY WATERMARK SPECIFIED IN BOOK |
| 3 | HEADER AND FOOTER | | • MAY SPECIFY WHETHER OR NOT TO DISPLAY HEADER OR FOOTER SPECIFIED IN BOOK |
| 4 | ZOOM | 5 – 200% | • SET TO 100% WITH N-up OR OTHER SUCH LAYOUTS |
| 5 | PAGE PARTITIONING | | |

F I G. 19
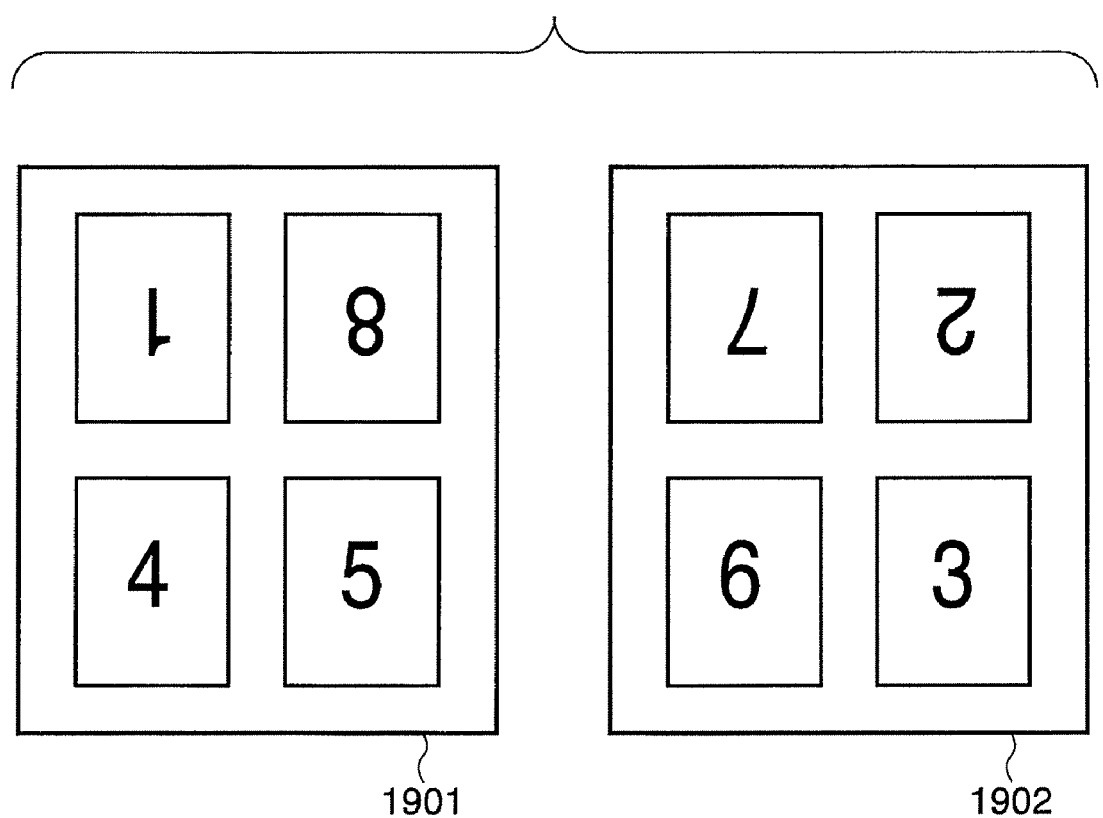

F I G. 22A
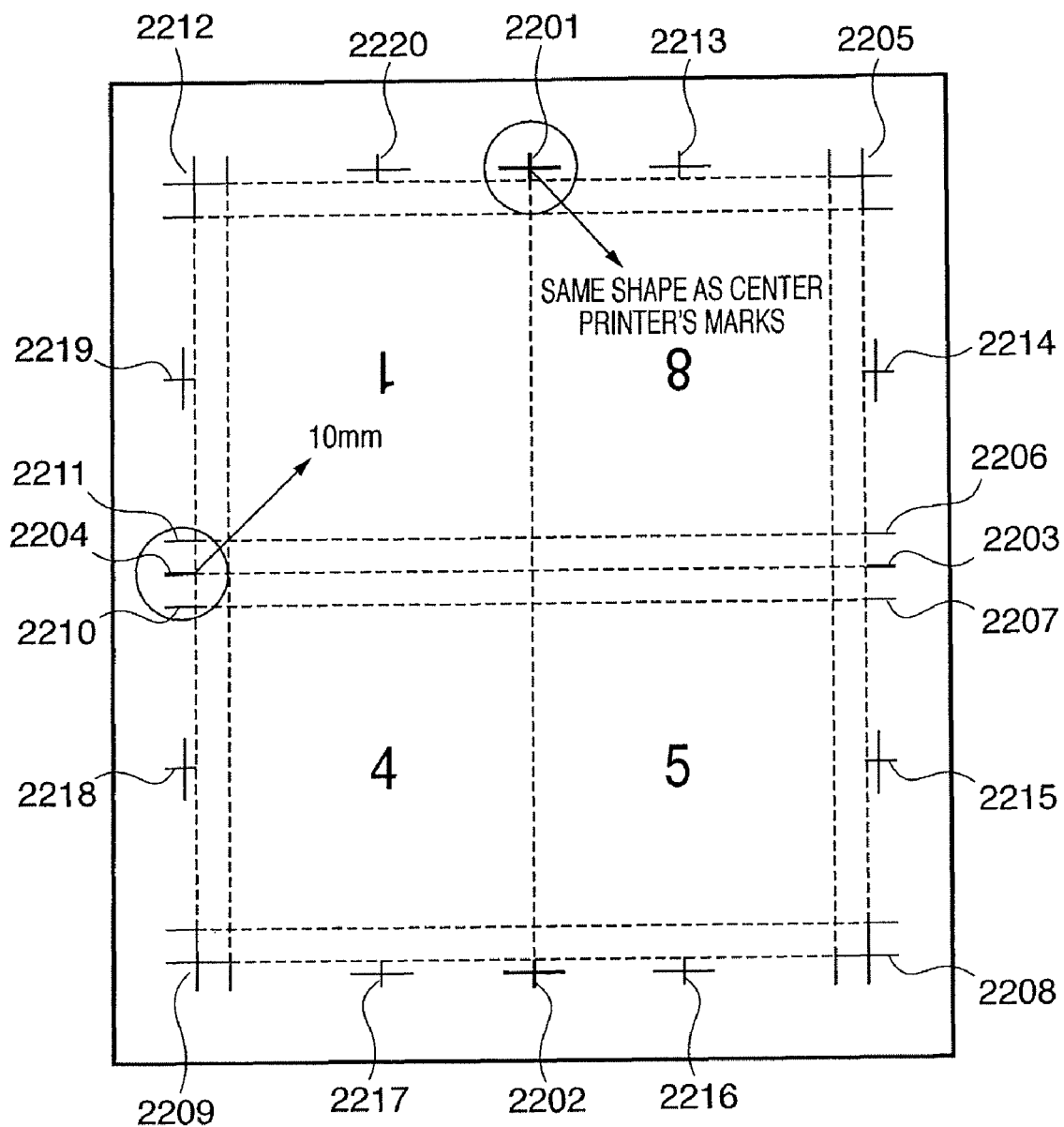

FIG. 27
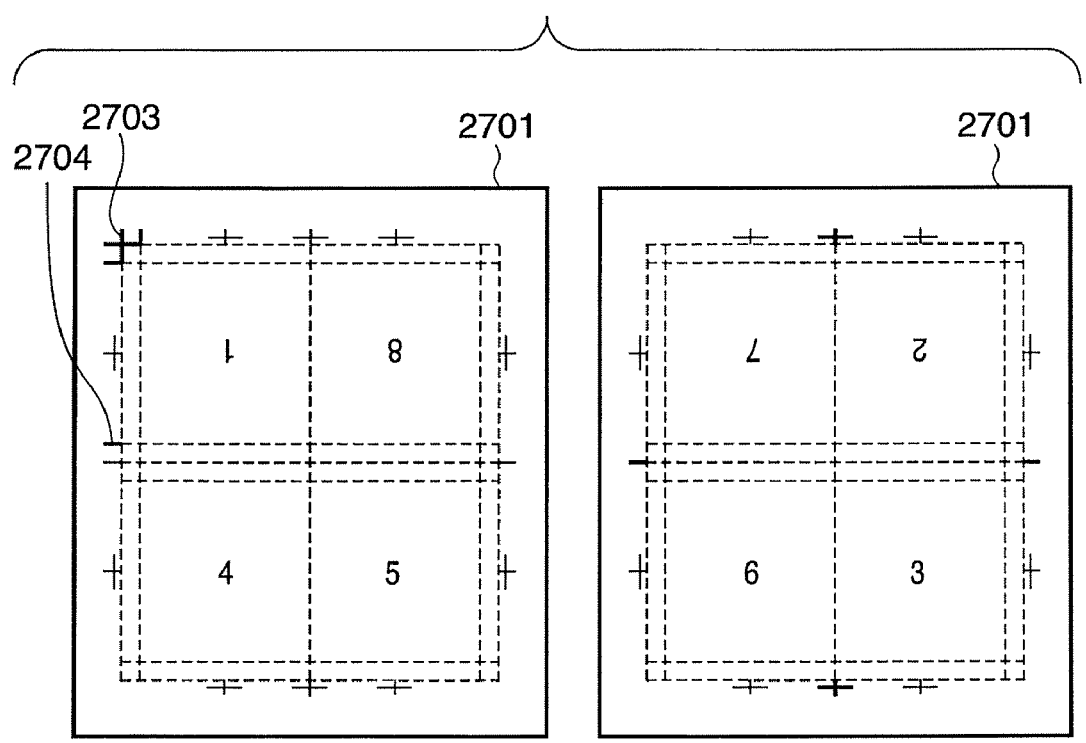
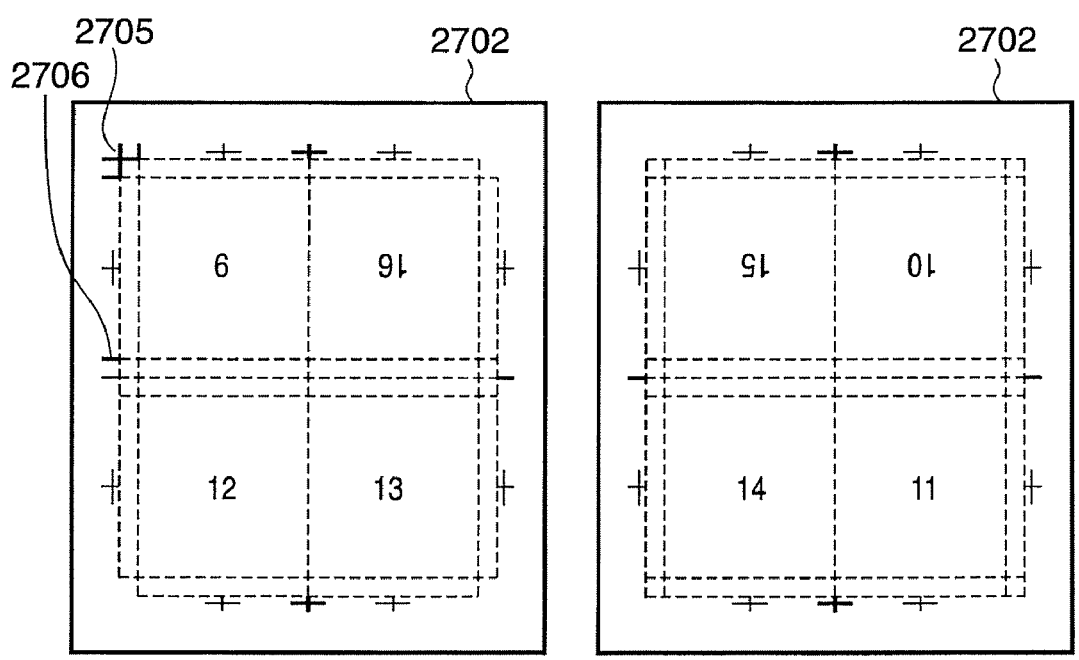

FIG. 28B

| PRINTER'S MARKS/BLEED SETTINGS | [?][X] |

TYPE (P) :  ⌐ OVERLAPPING PRINTER'S MARKS ▼

THICKNESS (B) :  ——— 0.1mm ▼

PRINTER'S MARKS
TO BE DISPLAYED (B) :  ☑ CORNER PRINTER'S MARKS
　　　　　　　　　　　☑ CENTER PRINTER'S MARKS　　2802
　　　　　　　　　　　☑ FOLD PRINTER'S MARKS

☑ APPLY CORNER PRINTER'S MARKS ONLY TO FIRST PAGE OF FOLD

TRIM MARGIN WIDTH :　　　TOP (I)　　3.0　mm
(WIDTH BETWEEN INNER
AND OUTER PRINTER'S　　　BOTTOM (O)　3.0　mm　　@
MARKS)
　　　　　　　　　　　　　EDGE (K)　　3.0　mm

☑ ASSIGN IDENTICAL VALUES TO INNER, OUTER, AND
　 EDGE TRIM MARGIN WIDTH

MILLING WIDTH (M) :　　3.0　mm

☐ ENLARGE DOCUMENT TO FIT TRIM MARGIN WIDTH

☑ INCLUDE ADDITIONAL INFORMATION　　　[ PROPERTIES ]

[ OK ]　[ CANCEL ]

FIG. 29
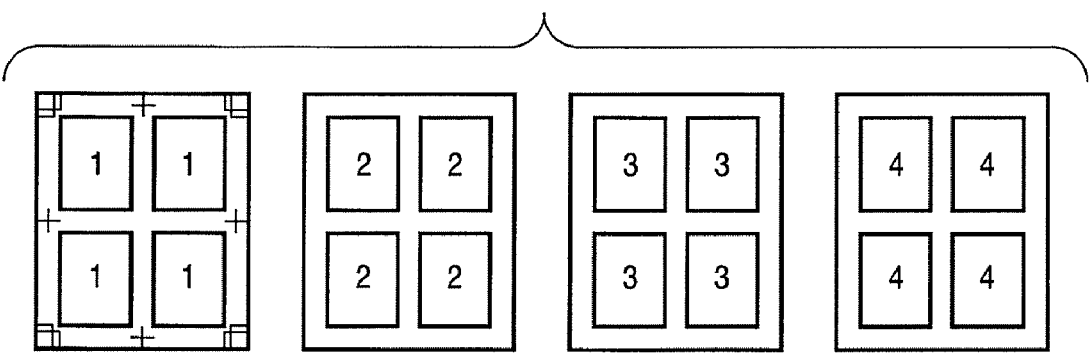
IF PRINTER'S MARKS ARE APPLIED ONLY TO THE LEAD PRINT PAGE...
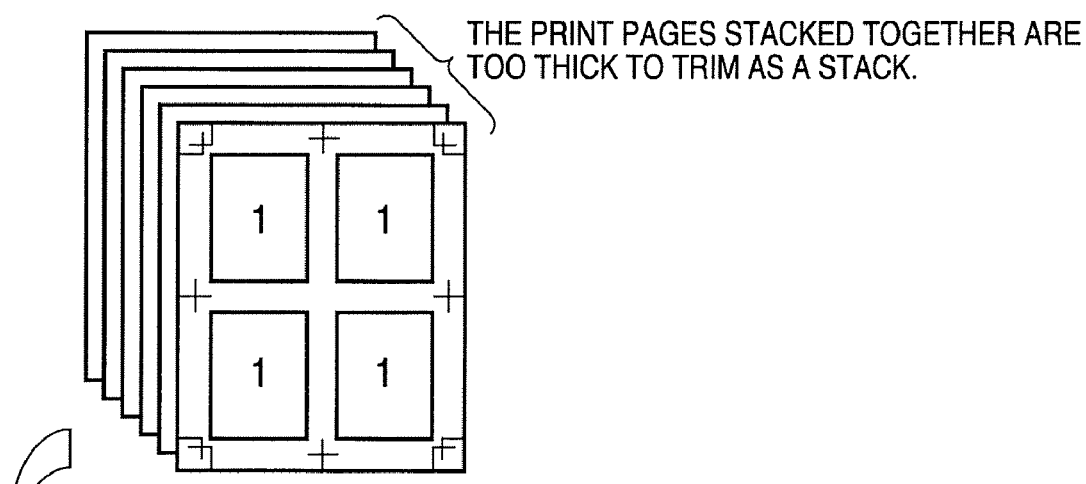
THE PRINT PAGES STACKED TOGETHER ARE TOO THICK TO TRIM AS A STACK.
IF THE STACKED PRINT PAGES ARE PARTITIONED INTO BUNDLES THAT CAN BE TRIMMED COLLECTIVELY...
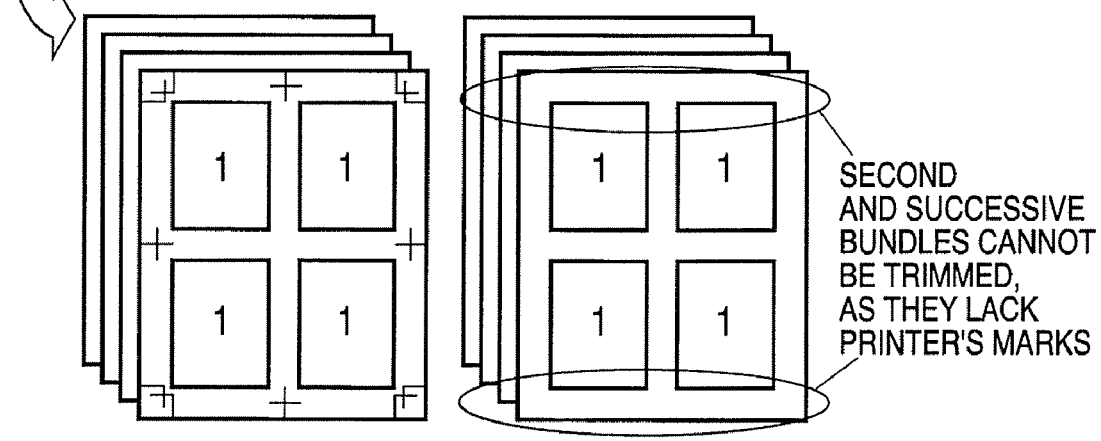
SECOND AND SUCCESSIVE BUNDLES CANNOT BE TRIMMED, AS THEY LACK PRINTER'S MARKS

FIG. 31

```
┌─────────────────────────────────────────────────────────────┐ 3100
│ PRINT                                                  ? X  │
├─────────────────────────────────────────────────────────────┤
│ PRINTER NAME (N):   [Ganon iR8500 LIPS    ▼] [PROPERTIES(P)...]│
│ ☐ SET PRINT LAYOUT TO ACCORD WITH PRINTER FUNCTION (E):     │
├─────────────────────────────────────────────────────────────┤
│ UNAVAILABLE FUNCTIONS : │ COLOR PRINTING                  │  │
│                         │                                 │  │
│                         └─────────────────────────────────┘  │
├─────────────────────────────────────────────────────────────┤
│ NO. OF COPIES (C): [ 1 ▲▼]            [MORE SETTINGS (S)...]│
│           ☑ PRINT ON PER COPY BASIS (O):   3101             │
│           ☑ SHIFT (E):                                      │
│        [1₂3][1₂3]  SHIFT PER (W): [PER ONE COPY ▲▼] (UNITS)(1~2000)│
├─────────────────────────────────────────────────────────────┤
│ ☐ VARIABLE PRINTING (V)                                     │
│    ⊙ PRINT ALL RECORDS (R)                                  │
│    ○ PRINT ONLY SPECIFIED RECORDS (S) [              ] RECORDS│
├─────────────────────────────────────────────────────────────┤
│ METHOD FOR SPECIFICATION OF PRINT REGION (T): [DOCUMENT (ALL) ▼]│
├─────────────────────────────────────────────────────────────┤
│                              [  OK  ] [ CANCEL ] [ HELP(H) ]│
└─────────────────────────────────────────────────────────────┘
```

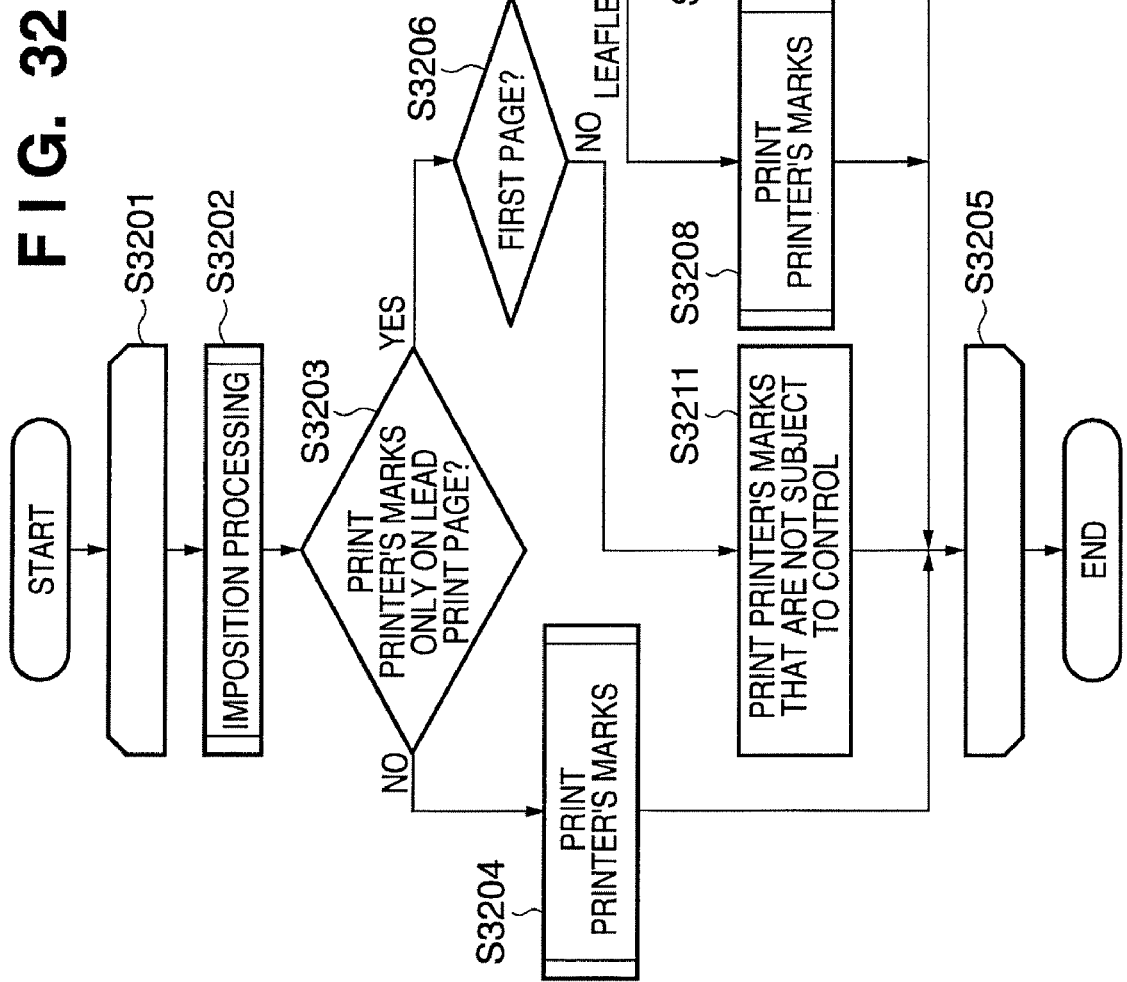

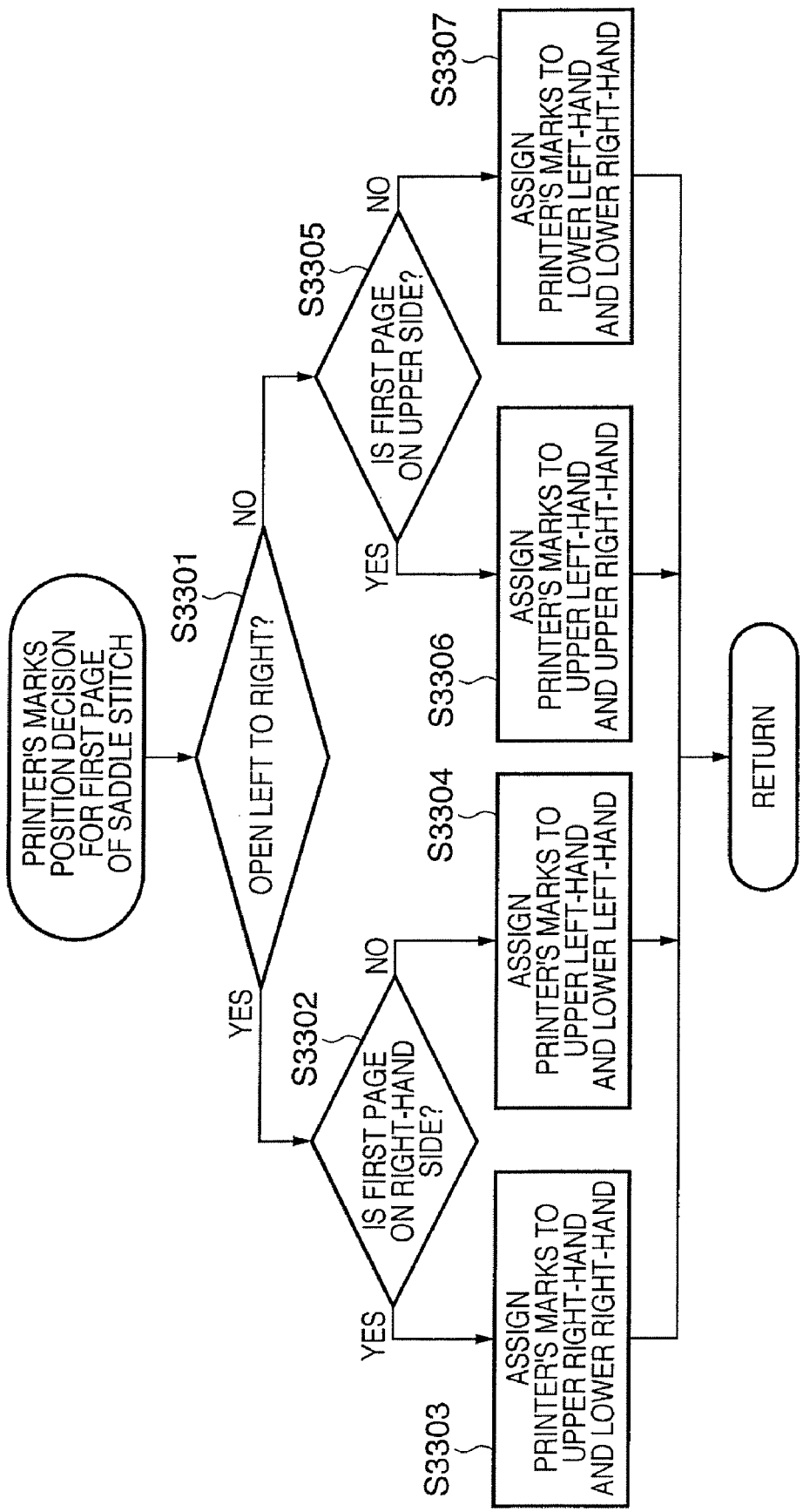

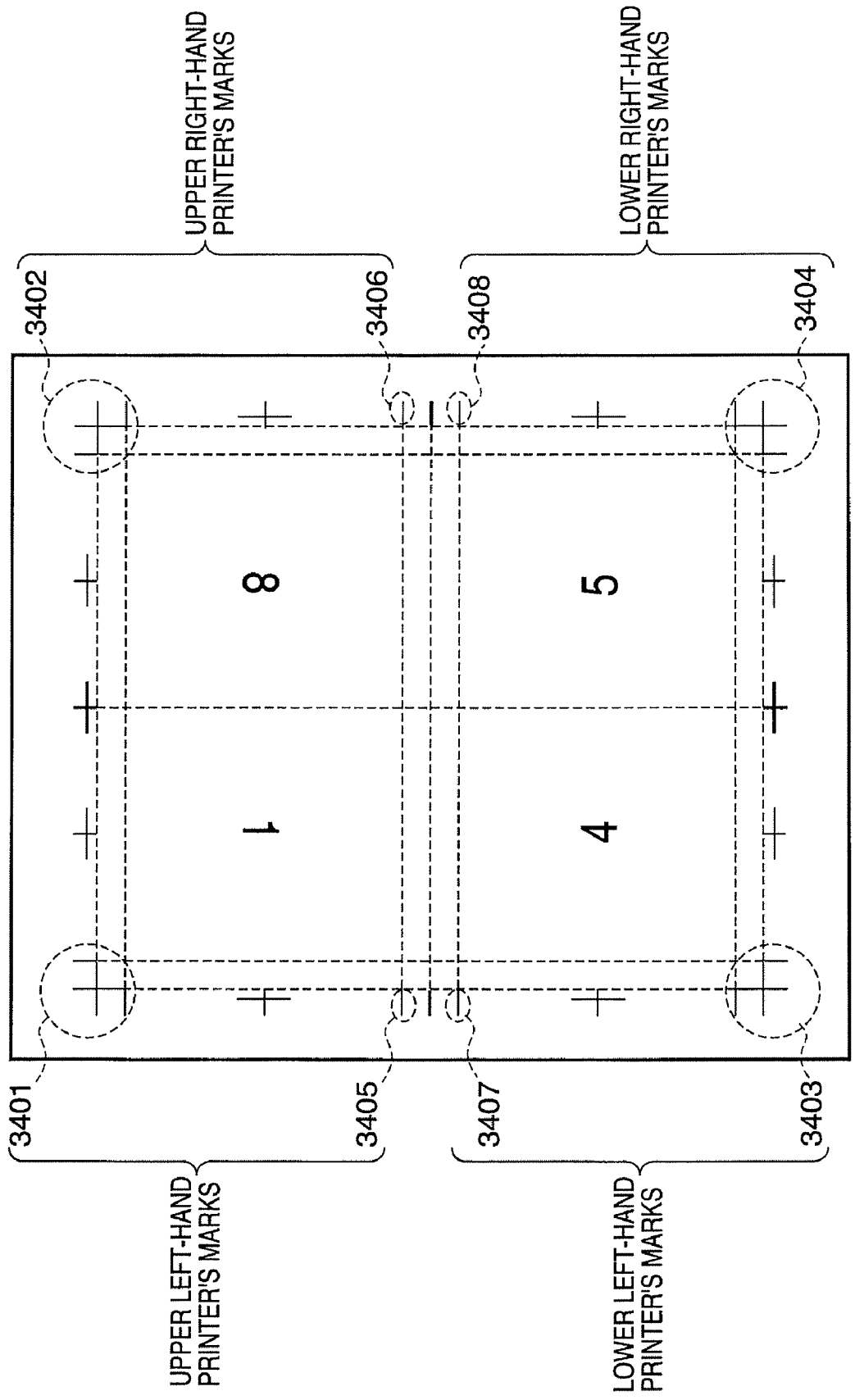

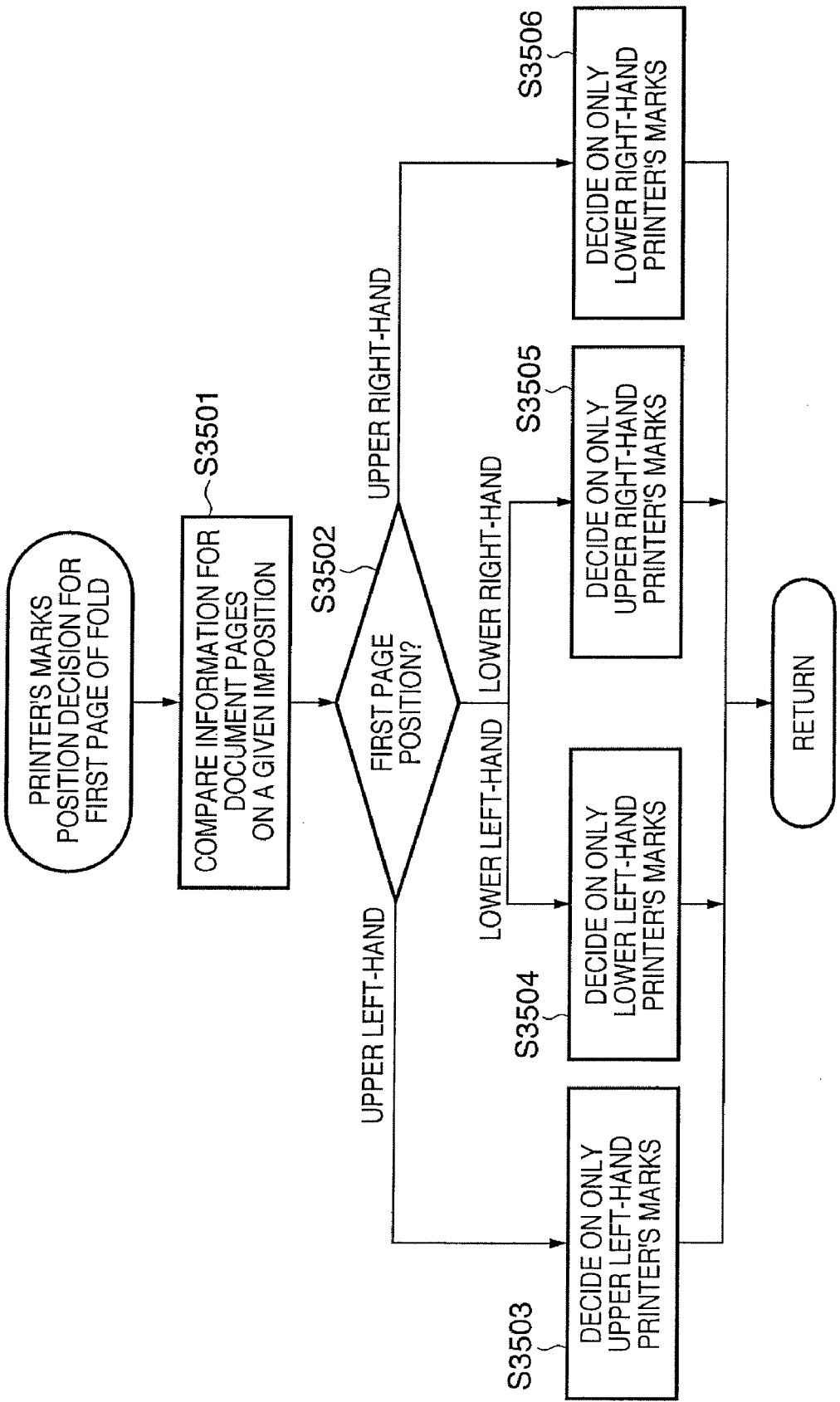

PRINT DATA GENERATION APPARATUS AND CONTROL METHOD THEREFOR, COMPUTER PROGRAM, AND STORAGE MEDIUM

BACKGROUND OF THE INVENTION

1. Field of the Invention

The present invention relates to a print data generation apparatus and control method therefor, and a storage medium.

2. Description of the Related Art

There is an imposition application, into which is input a manuscript that is in a vector format, which may include an image data or Portable Document Format (PDF), and which produces a layout suitable for printing. Such an imposition application is capable, for example, of imposing four A5 size document pages in an A3 extended printing paper, and obtaining four finished printouts from one sheet of printing paper, by trimming the printing paper. In such a circumstance, the layout is performed after the printing, in accordance with a printer's marks that are comprised in the trimming step, and which provide a guideline for the trimming.

There may also be a circumstance in which a printing page is folded down the middle and saddle stitched, making a quarto, or once more, making an octavo, rather than straightforwardly lining up the pages and trimming them, and in such a circumstance, the printer's marks are printed on three sides of the document page. Note that the term "octavo" represents giving a quarto an additional fold. It is possible to obtain a desired finish by trimming in accordance with the printer's marks; see Japanese Patent Application Laid-Open No. 2003-312083, for example.

When simultaneously trimming a plurality of printing sheets, or when fold processing a printing sheet and trimming the printing sheet on three sides, it is possible that the printing sheet may become misaligned. For this reason, the untrimmed printing sheet includes a margin in preparation to a misalignment during the trimming step. The margin is also known as a "bleed." Leaving a gap between the finished size and the printer's marks that has the width of the bleed when printing will ensure that the printer's marks are not left behind even if the printing sheet is misaligned in trimming.

As trimming involves a plurality of printing sheets stacked together and trimmed all at once, rather than trimming each individual printing sheet one at a time, it would actually be just as well to have the printer's marks on only the first printing sheet, although the printer's marks are printed in the same place on all of the printing sheets. Consequently, it is possible that the printer's marks may be left on the printed material after trimming, due to misalignment in the printing step, if the bleed is of a narrow width and the printer's marks are positioned near the finished print size.

With a process including a folding process, there may be significant misalignment resulting from a fold misalignment, in addition to off-registration during printing. Even if the trimming position is within the bleed margin, an addition of a fold misalignment heightens the possibility of a page having the printer's marks left untrimmed. Such a misalignment may occur when using an offline finisher for trimming process or folding process. The reason is that a printed material that is printed on a print apparatus is carried by hand to the offline finisher and positioned such that the trimming step or the folding step may be performed.

Accordingly, the conventional addition of the printer's marks, either to all printed pages, or to all of the printed pages for which folding processing is necessitated, raises a risk of the printer's marks remaining within the printed material after trimming, due to a misalignment in the trimming step or the folding step.

SUMMARY OF THE INVENTION

The objective of the present invention is to provide techniques to determine a sheet or page to be used in a trimming step, and to print the sheet or page so determined with printer's marks for trimming.

One aspect of the present invention according to a plurality of embodiments relates to a print data generation apparatus, comprising, an acceptance unit adapted to accepting a setting as to whether or not to perform a position control of a trimming mark for a document data to be printed; a determination unit adapted to determining a type of imposition setting of the document data to be printed; a decision unit adapted to deciding a position of the trimming mark for a sheet of printing paper upon which is placed the document data to be printed, in accordance with a determination result from the determination unit, when accepting the setting to perform the position control; a first generation unit adapted to generating a drawing data that represents the trimming mark in order to generate a print data according to the position of the trimming mark that is decided by the decision unit; and a second generation unit adapted to generating the print data from the document data and the drawing data, wherein the first generation unit generates the drawing data that represents the trimming mark such that the trimming mark is added to a front sheet of printing paper of a batch of sheets of printing paper to be trimmed except for other sheets of printing paper.

Further features of the present invention will become apparent from the following description of exemplary embodiments (with reference to the attached drawings).

BRIEF DESCRIPTION OF THE DRAWINGS

FIGS. 5A and 5B depict an example of a book setting information according to the embodiment of the present invention.

FIG. 6 depicts an example of a chapter setting information according to the embodiment of the present invention.

FIG. 7 depicts an example of a page setting information according to the embodiment of the present invention.

FIG. 19 depicts an example of imposition.

FIGS. 22A and 22B depict examples of printing the printer's marks on a sheet of printing paper with a quarto imposition.

FIG. 27 depicts an example of printing the printer's marks on a sheet of printing paper with a quarto book binding imposition, according to the embodiment of the present invention.

FIG. 28A and FIG. 28B depict examples of a graphical user interface (GUI) according to the embodiment of the present invention.

FIG. 29 describes problems regarding printing the printer's marks on only a single sheet of printing paper, according to the embodiment of the present invention.

FIG. 31 depicts an example of a graphical user interface (GUI) for performing an output setting shown in FIG. 30, according to the embodiment of the present invention.

FIG. 32 is a flowchart depicting an example of a process of determining a position for printing the printer's marks, according to the embodiment of the present invention.

FIG. 33A is a flowchart depicting an example of a process of determining a position of printing the printer's marks for a saddle stitched first page, in step S3209 of FIG. 32, according to the embodiment of the present invention.

FIG. 34B provides a supplemental description to the flowchart shown in FIG. 33A.

FIG. 35 is a flowchart depicting another example of a process of determining a position of printing the printer's marks for a folded first page in step S3210 of FIG. 32.

DESCRIPTION OF THE EMBODIMENTS

Following is a description of preferred embodiments of the present invention, with reference to the attached drawings.

First Embodiment

Following is a description of an overview of a document processing system that is the first embodiment of the present invention, with reference to FIGS. 1 through 13. The document processing system uses an electronic document writer to convert a data file that is created by a general application into an electronic document file. A book binding application offers a function that edits the electronic document file. The present example depicts the general application, the electronic document writer, the book binding application, and an electronic document de-spooler as separate from one another. The package that is offered to a user is not limited thereto, however, and may be offered as an application or a graphics engine that combines the components. Following is a detailed description thereof.

SOFTWARE CONFIGURATION EXAMPLE

Figure 1:
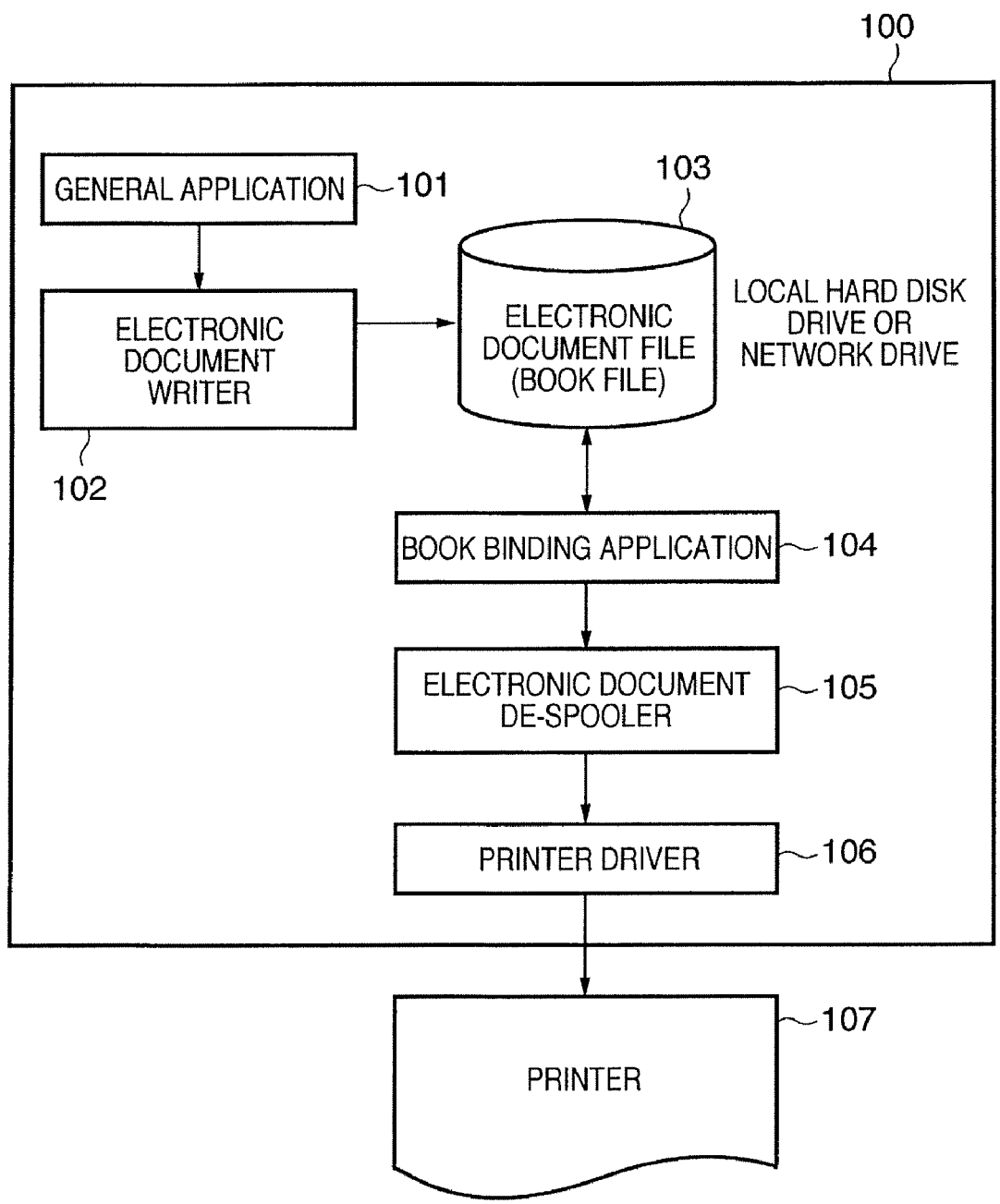
FIG. 1 is a block diagram depicting an example of a software configuration of a document processing system according to the embodiment of the present invention.

FIG. 1 depicts a software configuration of the document processing system according to the embodiment. The document processing system is achieved by a digital computer 100 (the host computer) that is a preferred embodiment of a document processing apparatus, i.e., an information processing apparatus, of the present invention. A general application 101 is an application program that offers a function that may include word processing, spreadsheet, photo retouching, drawing, painting, presentation, or text editing, and possesses a print function for an operating system.

The applications use a predetermined interface (GDI) offered by the operating system (OS) for printing application data that may include a document data or an image data that is created by the applications. In such a circumstance, the application 101 transmits a pre-configured output command (a GDI function) in an OS-dependent format, to an output module of the OS that provides the interface, in order to print the data created by the application. Upon receipt of the output command, the output module converts the command into a format that is capable of being processed by an output device that may include a printer, and outputs the converted command, or a DDI function.

The format that is capable of being processed by the output device varies by a factor that may include a type, a manufacturer, or a model of the device. A device driver is provided on a per device basis, and a print job is generated by the OS, which uses the device driver to perform the command conversion, generate the print data, and outline the print data in a job language (JL). A module called a Graphic Device Interface (GDI) qualifies when using the Microsoft Windows OS.

The electronic document writer 102 is a refinement of the device driver, a software module that is offered to achieve the document processing system. The electronic document writer 102, however, converts the output command into a format capable of being processed by the book binding application 104 or a printer driver 106, without a particular output device as an objective. The post-conversion format from the electronic document writer 102 (the electronic document format) may be of any format that is capable of detailed drawing of a paginated document. Such de facto standard formats as Portable Document Format (PDF), from Adobe Systems, or Scalable Vector Graphics (SVG), an open format published by the W3C, may be used as the electronic document format.

When using the electronic document writer 102 from the application 101, printing is executed subsequent to designating the electronic document writer 102 as the device driver to be used for output. An electronic document file that is created directly by the electronic document writer 102 does not fully comprise the electronic document format, however. Consequently, the book binding application 104 designates the electronic document writer 102 as the device driver, and the conversion of the application data to the electronic document file is executed under the administration of the book binding application 104, which makes the incomplete electronic document file that is newly generated by the electronic document writer 102 into a complete electronic document file that comprises a format to be described hereinafter.

Hereinafter, the file that is generated by the electronic document writer 102 will be referred to as the electronic document file, and the electronic document file to which the book binding application has applied the structure will be referred to as a book file, when necessary to clearly differentiate between the two. The document file, the electronic document file, and the book file will all be referred to as a text file, or a text data, when no particular necessity for differentiation exists.

Thus, the electronic document writer 102 is designated as the device driver, and the data is printed by the general application 101. Hence, the application data is converted into the electronic document file format in a page unit defined by the application 101, i.e., a logical page or a manuscript source page. The converted data is then stored as the electronic document file in a storage medium, which may include a hard drive. It is permissible for the hard drive to be a local drive that is comprised by the computer that fulfills the document processing system according to the embodiment, as well as a drive that is offered over a network, when it is connected to the network.

The book binding application 104 offers the user functions for reading and editing the electronic document file or the book file 103. The book binding application 104 does not, however, offer functions for editing content on a per page basis; rather, it offers functions for editing a chapter or a book structure, wherein the page is constituted as the smallest unit thereof.

When printing the book file 103, which has been edited by the book binding application 104, the electronic document de-spooler 105 is launched by the book binding application 104. That is to say, the book binding application 104 functions as an agency for generating the print data.

The electronic document de-spooler 105 is a program module that is used for outputting a drawing data to the printer driver, when printing a document, i.e., a book file, that is used in the book binding application. The electronic document de-spooler 105 is installed on the computer together with the book binding application. The electronic document de-spooler 105 reads the designated book file from the hard drive, generates the output command that conforms to the operating system output module in order to print out each respective page in the format that is described in the book file, and outputs the output command to the output module (not shown). The printer driver 106, of a printer 107 that is used as the output device, is designated as the device driver during such a process. The output module converts the output command that is received using the printer driver 106 of the designated printer 107 into the device command that the printer 107 is capable of interpreting and executing. The device command is transmitted to the printer 107, which prints the image in accordance with the command.

Hardware Configuration

Figure 2:
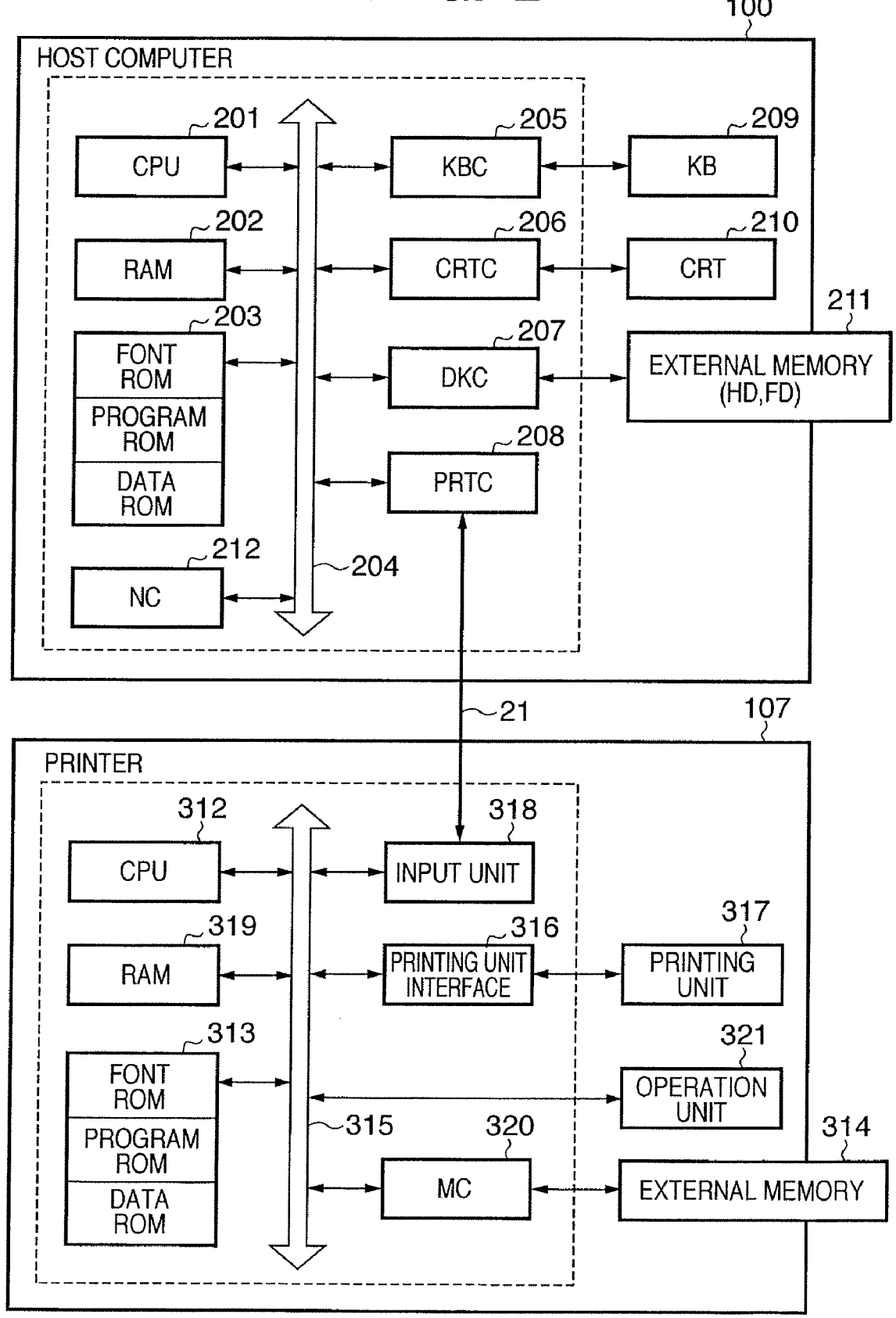
FIG. 2 is a block diagram depicting an example of a hardware configuration of a document processing system according to the embodiment of the present invention.

FIG. 2 depicts a hardware configuration of a document processing system according to the embodiment. In FIG. 2, the host computer 100 comprises a CPU 201 that executes processing of a document that mixes a diagram, a graphical image, text, or a table, including such tables as spreadsheets, or other data, in accordance with a document processing program that is stored in either a program ROM within a ROM 203 or an external memory 211. The CPU 201 universally controls each respective device that is connected via a system bus 204.

The program ROM within the ROM 203 or the external memory 211 stores an operating system program that is a control program of the CPU 201, a font ROM within the ROM 203 or the external memory 211 stores a font data that is used in the document processing, and a data ROM within the RON 203 or the external memory 211 stores each respective type of data that is used in the document processing or other operation. A RAM 202 has functions for the CPU 201 that may include a main memory or a work area therefor.

A keyboard controller 205 controls a key input from a keyboard 209 or a pointer device (not shown). A CRT controller 206 controls a display of a CRT display (CRT) 210. No. 207 is a disk controller, which controls access to the external memory 211, which may include the hard drive or a floppy drive, and which stores code that may include a boot program, all types of applications, the font data, a user file, an edit file, or a program that generates printer control commands, i.e., the printer driver. A printer controller 208 is connected to the printer 107 via a bi-directional interface 21, and which executes processing of control of communications with the printer 107. A network controller 212 is connected to a network, and executes processing of control of communications with other hardware that is also connected to the network.

The CPU 201 executes, for example, a process that rasterizes an outline font in a display information RAM that is configured within the RAM 202, which facilities WYSIWYG on the CRT 210. The CPU 201 opens a variety of types of registered windows on the CRT 210, in accordance with a command that is specified by a mouse cursor or other device (not shown), and executes a variety of types of data processing. When the user executes a printing, a window concerning a print setting is opened, allowing the user to perform a printer setting or a setting of a print processing method for the printer driver, including selection of a print mode.

The printer 107 is controlled by a CPU 312. The CPU 312 outputs an image signal as an output information to a printing unit (print engine) 317 connected to a system bus 315 via printing unit interface 316, in accordance with a control program that is stored in a program ROM in a ROM 313 or with a control program that is stored in an external memory 314. The program ROM in the ROM 313 stores a control program of the CPU 312. A font ROM within the ROM 313 stores a font data that is used when generating the output information, and a data ROM within the ROM 313 stores an information that is used on the host computer, if there is no hard drive or other external memory 314.

The CPU 312 is capable of processing communication with the host computer via an input unit 318, and notifies the host computer 100 of the printer information. A RAM 319 has functions for the CPU 312 that may include a main memory or a work area therefor, and is constituted to be capable of having its memory capacity expanded by an optional RAM that is connected to an expansion port (not shown). The RAM 319 is primarily used as an output information processing area, a framework data storage area, or an NVRAM, though it is not limited to these. An access to the external memory 314, which may include a hard drive or an IC card, is controlled by a memory controller 20. The external memory 314 is optionally connected, and what it stores may include the font data, an emulation program, or a form data. No. 321 is the operating panel, and attached thereto may include a switch for operating or an LED display device.

The external memory 314 is not limited to a single unit, and may comprise a plurality of memory units, which may be constituted so as to have a plurality of connections to the external memory, which may contain an expansion card in addition to an internal font, and which stores a program that interprets a different printer control language. It may also possess an NVRAM (not shown), which stores a printer mode setting information from the operating panel 321.

Electronic Document Data Format Example

Following is a description of the book file data format, prior to a detailed description of the book binding application 104.

Figure 3:
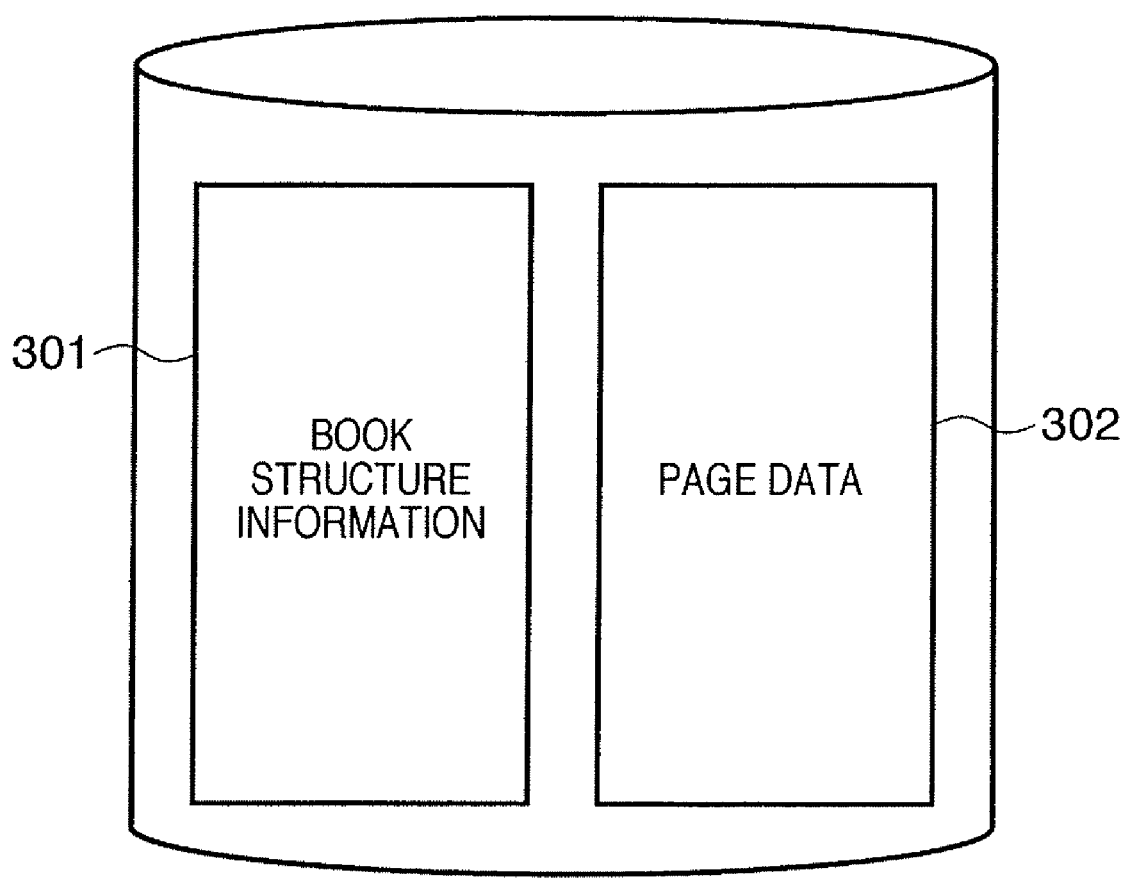
FIG. 3 is a conceptual diagram depicting an example of a book file structure according to the embodiment of the present invention.

FIG. 3 describes a book file structure that is broadly classified as a book structure information 301 and a page data 302. The page data 302 is an area that pools a plurality of pages that are contained within the book file. The book structure information 301 maintains a structure of each respective page as a unit.

Figure 4:
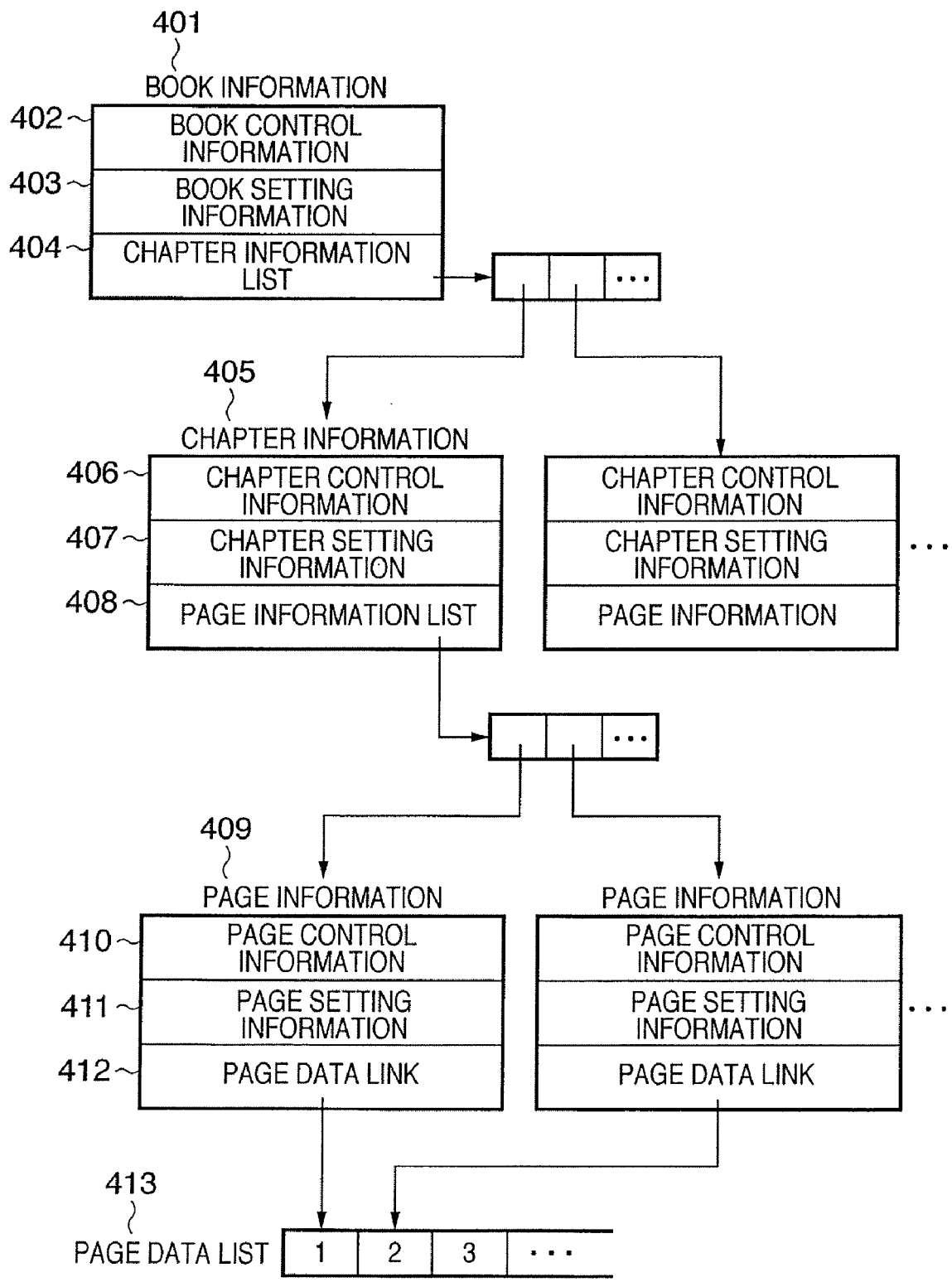
FIG. 4 depicts an example of a book structure information 301 according to the embodiment of the present invention.

FIG. 4 depicts an example of the book structure information 301. The example possesses a tri-layered hierarchical structure that models a paper medium publication. An upper layer, which is referred to as a book, models a single book, and an attribute of which, pertaining to the document overall, is defined. A middle layer thereunder corresponds to a chapter within the book, and is appropriately referred to as a chapter. It is possible to define an attribute for each respective chapter as well. A lower layer is a page, which corresponds to each respective page that is defined in the application program. It is possible to define an attribute for each respective page as well. It is permissible for a single book to contain a plurality of chapters, and a single chapter may contain a plurality of pages.

In the example book file, the book, the chapter, and the page are depicted by a respective node corresponding thereto. A single book file contains a single book. Given that the book and the chapter are a concept for defining a structure of a book, they include the defined attribute value, an actual lower layer, and a link thereto. The page possesses an actual data on a per page basis that is outputted by the application program. Consequently, the page contains both an actual document page, i.e., an electronic document page data, and a link to each respective electronic document page data, in addition to the attribute value of the page. A printed page upon output to a paper medium or other medium may contain a plurality of electronic document pages. Such a structure is displayed as the attribute of each respective book and chapter layer, and is not displayed as the link.

First is a book information 401, at the topmost layer, and which may be broadly divided into three parts, 402 through 404. A book control information 402 maintains information that may include a pathname to a document file in filesystem. A book setting information 403 maintains a layout information, which may include a page layout, and a function setting information of a printing apparatus, which may include stapling, and which corresponds to the attribute of the book. A chapter information list 404 maintains an aggregate of the chapter that constitute the document, in a list format. The list maintains a chapter information 405.

A chapter information 405 may also be broadly divided into three parts, 406 through 408. A chapter control information 406 maintains information that may include a chapter name. A chapter setting information 407 maintains a layout information, which may include a page layout, and a function setting information of a printing apparatus, which may include stapling, and which corresponds to the attribute of the chapter. As each respective chapter possesses the chapter setting information 407, it is possible to create a document that possesses a complex layout, such as a first chapter having a 2-up layout and another chapter having a 4-up layout. A page information list 408 maintains an aggregate of the page that constitute each respective chapter, in a list format. The page information list 408 maintains a page information data 409.

A page information 409 may also be broadly divided into three parts, 410 through 412. A page control information 410 maintains information that may include a number that displays a page in a tree. A page setting information 411 maintains an information, which may include a page rotation or a page placement position information, and which corresponds to the attribute of the manuscript source page. A page link information 412 is the manuscript source data that corresponds to the page. The example presumes a structure wherein the page information 409 only holds a link information 412, rather than directly possessing the manuscript source data, and the actual manuscript source data is maintained in a page data list 413.

FIGS. 5A and 5B are lists that depict an example of a book attribute, i.e., the book setting information 403. Typically, when an item overlaps with the lower layer, i.e., the chapter or the page, in its possible definition, priority is given to the attribute of the lower layer. Consequently, with an item that is only included in the book attribute, a value that is defined in the book attribute is effective throughout the entire book. The item that overlaps with the lower layer, however, takes on the meaning of a pre-existing value, when the item is not defined in the lower layer. According to the embodiment, however, it is possible to choose whether or not to give priority to the value of the attribute in the lower layer. Note that the items depicted in FIGS. 5A and 5B specifically include a plurality of related items, rather than corresponding to a single respective item.

The book attribute is constituted of an attribute item 501, a setting value 502, and comments 503. According to the embodiment, there are 10 intrinsic book attribute items 501, a print method, an imposition type, a finishing size, a binding type, a binding margin, a front or a back cover, an index paper, an inserting paper, a chapter segmentation, and the printer's marks and bleed. The intrinsic book attribute items are defined throughout the book.

There are two values that may be assigned as the print method: single-sided printing and double-sided printing.

There are three values that may be assigned as the imposition type: leaflet, saddle stitch, and quarto. Leaflet is an imposition type that may be bound in finishing without folding the printout pages. Saddle stitch is an imposition type wherein a quantity of printout pages is bundled together and folded in two, and a layout is performed that fits a format that allows book binding by combining the bundles together. It is possible to specify an even more precise attribute with saddle stitch (not shown) that may include direction of spread or number of pages that constitute a bundle. Quarto is an imposition type wherein a printout page is folded once horizontally and once vertically, so as to form a four-part, or quarto, fold, with a layout performed that fits a format that allows book binding by trimming a fold of the printout page. Quarto has a precise attribute that may include a right edge head fold and a right edge left fold, in response to the position of the fold and the binding orientation.

Finishing size is a specification of the size to which the printout paper is to be trimmed, when trimming the printout to create a plurality of pages. A typical example is an imposition format of making an A3 extended size printout into two A4 finishing size documents. Binding type may be regular, wrapping, i.e., wrapping binding, saddle stitch, or quarto. Binding margin contains a specification of adding a binding margin when printing the manuscript source file that is compiled as the book. A value of the binding margin may be shifted or reduced a size of which. In the present circumstance, wrapping, i.e., wrapping binding, is a binding format that that allows wrapping binding to be performed by either an inline finisher or an offline finisher. Wrapping binding involves pasting a printed interior paper at the stitching position, binding the interior paper by wrapping thereof with a wrapping cover, and trimming thereof on three sides as necessary. Quarto is an imposition type wherein an output printout page is folded into four pages, bundled, and an adhesive binding is possible. Adhesive binding is achieved by trimming on either three or four sides on the part of the offline finisher.

The front or the back cover contains a specification to add a printout sheet that will constitute the front or the back cover, as well as a specification of a content to be printed on the printout sheet in question, when printing the manuscript source file that is compiled as the book. The index attribute contains a specification of inserting an index sheet that is prepared separately on the print apparatus as the chapter segmentation, as well as a specification of the print content of the index portion. The attribute applies a) when comprising a printer apparatus that uses an inserter with an insert function that inserts a print paper that is set aside from the printout pages at a prescribed position, or b) when it is possible to use a plurality of paper feed cartridges. The same applies to the paper insert attribute.

The paper insert attribute may contain a specification that includes inserting a print paper that is provided either by the inserter or the paper feed cassette as the chapter segmentation, as well as a paper feed source specification, when performing the paper insert.

The chapter segmentation may contain a specification that includes using a new print sheet, using a new print page, or doing nothing in particular, at a chapter break. Specifying using the new print sheet and using the new print page mean the same thing when performing single-sided printing. Whereas specifying using the new print sheet when performing double-sided printing avoids printing of sequential chapters on a single print sheet, specifying using the new print page may potentially result in printing sequential chapters on both sides of a single print sheet.

The printer's marks/bleed attribute is for specifying the printing of the printer's marks, as well as the bleed, i.e., a trim area, on the printout page, when printing the electronic document file. A bleed area, i.e., a trim area width, may be assigned to each edge of the finished page, signifying the width of the area to be removed when trimming the printout page. The printer's marks, i.e., a mark of a trimming position, is a mark that indicates a position when the user uses the offline finisher to perform the trim.

FIG. 6 is a list that depicts an example of a chapter attribute, i.e, the chapter setting information 407, and FIG. 7 is a list that depicts an example of a page attribute, i.e, the page setting information 411. The relation between the chapter attribute and the page attribute is the same as the relation between the book attribute and the lower layer attribute.

The chapter attribute all overlap with the book attribute, i.e., the chapter has no intrinsic attribute. Accordingly, if the definition of the chapter attribute differs from the definition of the book attribute, priority is normally given to the value that is defined for the chapter attribute. In the present example, however, it is possible to choose whether or not to give priority to the value of the attribute in the lower layer.

In FIG. 6, there are five items that are shared only by the book attribute and the chapter attribute match: the print paper size, a print paper orientation, an N-up print specification, an enlargement or a reduction, and a discharge method (finishing). Of the items, the print paper size indicates the size of the printout page, and it is possible to change the print paper size on a per chapter basis if wrapping binding or a folio binding, which corresponds to the book binding printing, has not been selected. The print paper orientation indicates whether the print paper is in a portait, i.e., a vertical, orientation, or a landscape, i.e., a horizontal, view.

The N-up print specification is for specifying a number of manuscript source pages to be included in a single printed page. An arrangement that may be specified may include 1×1, 1×2, 2×2, 3×3, and 4×4. If the enlargement or reduction attribute is set, it signifies that the inputted manuscript source page is enlarged or reduced to fit the outputted print sheet size. The discharging method (finishing) is for specifying whether or not to perform a stapling process on the discharged print sheet, and the applicability of the attribute depends on whether or not the print apparatus being used possesses a stapling feature.

In FIG. 7, an intrinsic page attribute may include a page rotation specification, a zoom, and a page partitioning. The page rotation specification is for specifying an angle of rotation when positioning the manuscript source page on the printout page. The zoom is for specifying a magnification rate of the manuscript source page. The magnification rate is specified as 100% of a size of a logical page area, which is the area that one manuscript source page occupies when positioned in response to the N-up or other specification. For example, with the 1×1 specification, the logical page area corresponds to one printout page, while with the 1×2 specification, the logical page area for one printout page is reduced to approximately 70% on each edge.

The book, the chapter, and the page have a watermark and a header and footer attribute in common. The watermark is an image, a text sequence, or other data that is specified separately, and is printed together with the data that is created in the application. The header and footer is a watermark that is printed in a whitespace at a top and a bottom of each individual page. An item that may be specified by a variable, which may include a page number, a date, or a timestamp, are, however, set aside within the header and the footer.

Whereas a content that may be specified as the respective attribute of the watermark and the header and the footer is shared between the chapter and the page, the book differs. It is possible to configure the watermark and the header and the footer content at the book level, and it is possible to specify how to print the watermark and the header and the footer throughout the book as a whole. It is also possible, on the other hand, to specify whether or not to print the watermark and the header and the footer that have been configured at the book level in a given chapter or page.

Document Processing System Operating Sequence Example

Book File Generation Sequence Example

The book file possesses the structure and the content such as the foregoing. Following is a description of a sequence of generating the book file via the book binding application 104 and the electronic document writer 102. The creation of the book file is achieved as a part of an editing operation of the book file via the book binding application 104.

Figure 8:
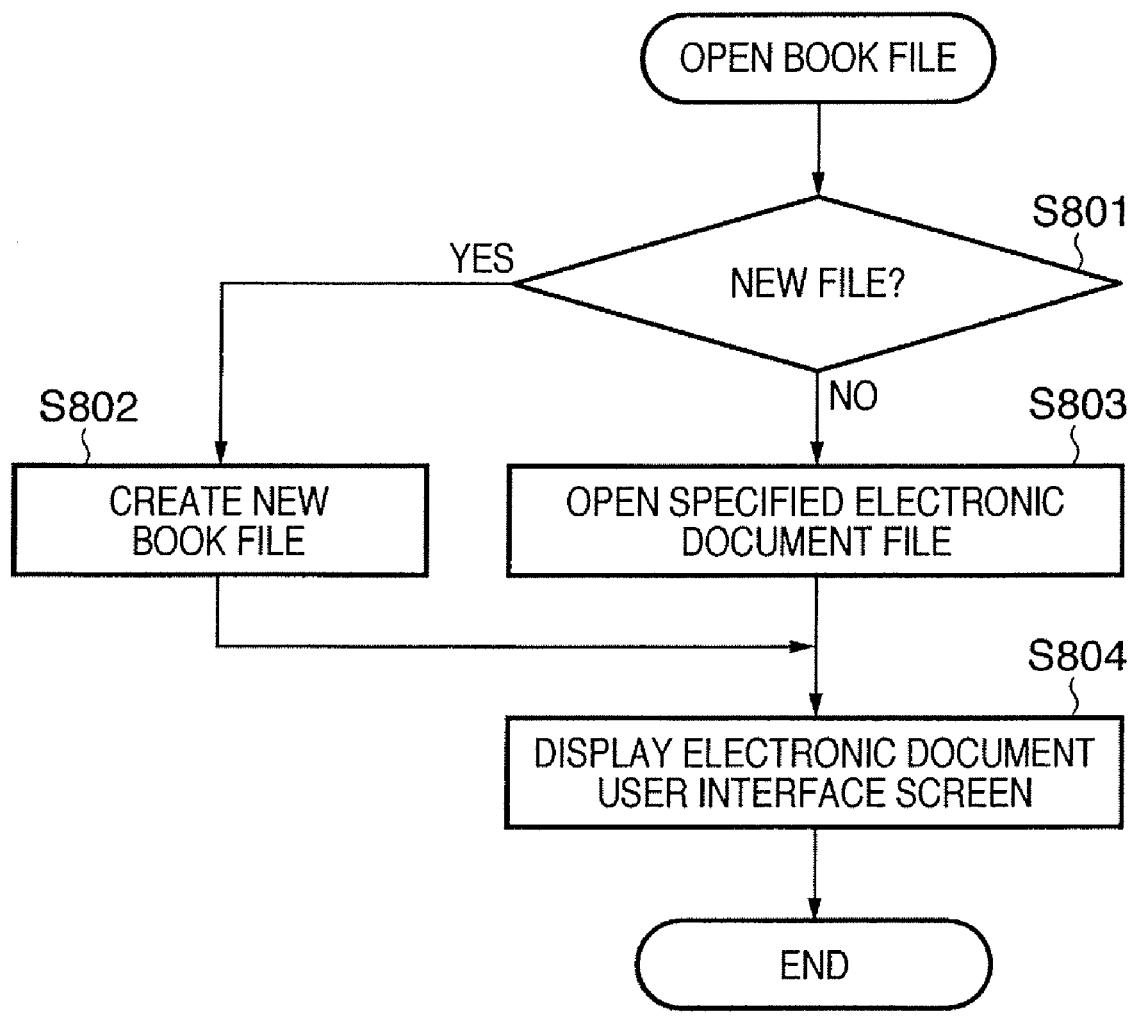
FIG. 8 is a flowchart depicting an example of a sequence of opening a book file according to the embodiment of the present invention.

FIG. 8 is a flowchart depicting a sequence when opening the book file by way of the book binding application 104.

A determination is made in step S801 as to whether the book file to be opened should be created as a new file, or is an existing file. If the book file to be opened should be created as a new file, a new file is created, without a chapter, in step S802. If depicted in the example of FIG. 4, the newly created book file possesses only the book information 401, being a book node with no link to a chapter node. A newly generated attribute set is applied to the book attribute, i.e., the book setting information 403, for the creation of the new file. Finally, a user interface screen for editing the new book file is displayed in step S804.

Figure 9:
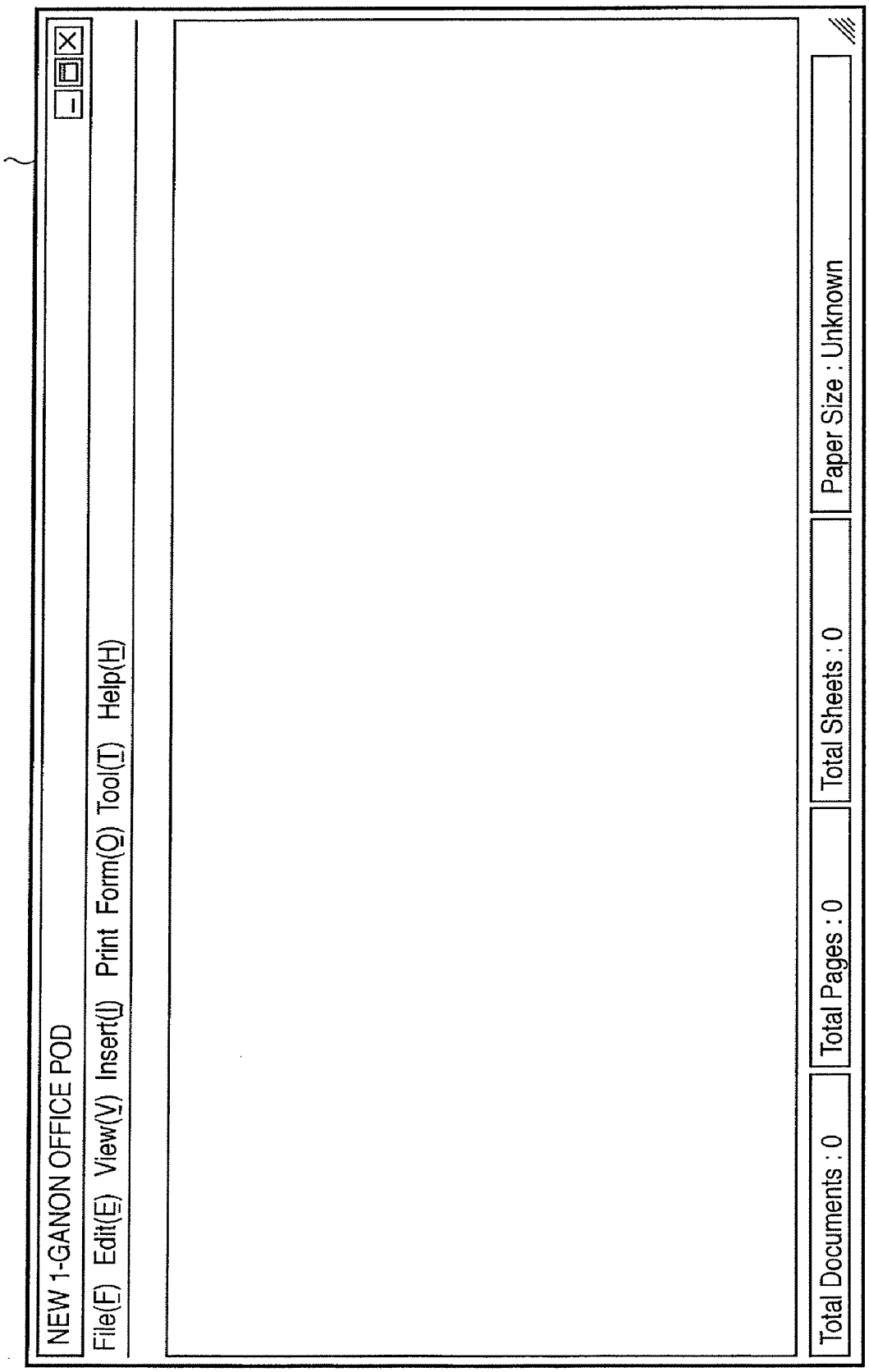
FIG. 9 depicts an example of a user interface screen when a new book file is opened, according to the embodiment of the present invention.

FIG. 9 depicts an example of a user interface screen when the new book file is created. In such a circumstance, a user interface screen displays nothing, because the book file effectively has no content.

Figure 10:
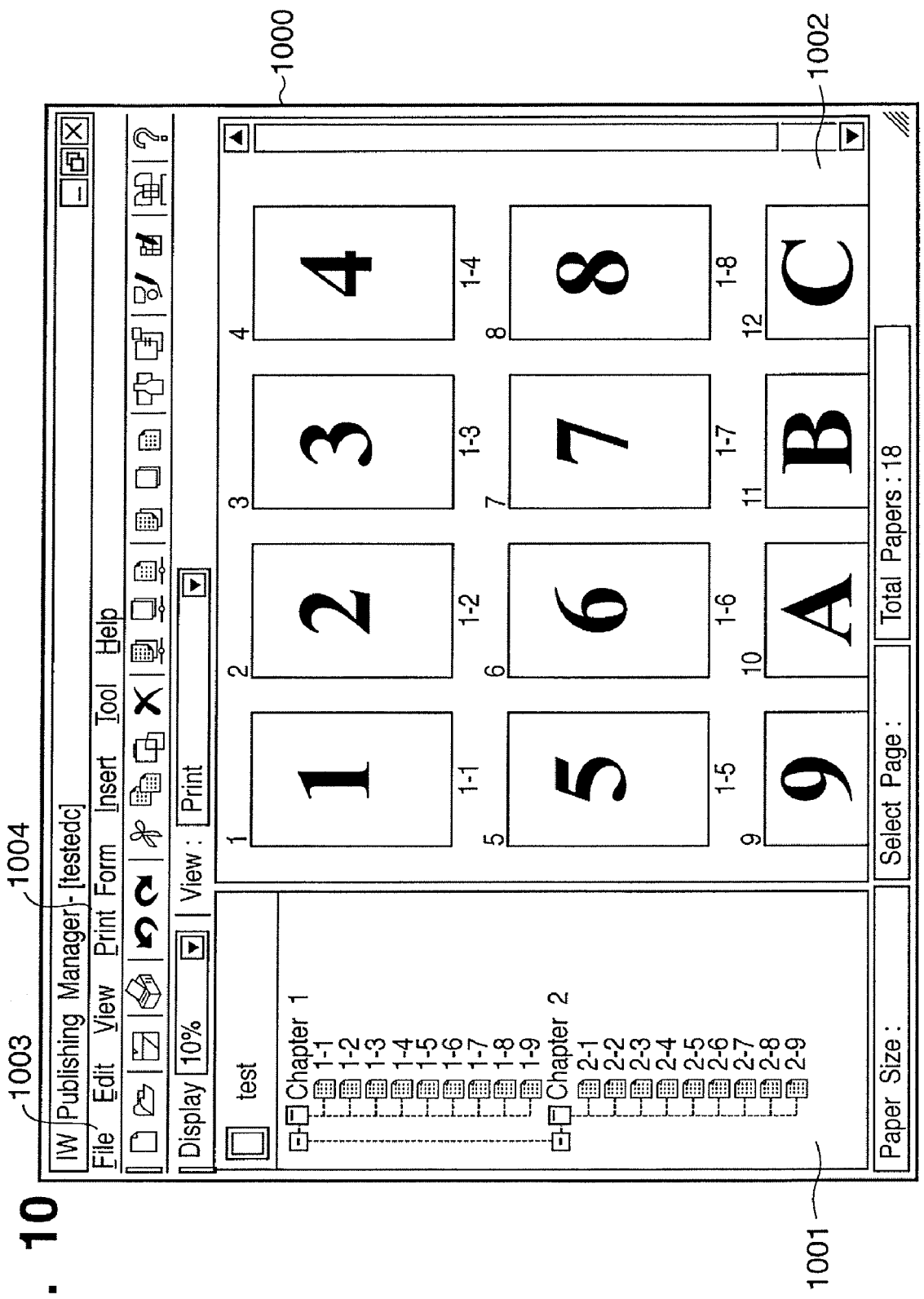
FIG. 10 depicts an example of a user interface screen when an existing book file is opened, according to the embodiment of the present invention.

If the book file to be opened is an existing file, on the other hand, the specified file is opened, in step S803, and is displayed in the user interface screen in accordance with the structure, attribute, and content of the book file. FIG. 10 is an example of the user interface screen. A user interface screen 1000 contains a tree unit 1001, which depicts the book structure, and a preview unit 1002, which displays the printed status of the book. The tree unit 1001 displays the chapter contained in the book, and the page contained in the chapter, in a manner that shows a tree structure such as that depicted in FIG. 4. The page displayed in the tree unit 1001 is the manuscript source page. The preview unit 1002 displays a reduced printout page content. The display order reflects the structure of the book.

It is possible to add an application data that is converted by the electronic document writer 102 into the electronic document file to the opened book file as a new chapter. Such a feature is referred to as an electronic document import feature. By using the sequence depicted in FIG. 8 to import the electronic document into the newly created book file, the book file receives an actual form. The feature is activated by a drag-and-drop operation of the application data into the screen depicted in either FIG. 9 or FIG. 10.

Figure 11:
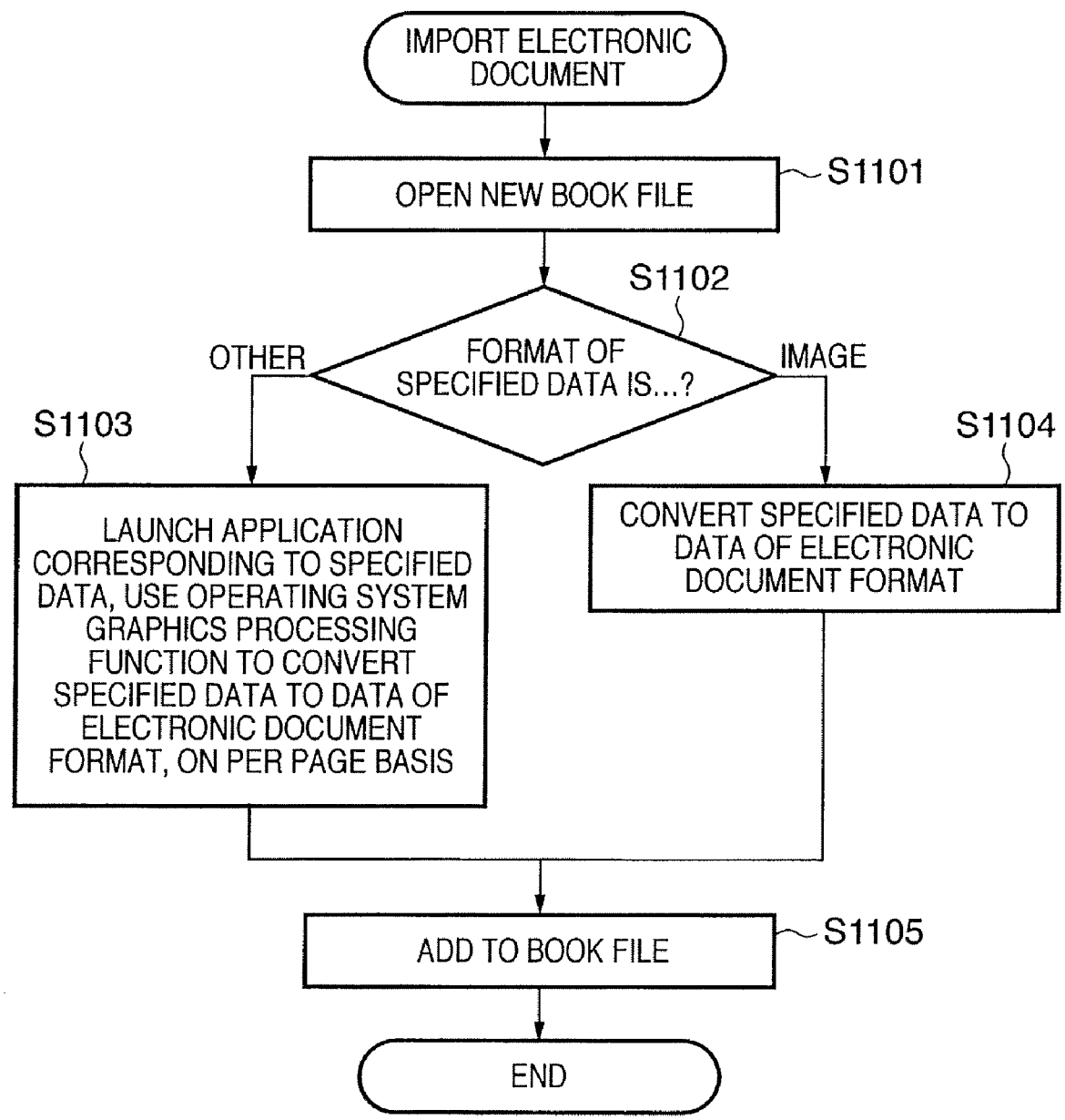
FIG. 11 is a flowchart depicting an example of a sequence of importing an electronic document file into a book file, according to the embodiment of the present invention.

FIG. 11 is a flowchart depicting an example of a process when performing an import of the electronic source manuscript file into the book file. In step S1101, a new book file is created and opened, in accordance with the flowchart depicted in FIG. 8. The specification of the data to be imported is then received. In step S1102, a determination is made as to whether or not the format of the data to be imported is an image file. It is possible to perform the determination based on a file identifier of the application data, if the determination is made within a Windows operating system. For example, if the identifier is ".bmp", the data is a Windows bitmap data, whereas if the identifier is ".jpg", the data is a compressed JPEG image data, and if the identifier is ".tiff", the data is an image data in TIFF format.

If it is determined in step S1102 that the data to be imported is a different file format, i.e., the determination is "other", the process proceeds to step S1103, wherein the application corresponding to the specified application data is launched, which transmits the output command to the operating system output module with the electronic document writer 102 as the device driver. The output module uses the electronic document writer 102 to convert the received output command to the electronic document format data, and outputs the result.

If, on the other hand, the file is an image data, i.e., the result of step S1102 is "image", the process proceeds to step S1004, wherein the data is converted to the electronic document file by converting the file format, without launching the application. While only the image file is treated as a target for format conversion in the present example, it is possible to create a data converter if the data is in a publicly available format such PDF or PS.

In step S1005, the specified data is added to the book file when the conversion is completed. If a plurality of files constitute the specified data, it is possible to import the plurality of files into the book file by looping through steps S1101 through S1105 a number of iterations equal to the quantity of the files.

Book File Editing Example

It is possible to create a book file from the application data as follows. It is possible to perform an editing operation such as the following on the chapter and page of the book file so generated:

1. New Addition
2. Deletion
3. Copying
4. Cutting
5. Pasting
6. Transferring
7. Changing of a Chapter Name
8. Re-assigning of a Page Number or Name
9. Addition of a Cover
10. Insertion of Inserting Paper
11. Insertion of an Index Paper
12. A Page Layout for Each Respective Document Page An operation to undo an editing operation once performed, as well as an operation to redo an editing operation once undone, is also possible. By way of the editing function, an editing operation is possible which, taking an integration of a plurality of book files as an example, may include a repositioning of a chapter or a page within a book file, a deletion of a chapter or a page within the book file, a change of a manuscript source page layout, or an insertion of an insert page or an index page. Performing the operation causes a result of the operation to be reflected in either the attributes depicted in FIG. 4 through FIG. 6, or else in the structure of the book file, among other possibilities.

For example, performing a blank page new addition operation causes the blank page to be inserted at a specified location. The blank page is treated as a document page. If a layout of the document page is changed, a content of the change is reflected in the attribute of the print method, the N-up print, the front or back cover, the index, the insert page, or the chapter segmenting. Following is a detailed description of a display and operation example as pertain to the present example.

Book File Output Example

It is presumed that the created and edited book file has printing output as an ultimate objective. As depicted in FIG. 10, the user selects a file menu 1003 from the user interface 1000 of the book binding application 104, and selects print from the file menu 1003, whereupon print output is made via a specified output device. In such circumstance, the book binding application 104 creates a job ticket as a print data from the currently open book file, and passes the job ticket to the electronic document de-spooler 105, which converts the job ticket into the operating system output command, for example, the Windows GDI command, and transmits the operating system output command to the output module, for example, the GDI. The output module uses the specified printer driver 106 to generate a command appropriate to the device, to which it then outputs the command.

The graphics engine of the output module (not shown) loads the printer driver 106, from the external memory 211, that is installed on a per print device basis, and configures the output to the printer driver 106. The output module converts the received Graphic Device Interface (GDI) function to a Device Driver Interface (DDI) function, which it outputs to the printer driver 106.

The printer driver 106 converts, based on the DDI function that it receives from the output module, into a control command that the printer is capable of recognizing, for example, Page Description Language (PDL). The converted printer control command is devised to be output to the printer 107 as the print data, via the system spooler that is loaded by the operating system to the RAM 202, and the interface 21.

In the present circumstance, the job ticket is a data that possesses an structure that treats the document page as a smallest unit. The job ticket structure defines the document page layout on the printing paper. One job ticket is issued for one job. Consequently, initially there is a node that is referred to as a topmost document, wherein is defined a attribute of a document overall, which may include a single-sided or a double-sided print, for example. Below the topmost document node is a printing paper node, which may include an identifier of the printing paper to be used, or a specification of a paper feed port in the printer. Each respective printing paper node has a node of a sheet of the paper to be printed. One sheet corresponds to one piece of printer paper. Each respective sheet has a physical print page. For single-print, one sheet has one physical page, and for double-print, one sheet has two physical pages. Each respective physical page has the document page that is positioned thereupon. The layout of the document page is included as a attribute of the physical page.

Figure 12:
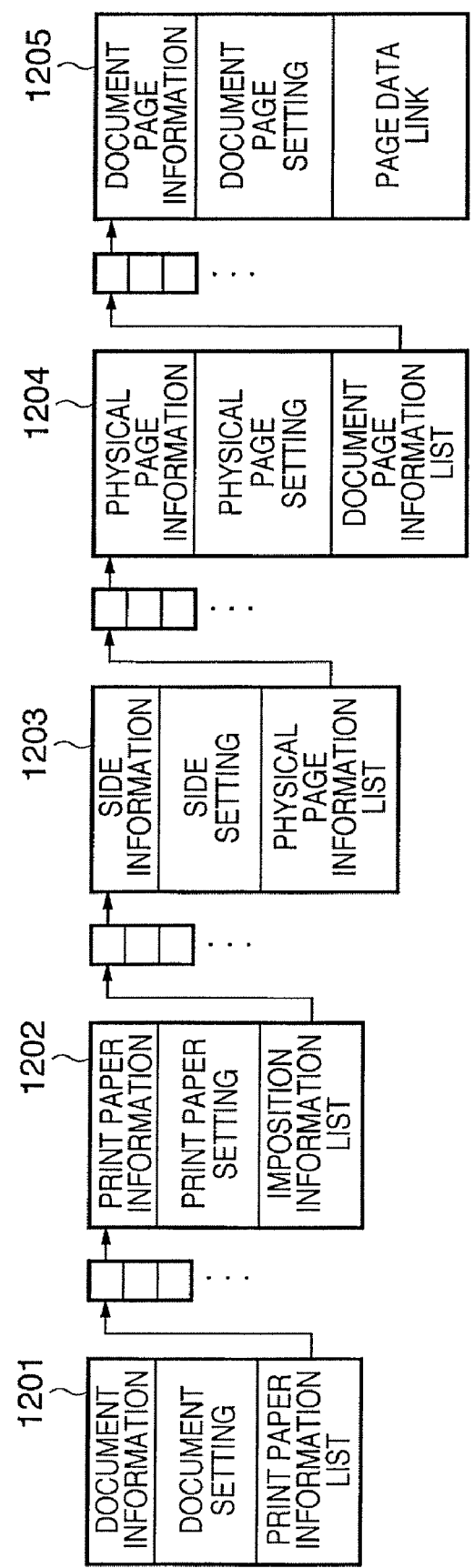
FIG. 12 depicts an example of a job ticket data structure according to the embodiment of the present invention.

An example of the job ticket data structure is depicted in FIG. 12. In the print data, the document is constituted of a collection of the print paper, with each respective print paper being constituted of two sides, a front and a back, and each side possessing an area, i.e., the physical page, that lays out the document, and with each respective physical page being constituted of a collection of the document page that is the smallest unit.

No. 1201 is a data that corresponds to the document, and is constituted of a data that relates to the document overall, and a list of information on the printing paper that constitutes the document. A printing paper information 1202 is constituted of a list of information pertaining to the printing paper, which may include a printing paper size, and a list of information on a side that is positioned upon the printing paper. A side information 1203 is constituted of a data that is intrinsic to a side, and a list of the physical page that is positioned upon the printing paper.

A physical page information 1204 is constituted of information that may include a size of, or a header or a footer on, the physical page, and a list of the document page that constitutes the physical page. A document page information 1205 is constituted of a document page setting unit, which maintains a layout information that may include whether information that may include a header or a footer of the document page, or a color data, is contained, or whether or not to enlarge or reduce what size on what position on the side, and a link information to a page data list 413.

The electronic document de-spooler 105 converts the job ticket into the output command to the output module.

Example of Content of Preview Display

As per the foregoing, when the book file is opened the book binding application the user interface display 1000 that is depicted in FIG. 10 is displayed. The tree unit 1001 displays a tree that depicts the structure of the book that is opened, i.e., a book of interest. The preview unit 1002 has three display methods, according to the user's specification.

A first display method is a mode that is referred to a document view, which displays the document page as is. The document view mode displays the content of the document page that is part of the book of interest in a reduced form. The layout is not reflected in the preview unit display. A second mode is a print view mode, in which the document page is displayed in a format that reflects the layout of the document page. A third mode is a basic print view mode, in which only the layout of each respective document page is reflected, and not the preview unit display.

It is possible for the screen depicted in FIG. 10 also to be used as an operation screen for the book binding application 104, which is capable of performing a print apparatus function setting, which may include stapling, in addition to editing, which may include changing a page order of the document, as well as duplication or deletion of a page, and is also capable of printing to a specified print apparatus.

Attribute Setting Example

Figure 13:
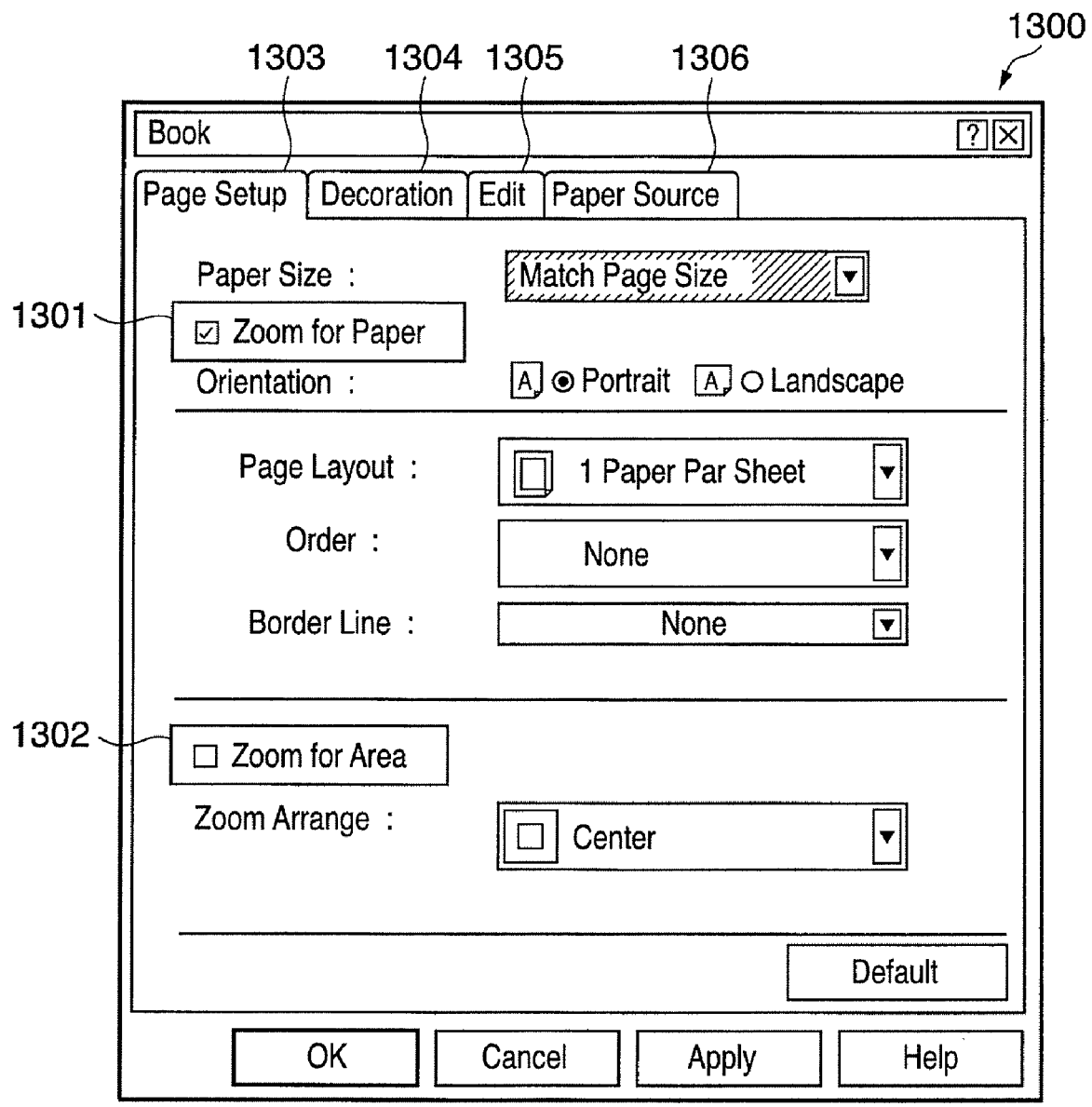
FIG. 13 depicts a detailed document setting window 1300 of a book binding application 104, according to the embodiment of the present invention.

FIG. 13 depicts a detailed document setting window 1300 of the book binding application 104.

The window is capable of displaying or configuring the book setting information 403. The window is opened either from a Detailed Document Setting menu of a Print Form menu, or by a Detailed Document Setting button on a toolbar, of the application operation screen depicted in FIG. 10. The Detailed Document Setting window is for performing a setting of a attribute that affects the document as a whole. The window is constituted of a Page Setup pane 1303, a Decoration pane 1304, an Edit pane 1305, and a Paper Feed pane 1306. FIG. 13 depicts a state in which the Page Setup pane 1303 has been selected. The Page Setup pane 1303 is primarily capable of directing a setting that may include performing a setting that relates to a layout, a printing paper size or orientation, or an N-page print. A zoom checkbox control 1301 and 1302 are positioned within the window 1300.

Figure 14:
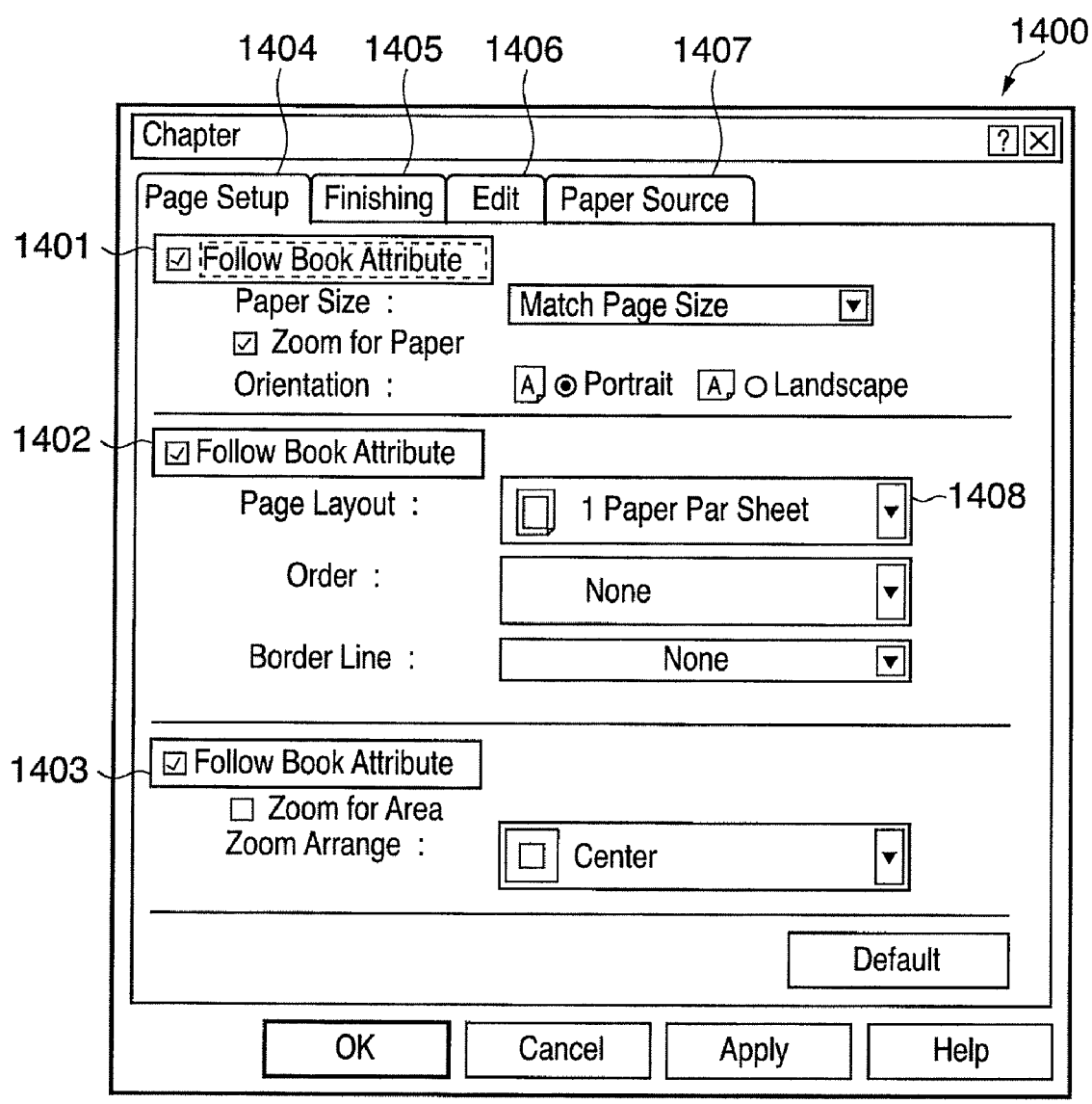
FIG. 14 depicts a detailed chapter setting window 1400 of a book binding application 104, according to the embodiment of the present invention.

FIG. 14 depicts a detailed chapter setting window 1400 of the book binding application 104.

The window is capable of displaying or configuring the chapter setting information 407. The window is opened either from a Detailed Chapter Setting menu of a Print Form menu, or by a Detailed Chapter Setting button on a toolbar, of the application operation screen depicted in FIG. 10. The detailed chapter setting window 1400 is for performing a setting of a attribute that is intrinsic to the chapter. The window is constituted of a Page Setup pane 1404, a Finishing pane 1405, an Edit pane 1406, and a Paper Feed pane 1407.

FIG. 14 depicts a state in which the Page Setup pane 1404 has been selected. The Page Setup pane 1404 is primarily capable of directing a setting that may include performing a setting that relates to a layout that is intrinsic to each respective chapter, a printing paper size or orientation, or an N-page print. A Follow Book Attribute checkbox control 1401, 1402, and 1403 are positioned for a attribute item that overlaps between the Detailed Document Setting and Detailed Chapter Setting. The attribute for which the checkbox is checked applies the book value that is configured in FIG. 13 to the chapter as well.

Figure 15:
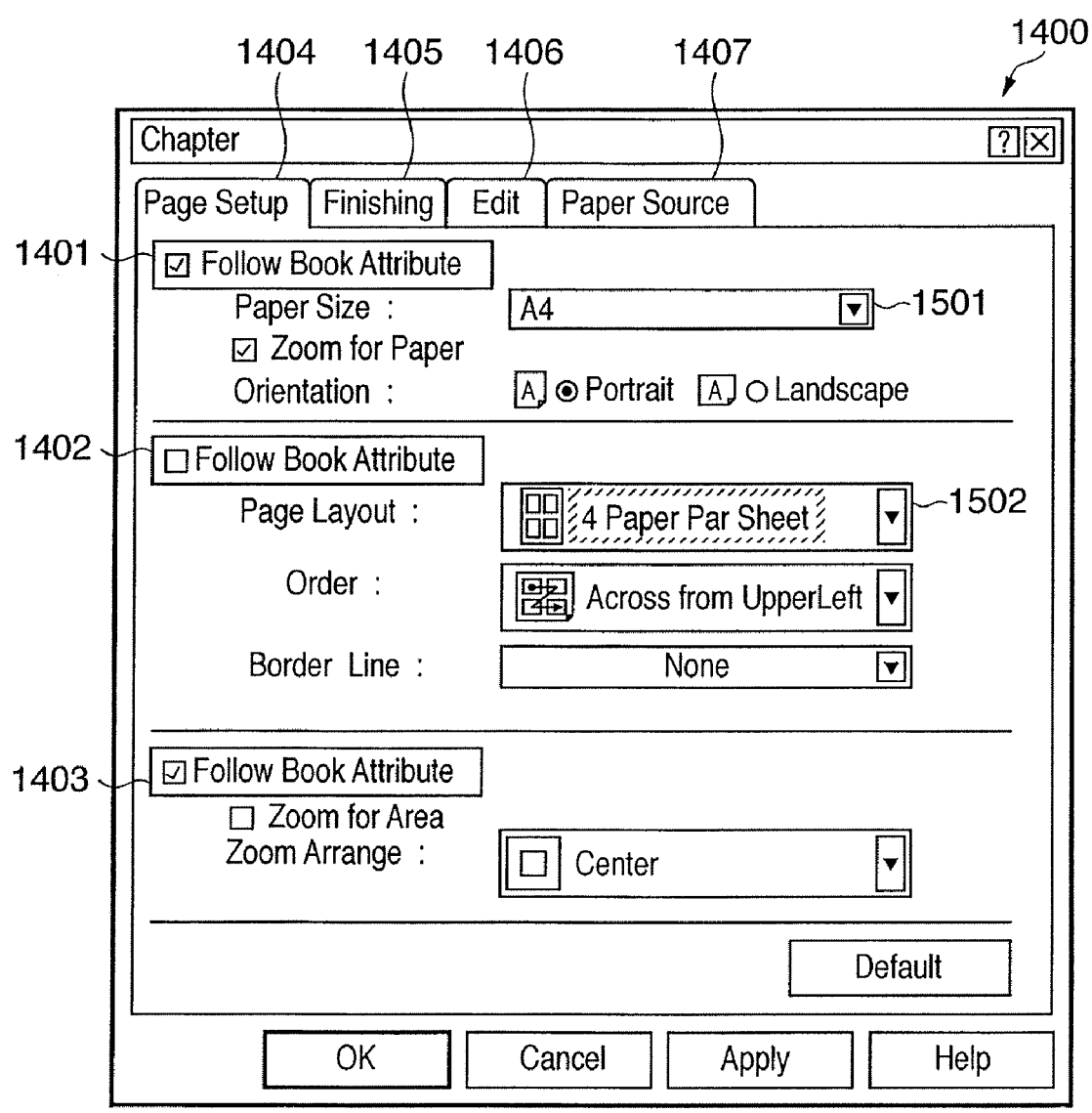
FIG. 15 depicts an example of performing a setting of a specific attribute within the window 1400 shown in FIG. 14.

An example of the checkbox being unchecked is depicted in FIG. 15. The setting that is intrinsic to the chapter may be divided into two classes. One class is a attribute that is possessed only by the chapter. The other is for a attribute value that is uniquely maintained at a chapter level different from the document at the upper level.

FIG. 15 depicts a state in which the checkbox 1401 and 1402 of the Detailed Chapter Setting depicted in FIG. 14 are unchecked. In such a circumstance, the page that constitutes the chapter will be A4 paper size, even though the document overall uses A3 paper. The layout is configured for the document as one page per sheet in the page layout 1408, while the chapter setting of the page layout 1502 depicted in FIG. 15 is four pages per sheet. Given that the checkbox control 1403 is checked, the value of the document, which is the upper layer, is used as the value for the chapter, meaning that there is no need to perform a setting for the chapter.

Figure 16:
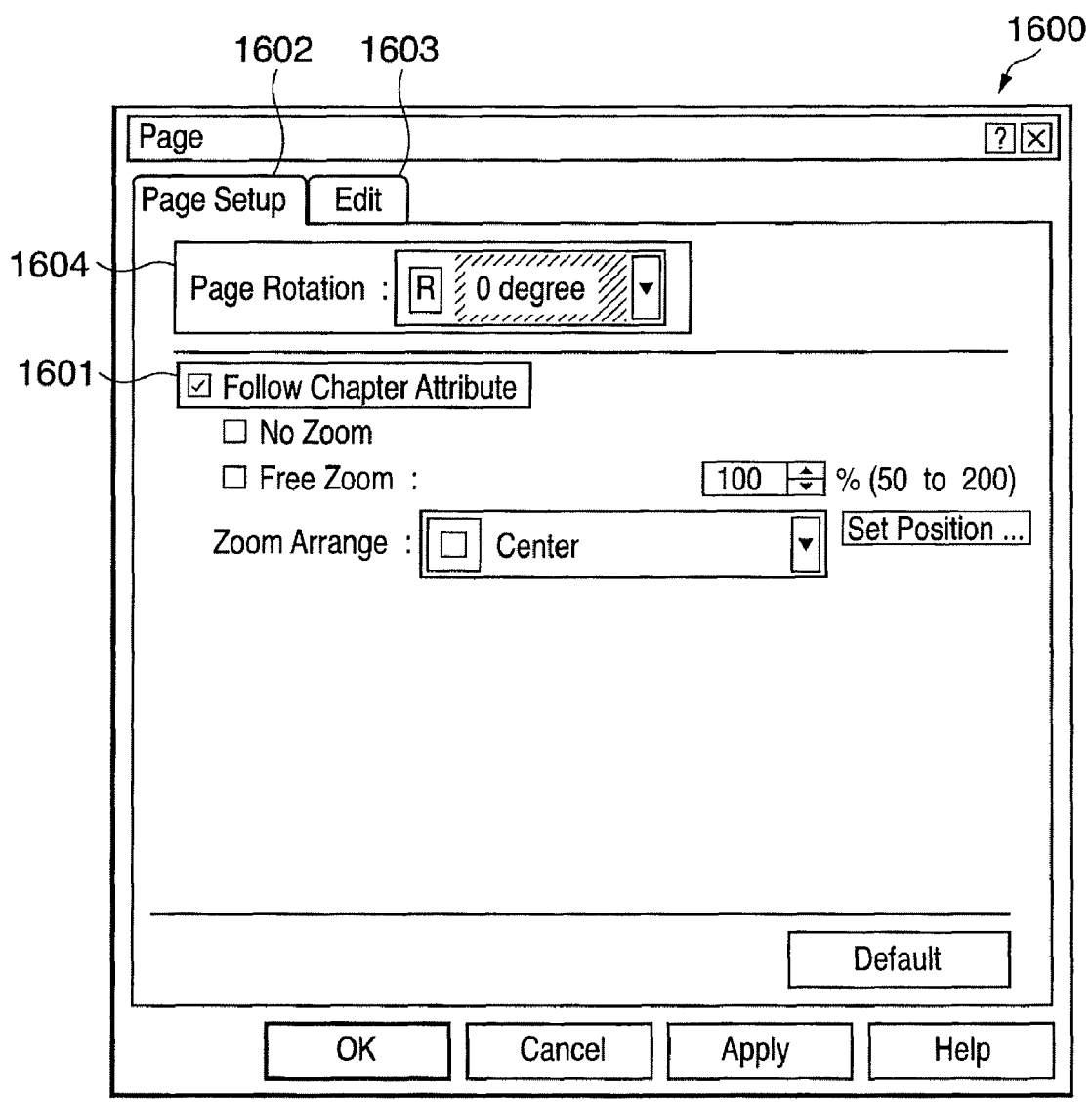
FIG. 16 depicts a detailed page setting window 1600 of a book binding application 104, according to the embodiment of the present invention.

FIG. 16 depicts a detailed page setting window 1600 of the book binding application 104, according to the embodiment of the present invention.

The window 1600 is capable of displaying or configuring the page setting information 411. The window is opened either from a Detailed Page Setting menu of a Print Form menu, or by a Detailed Page Setting button on a toolbar, of the application operation screen depicted in FIG. 10. The detailed page setting window 1600 is for performing a setting of a attribute that is intrinsic to each respective page. The window 1600 is constituted of a Page Setup pane 1602 and an Edit pane 1603.

Figure 17:
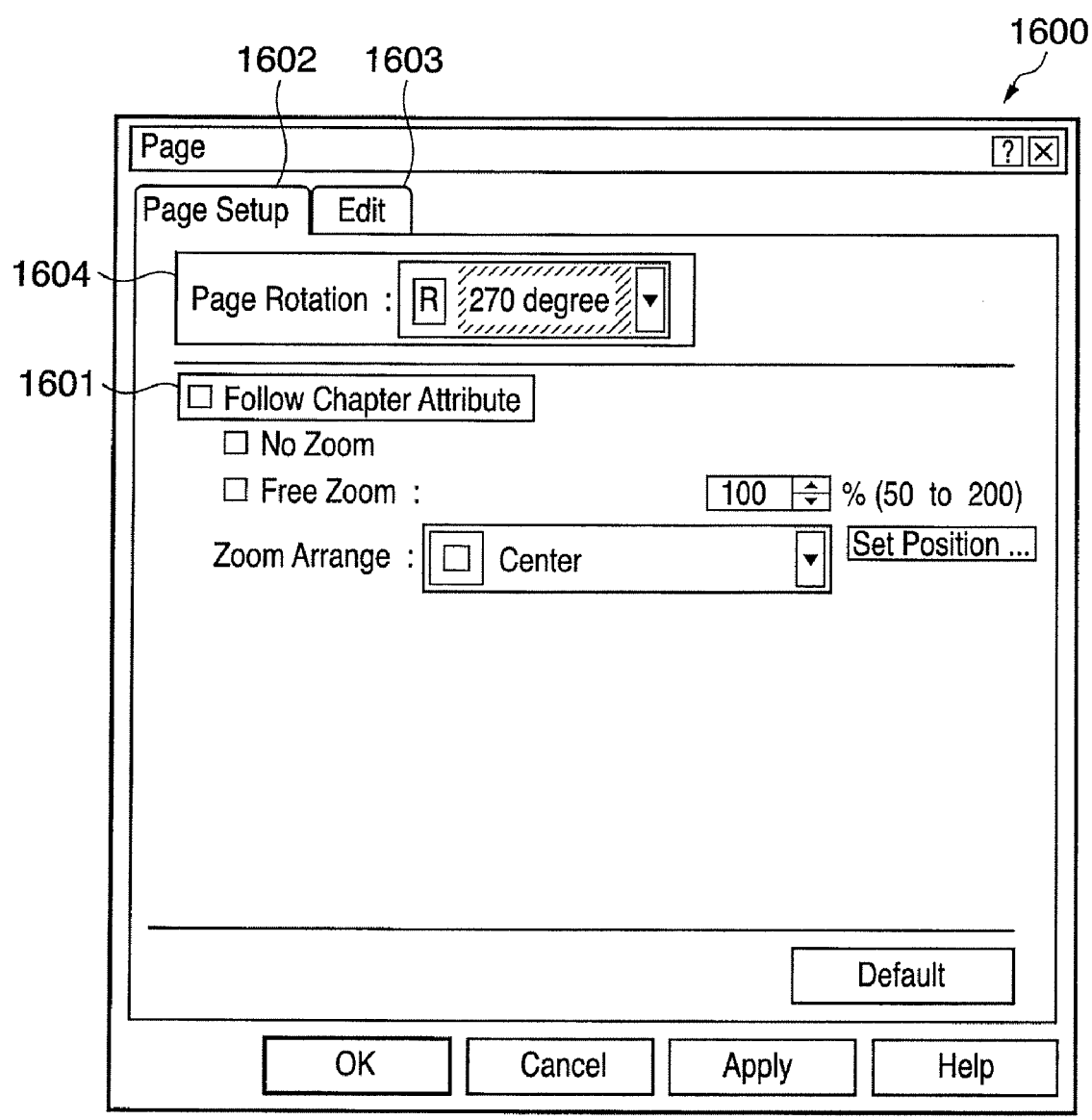
FIG. 17 depicts a state wherein a Page Rotation 1604 setting of the detailed page setting window 1600 shown in FIG. 16 is changed.

FIG. 16 depicts a state in which the Page Setup pane 1602 has been selected. The Page Setup pane 1602 is primarily capable of directing a setting that may include performing a setting that relates to a layout that is intrinsic to each respective page, or an angle of rotation or a degree of expansion or reduction when the document page is positioned. A Follow Chapter Attribute checkbox control 1601 is positioned for a attribute item that overlaps between the Detailed Chapter Setting and the Detailed Page Setting. The attribute for which the checkbox is checked applies the book value that is configured in FIG. 14 and FIG. 15 to the page as well. FIG. 17 depicts a circumstance in which the checkbox is unchecked.

FIG. 17 depicts a state wherein a Page Rotation 1604 setting of the detailed page setting window 1600 shown in FIG. 16 is changed. In FIG. 16, the Page Rotation 1604 is set to zero degrees, while in FIG. 17, the Page Rotation 1604 is set to 270 degrees, which will rotate the top of the document page to the left in the layout. Given that the attribute has no overlapping value in the chapter or the document, the screen has no Follow Chapter Attribute checkbox, and the setting that is displayed in the window 1600 defaults to the page value.

If, on the other hand, a Follow Chapter Attribute 1601 is checked, the zoom arrange attribute takes the chapter value, given that the attribute overlaps with the chapter. If the Follow Book Attribute 1403 is checked for a chapter zoom arrange for the chapter, then the chapter value uses the value of the document that is the upper layer, and the page value ultimately follows the value of the document. If the item 1403 is unchecked in the chapter, the chapter will possess its intrinsic value, and the page value will follow the intrinsic value of the chapter.

While the information of the checkbox control that is configured in the screen may be maintained in an area that is specific to the purpose, it is desirable that it be maintained as a attribute of the chapter setting information 407 or the page setting information 411 that is depicted in FIG. 4. In such a circumstance, an area that maintains the checkbox control information is added to FIG. 6 and FIG. 7.

Example of Display of Document Editing

Figure 18:
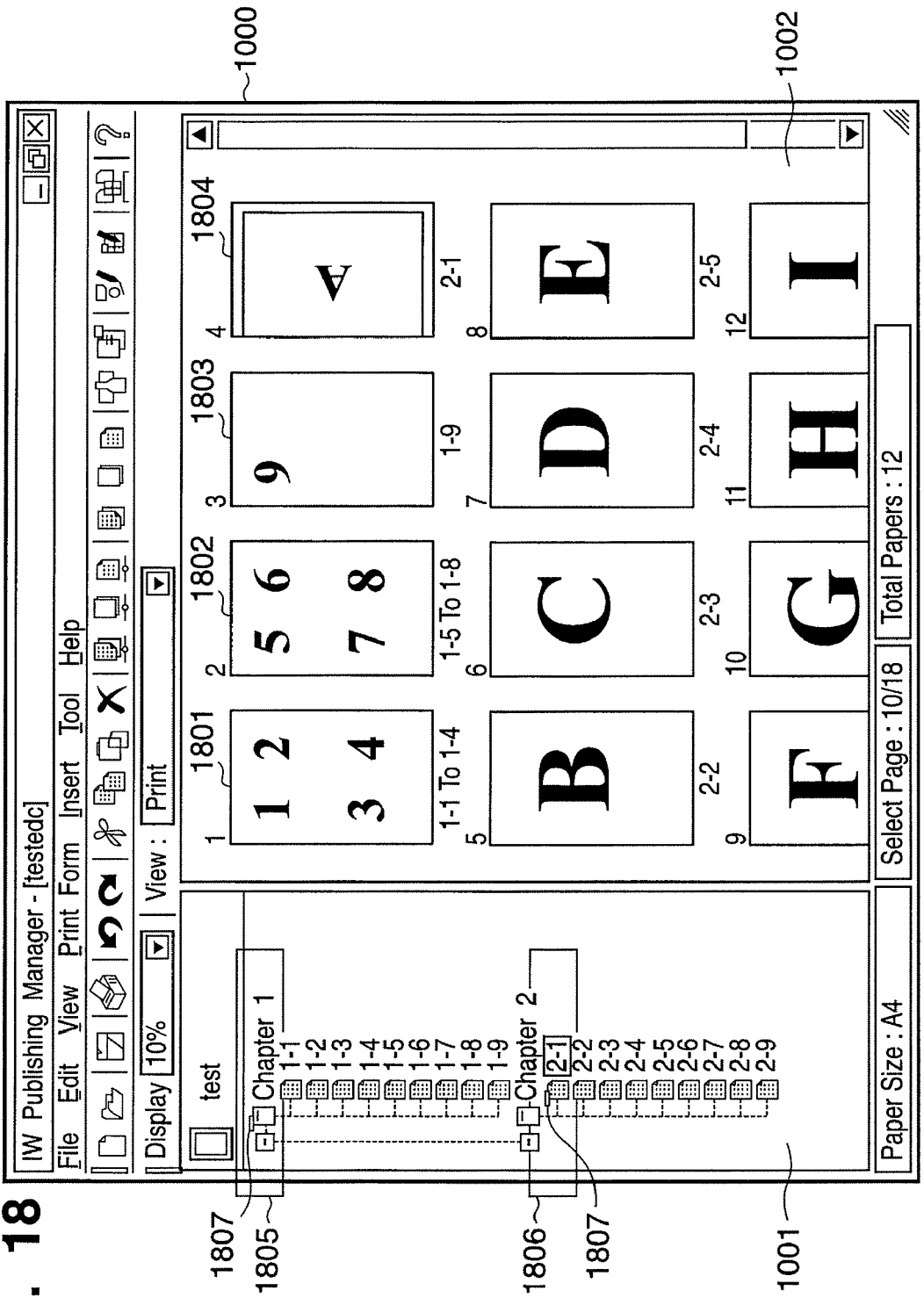
FIG. 18 depicts an example of a display of an application when performing a specific setting in a chapter or a page, according to the embodiment of the present invention.

FIG. 18 depicts an application display format for a circumstance in which an upper layer value is not used for a value of a attribute that overlaps with an upper layer, or in other words, when the checkbox control 1401 or 1601 is unchecked.

In the example in FIG. 18, a document is constituted two chapter, Chapter1 and Chapter2, as depicted in the tree unit 1001. Each respective chapter possesses nine pages of document data, 1-1 through 1-9, and 2-1 through 2-9.

FIG. 18 depicts a display example in which a layout of the first chapter is set to 4-up, which is also referred to as 4-in-1, while a first page of the second chapter, i.e., the tenth page of the document overall, is configured to be rotated.

The preview unit 1002 displays a state in which a first three pages, i.e., Nos. 1801 through 1803, each have four documents apiece positioned thereupon. A fourth page 1804 displays a state in which a text character data "A" is rotated. Following is a description of a display format when performing a setting that is specific to a chapter or a page within the tree unit 1001. An icon 1805, corresponding to the first chapter, i.e., Chapter1, changes, signifying that a setting that is unique to the chapter is being set. An icon 1806, corresponding to the first page, i.e., 2-1, of the second chapter, i.e., Chapter2, changes, signifying that a setting that is particular to the page is being set. The icon displays a marking such as No. 1807, and it is possible to identify whether a setting is being made or not based on the presence or the absence of the marking 1807. A format of the marking 1807 is not limited to the marking depicted in FIG. 18. The marking 1807 may take any format, as long as the marking so displayed allows identification that a particular setting is being made. For example, it would be permissible to have a relevant portion blink, or change a display color.

Output Example

In some circumstance, a print operation or a centralized reprographic department (CRD) may perform a layout of an output status that obtains a plurality of pages from a single sheet of printing paper by printing two A4 document on an A3 extended size, and trimming the A3 extended size in post-processing. A variety of layouts are performed, which may include an instance of straightforwardly lining up a given page data a plurality of times, or lining up a series of pages one after another.

FIG. 19 depicts an example of a quarto imposition. The example lays out a plurality of pages, such that a page sequence is contiguous after fold processing and trimming, which is predicated on a premise that the pages will be quarto trimmed after printing, rather than straightforwardly laid out and printed. No. 1901 depicts a layout pattern of a front page of a printing paper, and no. 1902 depicts a layout pattern of a back page of a printing paper. In the present example, the layout is such that a second page on the back page 1902 will be printed on a reverse of a first page on the front page 1901. In similar fashion, the layout is such that a third page is printed on the reverse of a fourth page, a sixth page on the reverse of a fifth page, and a seventh page on the reverse of an eighth page.

Figure 20:
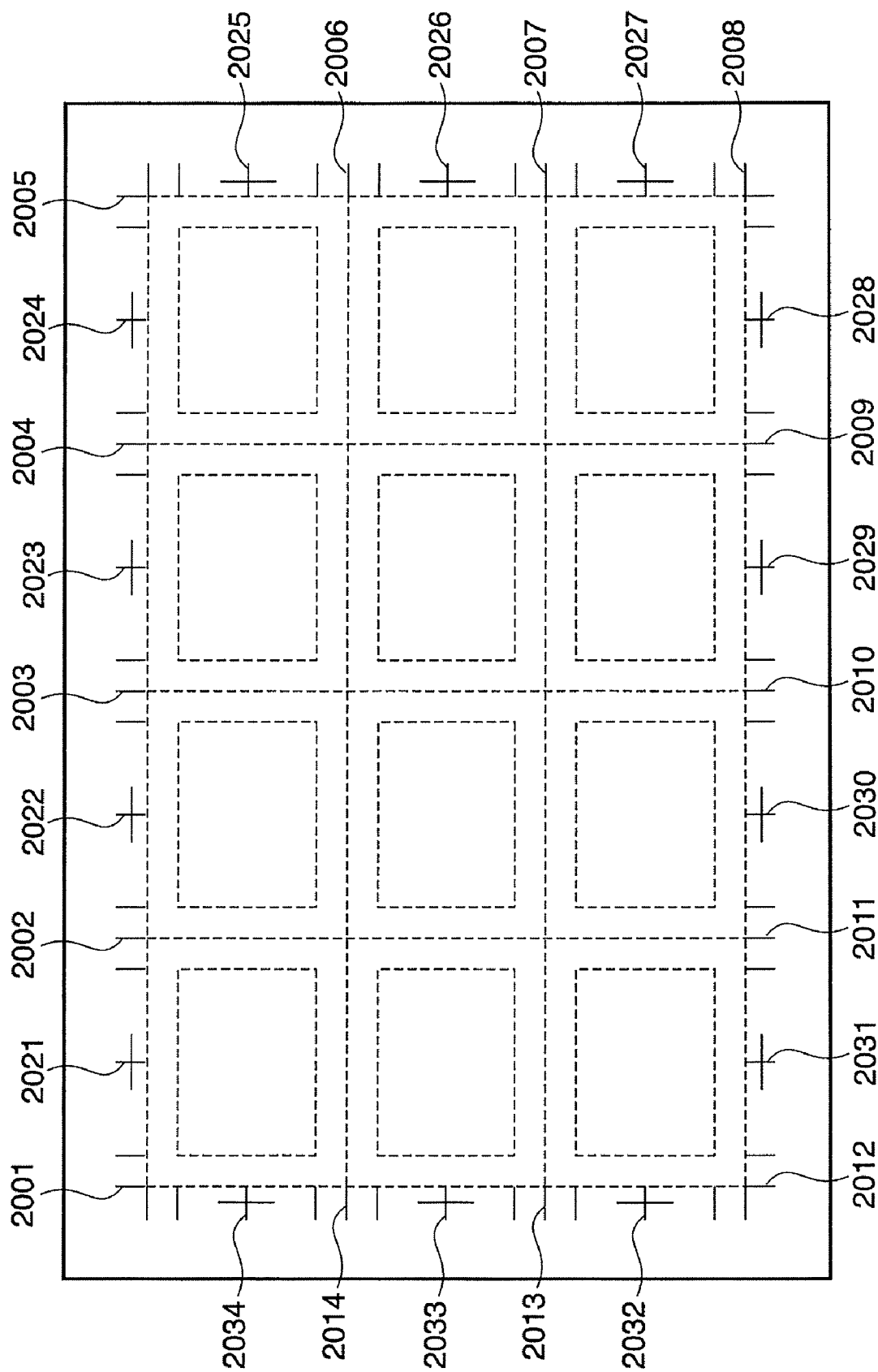
FIG. 20 depicts an example of printing the printer's marks on a sheet of printing paper with a leaflet imposition.
Figure 21:
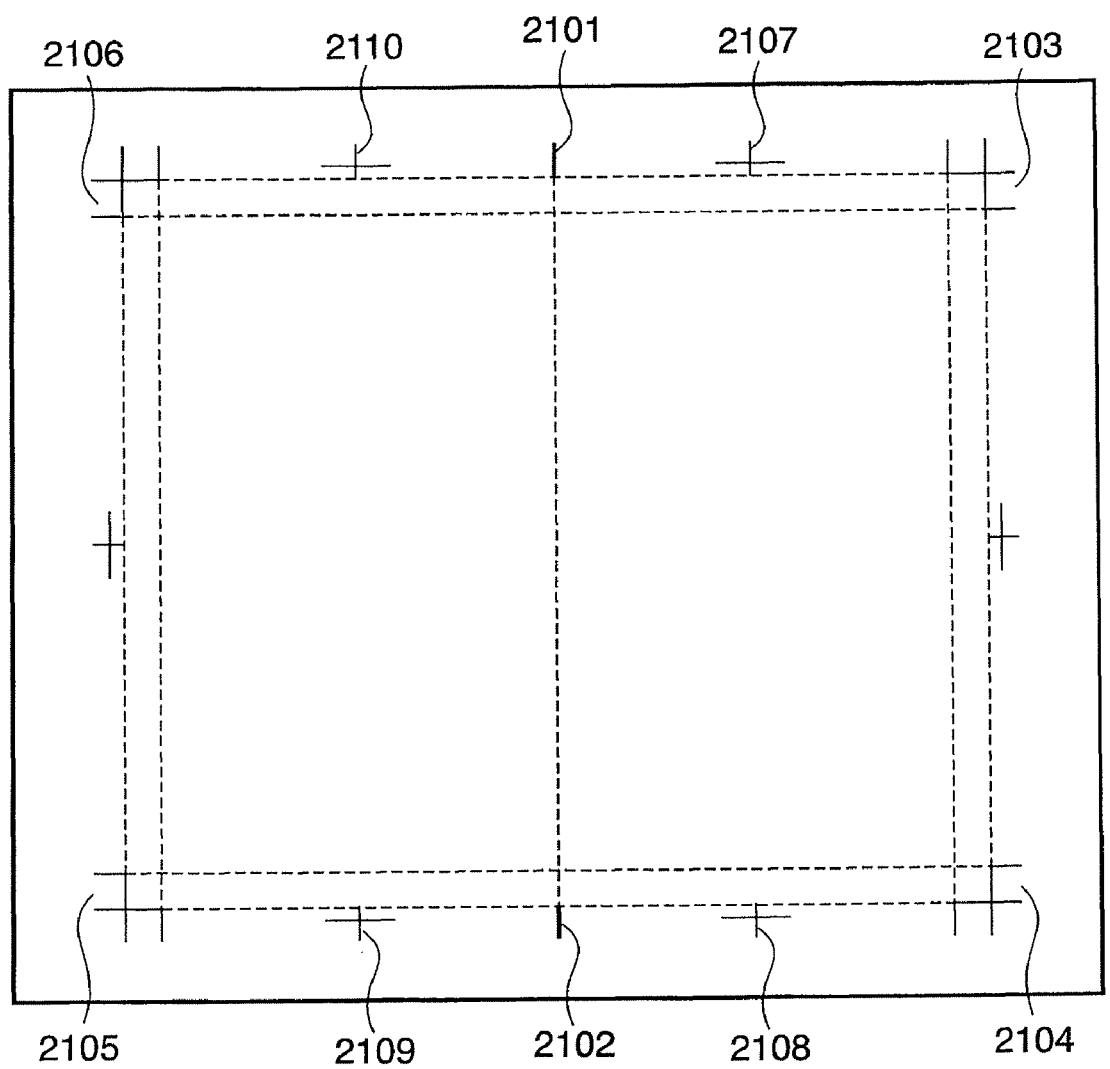
FIG. 21 depicts an example of printing the printer's marks on a sheet of printing paper with a saddle stitch book binding imposition.

Another commonly used method is a simple saddle stitching scheme, as well as an octavo, which is one more fold after a quarto. When imposing a plurality of pages on a single sheet of printing paper in such a fashion, it often happens that a mark that provides a guide for trimming, which is referred to as the printer's marks, is printed together with the pages, in order to cut each respective page away from another. FIGS. 20 through 22 depict examples of using the document system according to the embodiment to print the printer's marks as trimming marks.

FIG. 20 is an example of straightforwardly printing the printer's marks with the pages positioned in a leaflet imposition. In the present example, there are 12 pages positioned upon a sheet of printing paper, arranged in three rows by four columns. Between the pages are printed the printer's marks 2001 through 2014, which signify a position for trimming, and a centering printer's marks 2021 through 2034, which signify a center position of each respective page. The centering printer's marks are a guide for an operator to determine whether or not there is a misalignment in a print position on each respective sheet of printing paper, when performing a plurality of leaflet prints. The original trimming position printer's marks include a guide that signifies the trimming position between pages, and a guide that signifies the trimming position at a corner, which is referred to as a corner printer's marks. An area between the finishing size and the printer's marks is referred to as the bleed.

FIG. 21 is an example of printing the printer's marks in a center of a sheet of printing paper with a saddle stitch book binding imposition. In the present example are positioned a fold printer's marks 2101 and 2102, which signify a top and a bottom position of a central fold in the printing paper, the corner printer's marks 2103 through 2106, which signify a trimming position of a four corners, and the centering printer's marks 2107 through 2110, which signify the center position of the page.

Figure 22B:
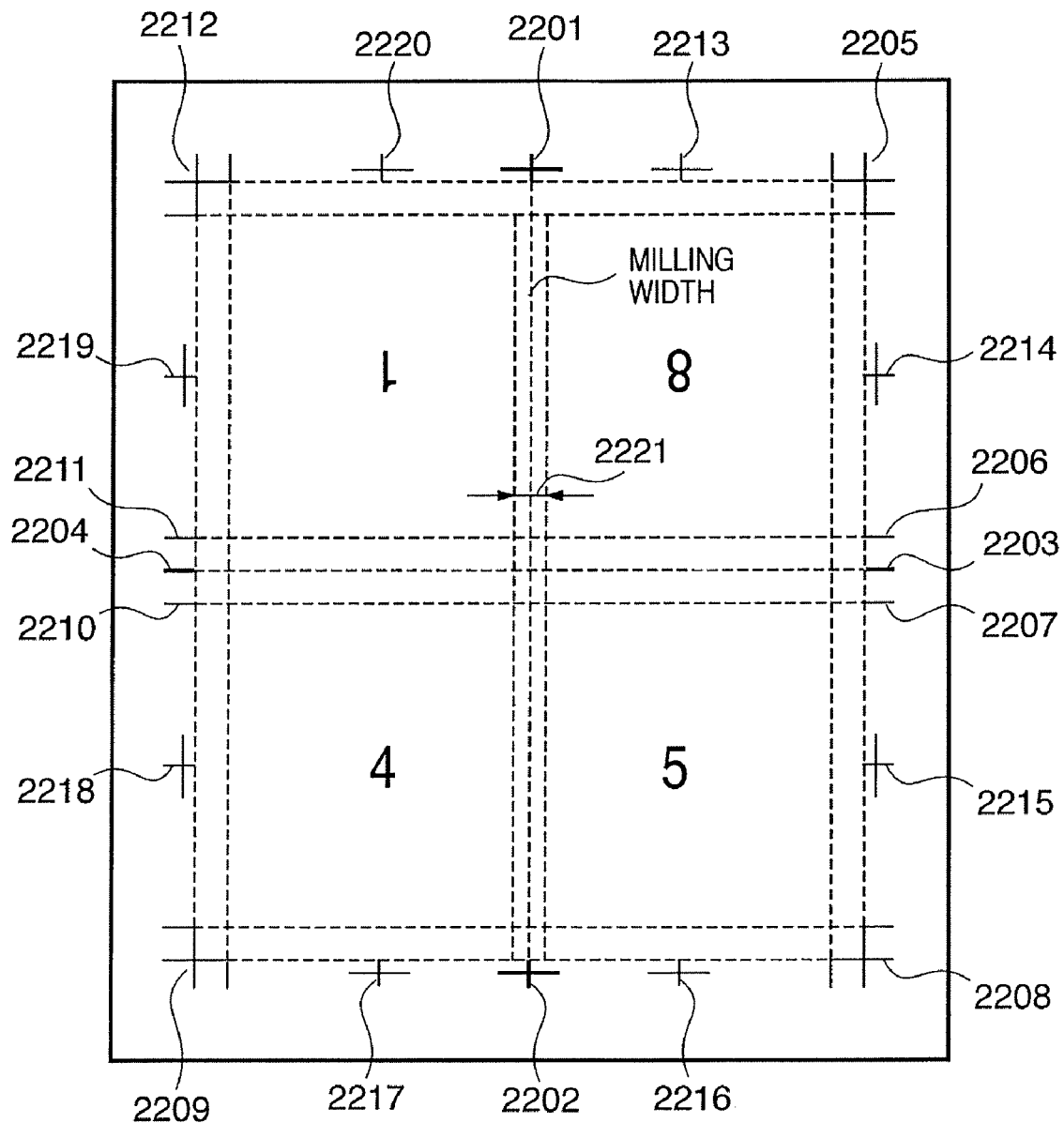

FIGS. 22A and 22B are examples of printing the printer's marks on a sheet of printing paper with a quarto imposition. FIG. 22A depicts an example wherein a trimming bleed known as a milling is not present in a page binding position, and FIG. 22B, an example wherein a milling 2221 is present therein. In either instance, within the present examples are positioned the fold printer's marks 2201 through 2204, at the folding positions, the trim printer's marks 2205 through 2212, at the trimming positions, and the center printer's marks 2213 through 2220, at the center position of each respective page.

The milling is required when the book binding method is that of a adhesive binding, which involves using only an adhesive to bind a book, with a rough portion of the milling applied to a spine of a book, followed by the adhesive, and then the cover. It is thus necessary to add a whitespace, which is referred to as a milling bleed, at time of imposition, to serve as the rough portion.

Figure 23:
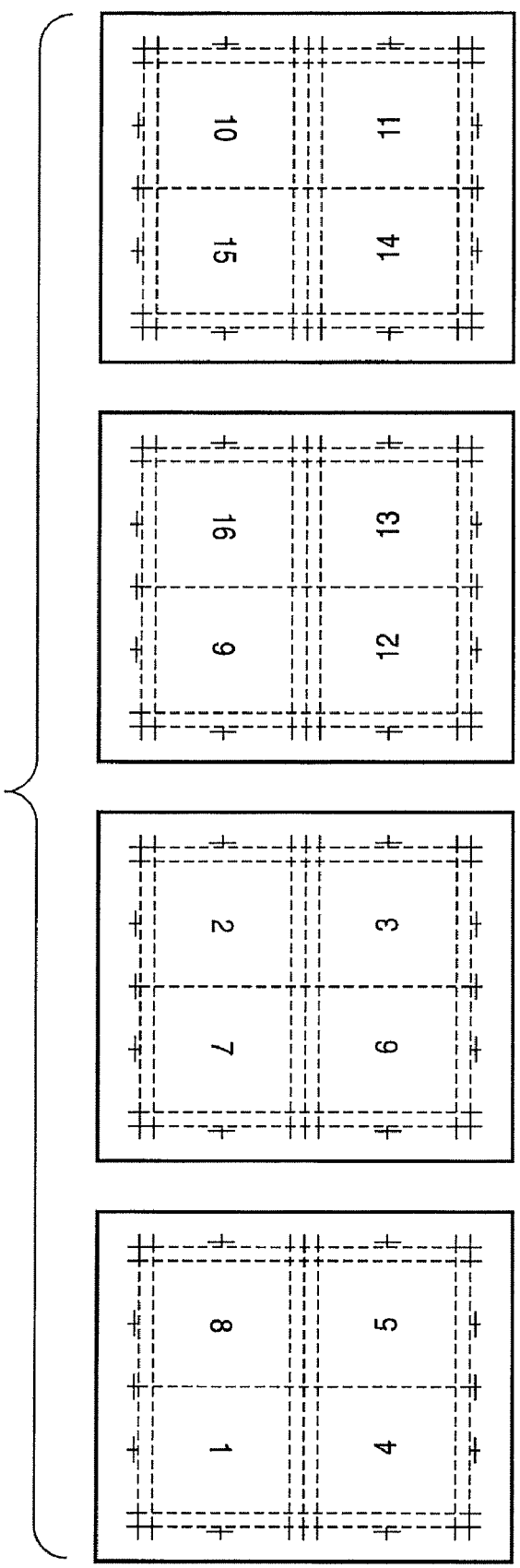
FIG. 23 depicts examples of printing the printer's marks on a sheet of printing paper according to the conventional techniques.

Conventionally, printing has been done as depicted in FIG. 23, with the printer's marks printed on all four edges of the printing paper. FIG. 23 is output examples of printing the printer's marks on a sheet of printing paper using conventional technology for a quarto imposition. When printing the printer's marks on all of the pages, as depicted herein, a problem such as that described hereinafter arises.

Figure 24A:
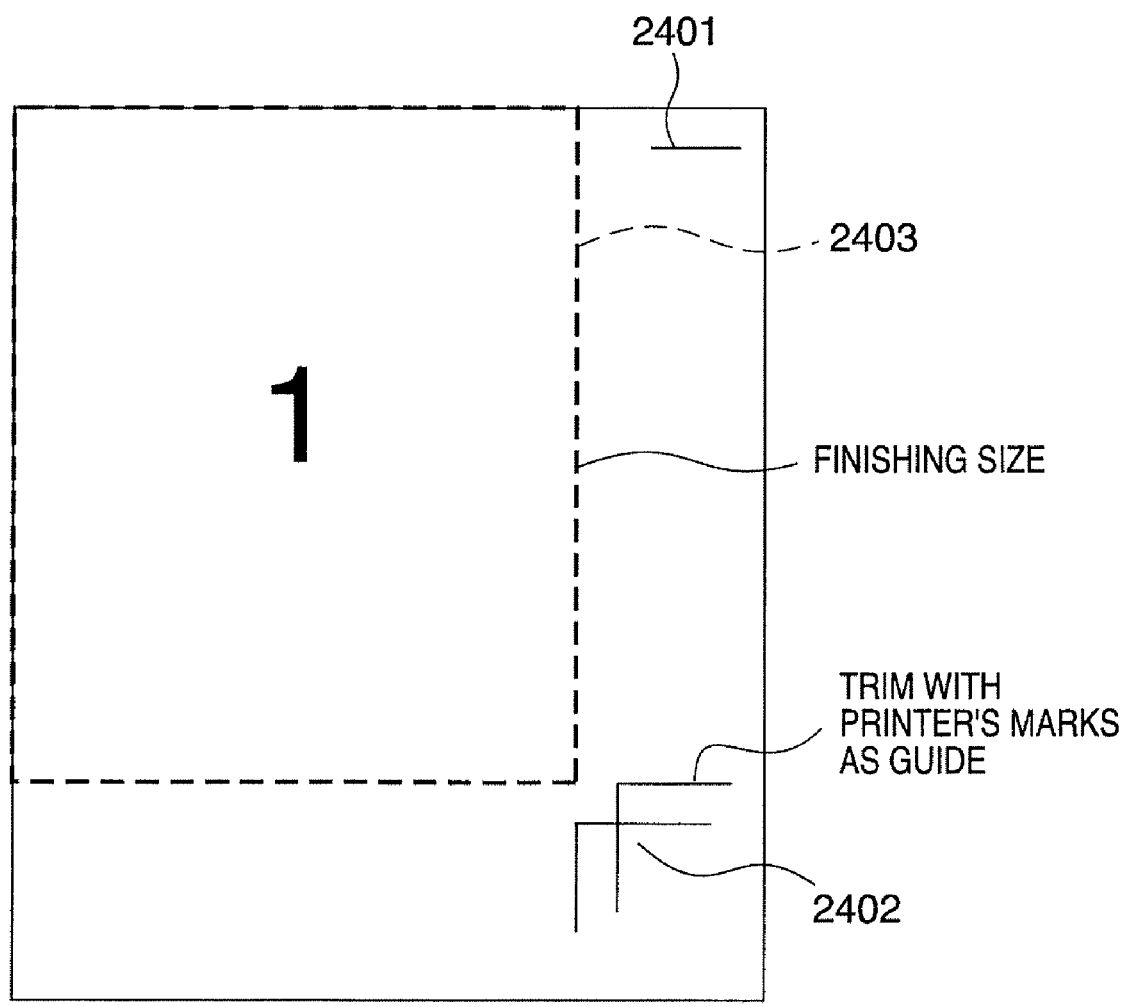
FIG. 24A, FIG. 24B, and FIG. 24C describe problems regarding the conventional techniques.
Figure 24B:
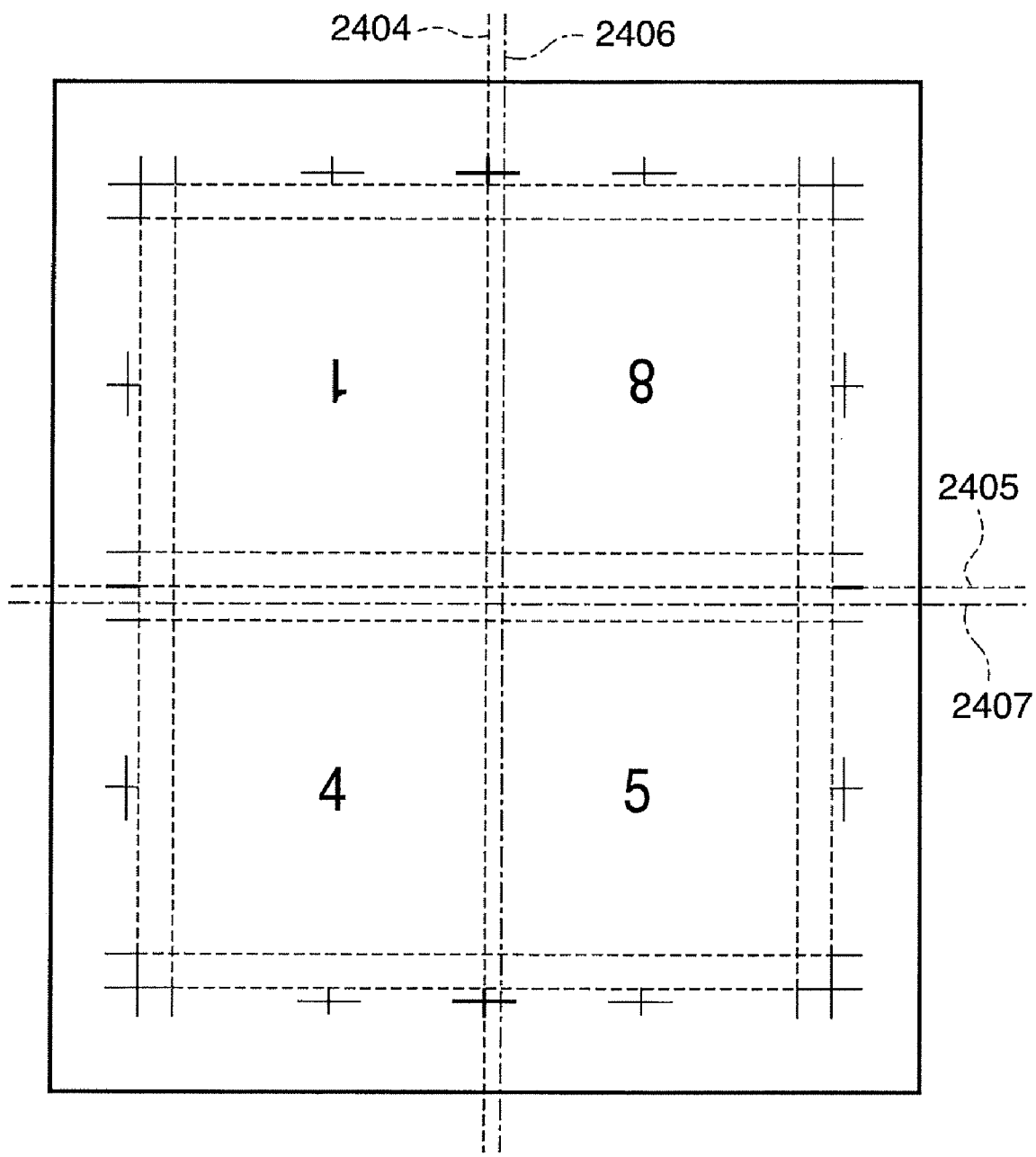
Figure 24C:
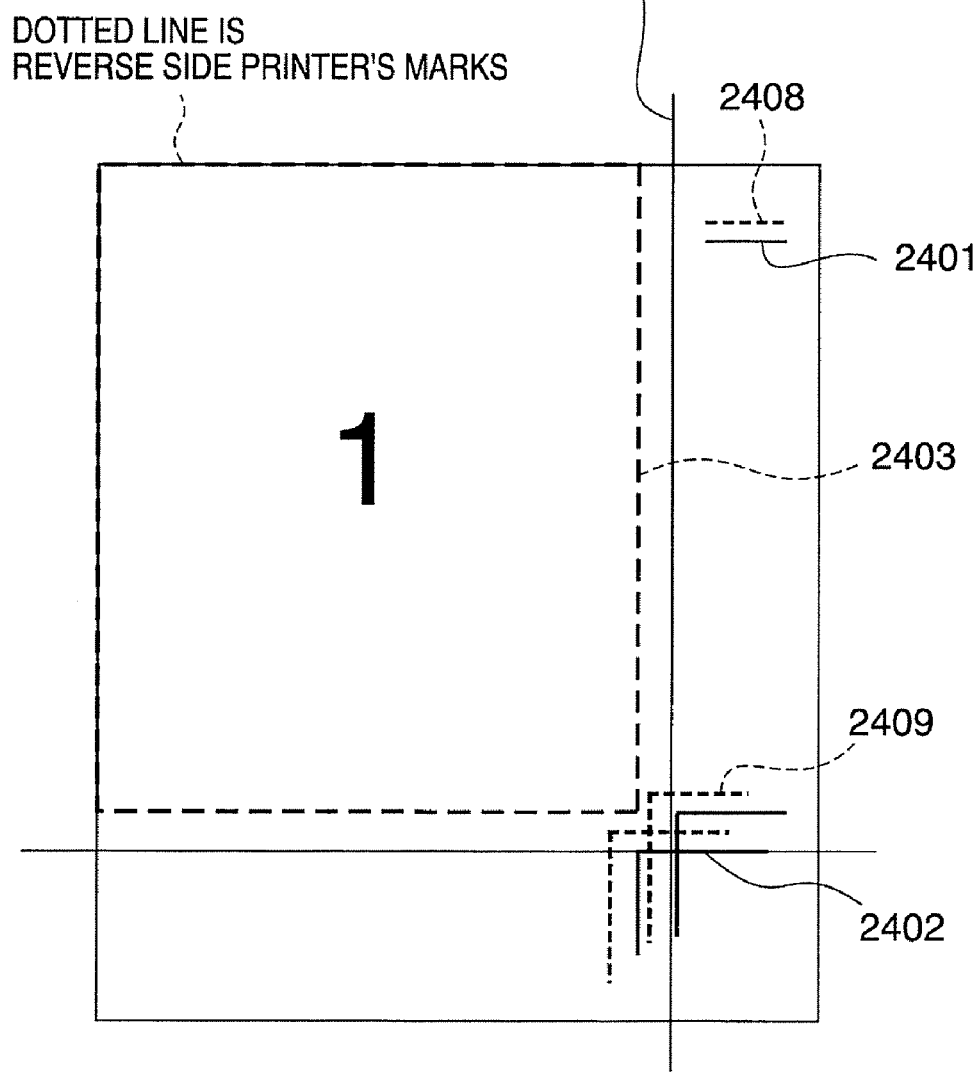

FIG. 24A, FIG. 24B, and FIG. 24C describe problems with the conventional formulae for the printing of the printer's marks. As depicted in FIG. 24A, typically, it is possible to obtain a finished product of the finishing size depicted by a dotted line 2403 in the figure, by trimming at a position of an upper right-hand printer's marks 2401 and the corner printer's marks 2402, at a lower right-hand. If the fold printer's marks are present, it is possible to obtain an ideal finished product by folding at the fold printer's marks and trimming at the trim printer's marks.

Practically speaking, however, a degree of position misalignment arises, as a consequence of a process that may include a misalignment on a per printing paper sheet basis, a misalignment of the front page and the reverse page, a misalignment of the fold position, or a misalignment of the trimming position.

Such misalignment from such a process adds up to a misalignment when trimming or folding. Hence, a printer's mark bleed is commonly built in as a space that allows a margin for error, in anticipation of such a misalignment. Such a margin for error is typically maintained on the order of a 3 mm spacing.

FIG. 24B depicts an example wherein the fold position is misaligned in a lower right-hand direction of the figure. A fold position on the imposition, i.e., the position of the fold printer's marks, is signified by a dotted line 2404 and 2405, and an actually folded position by a dashed line 2406 and 2407. Folding along the dashed line results in the printer's marks ending up as depicted in FIG. 24C.

The dotted line 2408 and 2409 depict the printer's marks that are printed on the reverse of the printing paper or on a folded page, not the front of the printing paper, i.e., the printing paper whereupon is printed a "1". In such a circumstance, the printer's marks will be left on the reverse of the finished product, even if the trimming position of the first page is between two printer's marks.

Following is a description of an example wherein four pages are imposed on a given page, in a two-by-two arrangement. It is possible, for example, to obtain four copies of a four-page document by printing four pages' worth of data on a single sheet of printing paper, and trimming the sheet of printing paper into fourths.

Figure 25:
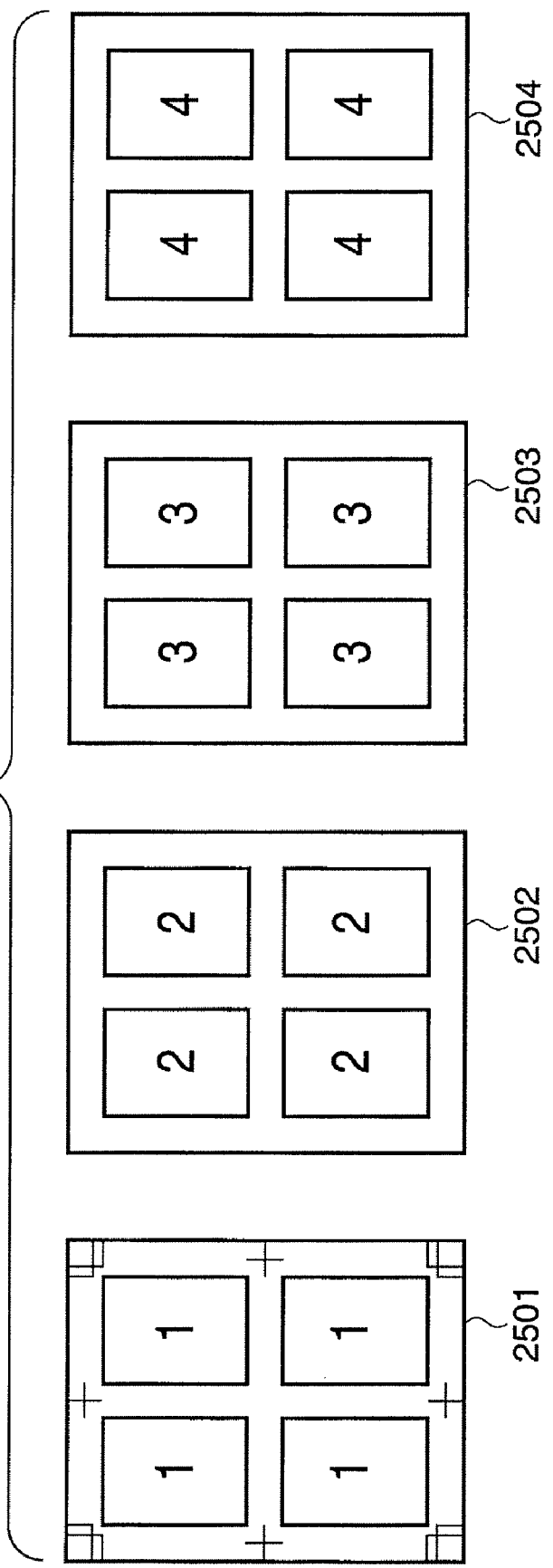
FIG. 25 depicts an example of printing the printer's marks according to the embodiment of the present invention.

FIG. 25 depicts an easily understood example of applying a control of the position of the printer's marks according to the present invention. A periphery of each page in FIG. 25 is surrounded by a rectangle in order to depict a conceptual position of the finishing size in an easily understood manner. Such a framework is not actually printed. As there are four document pages 2501 through 2504, it is presumed that four sheets of printing paper are overlaid and trimmed. In such a circumstance, the operator only requires the printer's marks on the first sheet 2501 as a trimming guide. A protocol for the control of the position of the printer's marks according to the present invention prints the printer's marks on the first sheet of printer paper, which is the only one where they are actually required with an imposition method that does not involve the fold processing, obviating a possibility that the printer's marks will be left behind on the second or succeeding pages, even if some degree of misalignment occurs.

Figure 26:
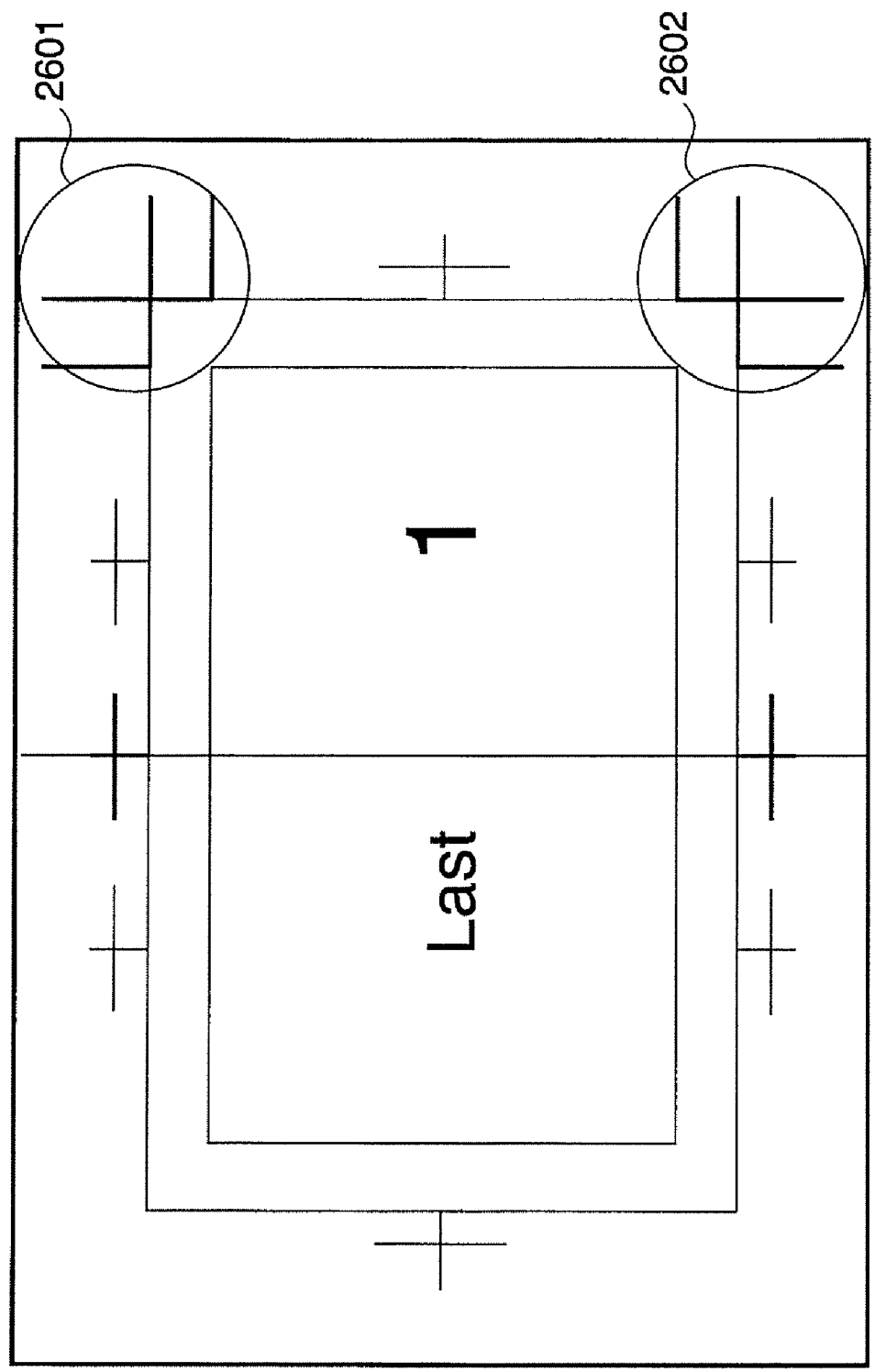
FIG. 26 depicts an example of printing the printer's marks on a sheet of printing paper with a saddle stitch book binding imposition, according to the embodiment of the present invention.

FIG. 26 depicts an example of applying the present invention to a saddle stitch book binding printing. FIG. 26 depicts an imposition result when configuring for a saddle stitch book binding printing that opens and is read from right to left. With the saddle stitch book binding printing, the sheet of printing paper is collectively folded in two and collectively trimmed, using the printer's marks on the first sheet of printer paper as the guide. In such a circumstance, the operator prints the printer's marks 2601 and 2602 in only the trimming position on what will be the first page, as the trimming will be accomplished if the printer's marks are printed only in the position on the first page. With the saddle stitch book binding printing, the operator may also print the printer's marks on a last page, without printing the printer's marks on the first page, as the trimming will be accomplished if the printer's marks are printed on the last page. That is to say, with an imposition method that does involve the fold processing, it is permissible to add the printer's marks to a page that is a leading page after the fold processing, i.e., the first page or the last page.

FIG. 27 depicts an example of applying the present invention to a quarto book binding imposition. Whereas a first sheet of printing paper 2701 has the first page through the eighth page printed thereupon, the only printer's marks that are printed thereupon are an upper left-hand corner printer's mark 2703 and a center left horizontal trim printer's mark 2704, that contact the first page. Given that the trim printer's marks appear only on the periphery of the first page of the sheet of printing paper 2701, no printer's marks will be left on the other pages of the sheet of printing paper, if the printer's marks are used as a guide for trimming. The same holds true for a second sheet of printing paper 2702 or further, with the trim printer's marks being printed only on the first page.

Figure 28A:
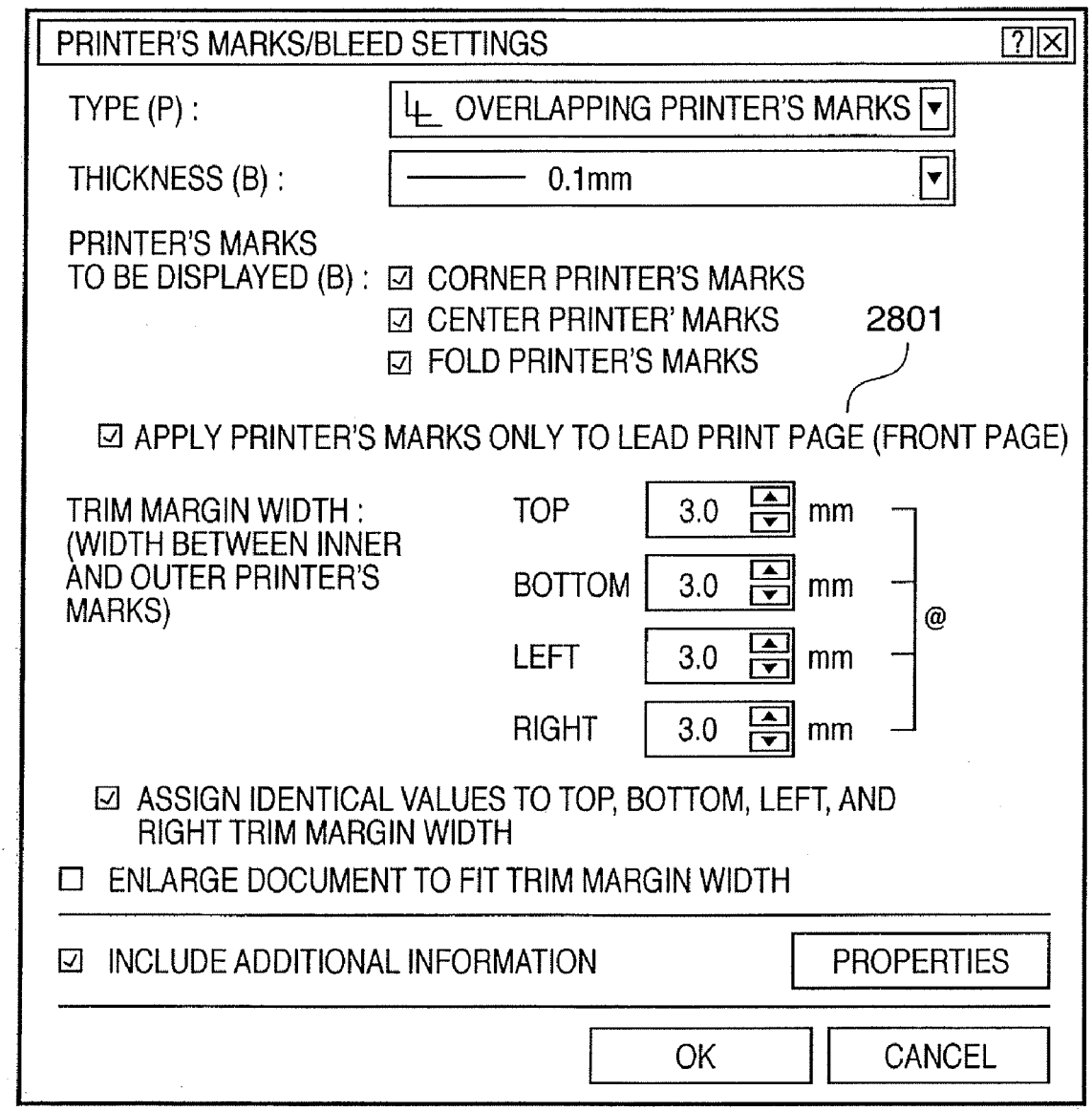

FIG. 28A and FIG. 28B depict examples of a graphical user interface (GUI) for configuring the printer's marks according to the embodiment. FIG. 28A depicts an example of a graphical user interface with a leaflet imposition, and FIG. 28B depicts an example of a graphical user interface when an imposition method is selected that requires folding the printing paper, such as a saddle stitch or a quarto. While there exist differences corresponding to a given imposition, which may include double-sided bleed terminology being "up, down, left, right" and "top, bottom, small edge", it is possible to set the setting to be practically identical.

It is possible to use a checkbox control 2801, which is near a center of a dialog box in FIG. 28A, to configure whether or not to apply the printer's marks only to the topmost sheet of printing paper, i.e., the front page. If the control 2801 is checked, the printer's marks will be printed only on the first sheet of printing paper, and the printer's marks will not be printed on the other sheets of printing paper, as per FIG. 25.

It is possible to use a checkbox control 2802, which is near a center of a dialog box in FIG. 28B, to configure whether or not to apply the corner printer's marks only to the first page of the fold. If the control 2802 is checked, the printer's marks will be printed only on the first page of the sheet of printing paper, and the printer's marks will not be printed on the other page, as per FIG. 26 or FIG. 27.

If the box is unchecked, it is possible to apply the printer's marks in all positions, as per convention.

Further problems arise when applying the printer's marks only to the lead page. The purpose of FIG. 29 is to describe the problems. FIG. 29 depicts a four-page imposition of a four-page document, from which 1000 copies are presumed to be printed. With a four-page print, it is possible to obtain a finishing of 4000 copies, as 4000 pages are printed and trimmed.

In the present circumstance, presuming that a trimming machine that is used in the trimming step of the print post-processing has a maximum count of printing paper to be trimmed of 1000 sheets, then it is impossible to trim 4000 sheets at one time. Hence, the 4000 sheets are trimmed in four batches of 1000 sheets apiece. According to the embodiment, however, the printer's marks are only printed on the first sheet of printing paper, making it impossible to trim a $1001^{st}$ or later sheet of printing paper. Facilitating trimming according to the embodiment demands that the user manually sort the 1000 copies into four batches of 250 copies, i.e., four batches of 1000 pages, apiece, when printing, and an error may occur in the course of manual handling.

Figure 30:
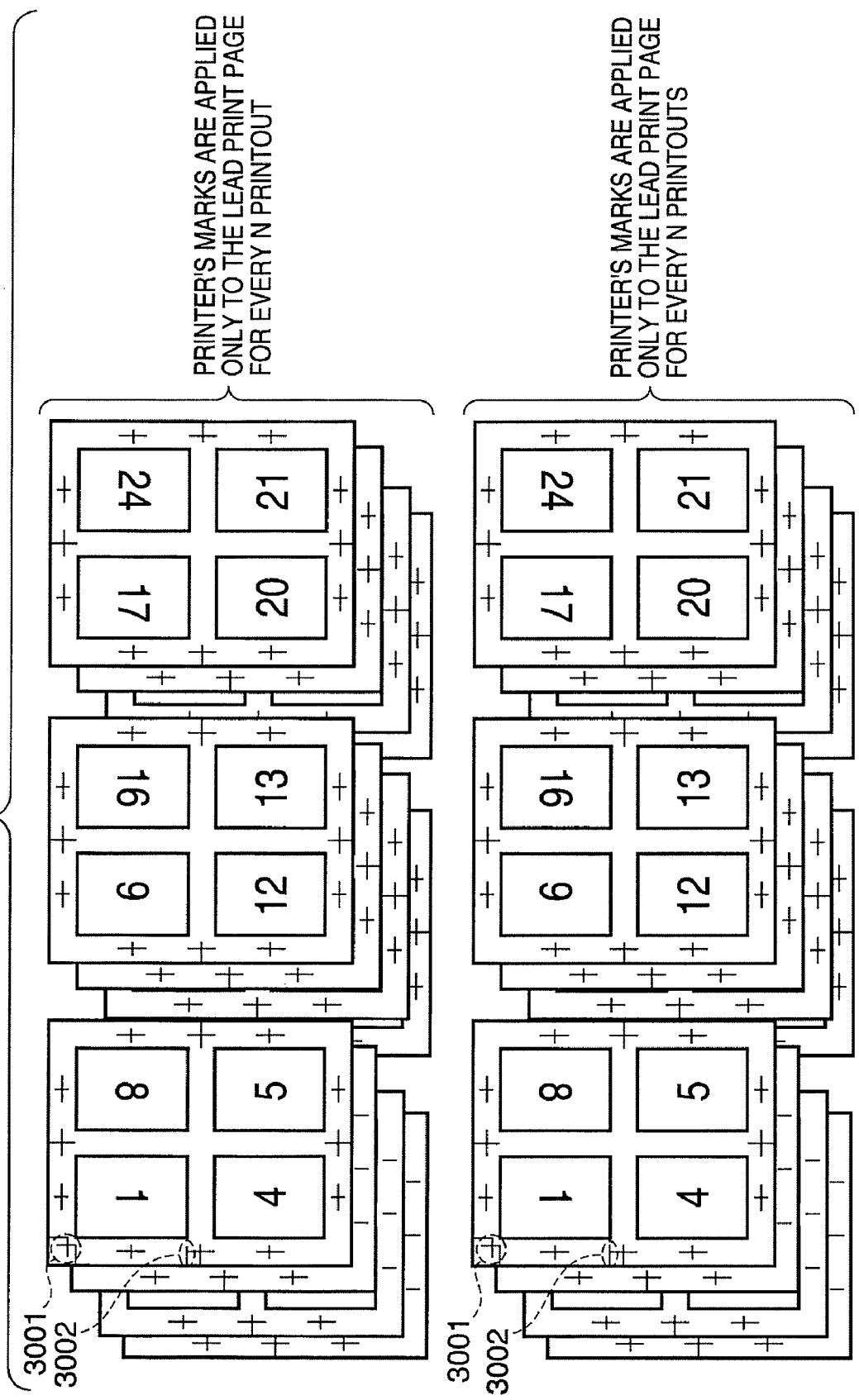
FIG. 30 depicts an example of printing the printer's marks on every nth printout, according to the embodiment of the present invention.

FIG. 30 depicts an embodiment of the present invention that deals with the problems. It is possible to deal with a restriction of the post-processing by repeatedly printing the printer's marks every nth copy, where n is a pre-configured value. Given that merely repeatedly printing the printer's marks will require a labor of searching through the 4000 printed sheets for the four sheets upon which the printer's marks have been painted, it is more effective to link the setting of the printing of the printer's marks every nth copy to the partitioning setting.

FIG. 31 depicts an example of a graphical user interface (GUI) for a setting for such a circumstance. In FIG. 31 is a print dialog box 3100 with an option 3101 for shifting to discharge printouts every n copies. Shifting a discharge position every n copies simplifies the sorting thereof. Matching the shift setting with a cycle of the printing of the printer's marks as depicted in FIG. 30 allows ease of identification of a graphical position of the printer's marks. It is permissible to simplify the sorting by discharging a sheet of printing paper between the sheet of printing paper whereupon the printer's marks are printed that facilitates the identification of the sheet of printing paper whereupon the printer's marks are printed. It is possible to use a sheet of paper of a different color from the printing paper that is used for the printing of a document data for such an identifying sheet of printing paper, thus allowing for a clear demarcation of the number of copies. The values of the settings, i.e., what type of printer's marks to apply, whether or not to apply the printer's marks to the lead sheet of printing paper, whether or not to apply the printer's marks to the first fold page, and the cycle at which the printer's marks are printed, are respectively stored in the printer's marks and bleed attribute of the book attribute that is depicted in FIGS. 5A and 5B. The book binding application 104 is capable of outputting the printer's marks imaging command to either a physical page or a logical page as required, in accordance with the content of the setting that is stored in the printer's marks and bleed attribute of the book attribute, when outputting the drawing data to the printer driver 106.

While the printing paper shift and the cycle at which the printer's marks are printed are linked in the user interface in FIG. 31, inverting the procedure, i.e., inputting the cycle at which the printer's marks are printed and causing a shift in accordance with the cycle will not alter the effect of the present invention. It would also be permissible to use an MIS or other system to input a limiting value for post-processing, and treat the limiting value as the cycle, without the user interface possessing a control that configures the cycle.

Following is a description of a process of determining a position for the printing of the printer's marks, according to the embodiment. FIG. 32 is a flowchart depicting an example of a process of determining a position for printing the printer's marks that is executed within the book binding application 104. Step S3201 through step S3205 are repeated for all pages, corresponding to the work of creating the information excepting the printer's marks information, for the job ticket structure depicted in FIG. 12.

In step S3203, the book binding application 104 obtains the document data and performs the imposition processing on each respective page. While a detailed description of the nature of the imposition processing will be omitted, as it is established knowledge, if, for example, the leaflet imposition is selected as the imposition method, the number of the imposition is obtained from the book attribute, the printing paper size area is partitioned according to the number of the imposition so obtained, the finishing size area that is specified in the book attribute is established within each respective partitioned area, and a given page of the document is positioned sequentially in each respective area, as per FIG. 20. If the saddle stitch is selected as the imposition method, two pages' worth of the document data is positioned on a single side of the print paper size. The size of the document data of each respective page is aligned with the finishing size, and the document is positioned side by side, with no bleed in a vicinity of the stitching position, as per FIG. 21. If quarto is selected as the imposition method, four pages' worth of the document data is positioned on a single side of the print paper size. The position and orientation of each respective document page is determined such that the page sequence will be continuous when folded quarto. The size of the document data of each respective page is aligned with the finishing size, and the milling is also established as necessary, as per FIGS. 22A and 22B. The process performs an allocation of the page to be printed to each respective sheet of printing paper, as primarily depicted in FIG. 19 through FIG. 23. While it is described that the imposition processing is performed in step S3202, it is desirable that the requisite drawing data and the printer's marks data for each respective document page be generated by the electronic document de-spooler 105 on a per physical page unit basis, and outputted to the printer driver 106, after the placement position of each respective document page receives a virtual determination and the position of the printer's marks is determined, as described hereinafter.

In step S3203, the book binding application 104 determines whether the checkbox 2801 or the checkbox in the graphical user interface depicted in FIG. 28A or FIG. 28B is checked or not. If not checked, i.e., step S3203 is "NO", the printer's marks graphical position is determined such that the printer's marks are printed for all pages and sheets of printing paper, as per conventional procedure. If checked, on the other hand, i.e., step S3203 is "YES", the book binding application 104 determines in step S3206 whether or not a page that is currently being processed is the lead page, i.e., the first page.

If the leaflet imposition is selected, it is possible to make the determination in step 3206 based on whether or not the page contains the lead page. If the saddle stitch imposition is selected, it is possible to make the determination based on whether or not the page has the lead page and the last page imposed thereupon. If the quarto imposition is selected, it is possible to make the determination based on whether or not the page has the first, eighth, fourth, and fifth pages imposed thereupon. In such manner, it is possible to make the determination based on a determination method that accords with the imposition. It is also possible to simply search the document page information list that is maintained by the physical page information 1204 to determine whether or not there is a page data link to the lead page.

If it is determined in step S3206 that the lead page is not present, i.e., step S3206 is "NO", the process proceeds to step S3211, wherein the center printer's marks and the fold printer's marks alone are printed, which do not require that the print position be controlled, and the process proceeds to the next page, per step S3205. If, on the other hand, it is determined that the lead page is present, i.e., step S3206 is "YES", the process proceeds to step S3207, wherein a determination of the imposition printing method is made.

Following is a description of possessing three types of imposition printing method: leaflet, saddle stitch, and fold, i.e., quarto, according to the embodiment. Accordingly, a determination is made in step S3207 as to which of the three printing methods is being used.

If it is determined that the leaflet imposition method is being used, i.e., step S3207 is "LEAFLET", the process proceeds to step S3208, wherein the printer's marks are configured to the physical page information 1204, as per step S3204, as it will be permissible to draw the printer's marks over the page overall.

If it is instead determined that the saddle stitch imposition method is being used, i.e., step S3207 is "SADDLE STITCH", the process proceeds to step S3209, wherein the process of determining the position of the printer's marks on the first page of the saddle stitch, as described hereinafter, is carried out, and the printer's marks information so determined is configured to the physical page information 1204.

In like fashion, if it is instead determined that the fold imposition method is being used, i.e., step S3207 is "FOLD", the process proceeds to step S3210, wherein the process of determining the position of the printer's marks on the first page of the fold is carried out, and the printer's marks information so determined is configured to the physical page information 1204.

Thus, which document page is positioned, and the printer's marks are described as necessary, in each respective physical page information, prior to the generation of the drawing data, while the electronic document de-spooler 105 performs the output of the drawing data to the printer driver 106, according to each respective physical page information. Hence, it is only necessary for the printer driver 106 to generate the print data according to the drawing data.

Following is a detailed description, with reference to FIG. 33A, of the unit within the saddle stitch printer's marks process in FIG. 32, step S3209 that handles the process of determining the position of the printer's marks.

In step S3301, the book binding application 104 determines whether or not the document is a left-right opening, or a top-bottom opening. If it is determined that the document opens from left to right, i.e., step S3301 is "YES", the process proceeds to step S3302, and if it is determined that the document opens from top to bottom, i.e., step S3301 is "NO", the process proceeds to step S3305. In step S3302, the document page information 1205 for the first page is checked, and a determination is made as to whether the first page is positioned on either the right-hand side or the left-hand side of the printing paper. If it is determined that the first page is positioned on the right-hand side, i.e., step S3302 is "YES", the process proceeds to step S3303. If, on the other hand, it is determined that the first page is positioned on the left-hand side, i.e., step S3302 is "NO", the process proceeds to step S3304.

Figure 33B:
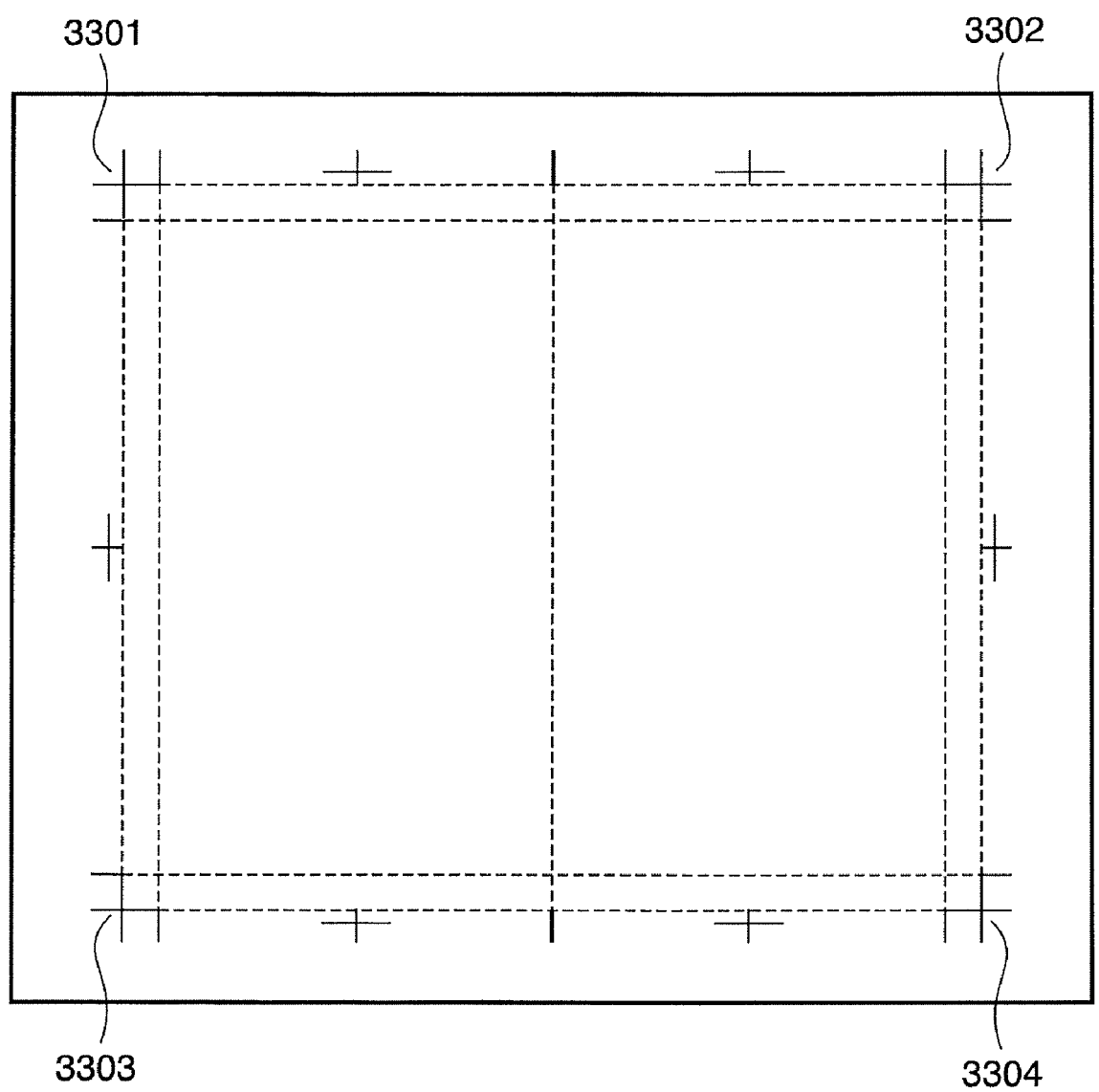
FIG. 33B depicts an example of a position of the printer's marks for trimming with a left-right opening, as a supplement to the flowchart shown in FIG. 33A.

FIG. 33B depicts an example of a position of the printer's marks for trimming with a left-right opening, in which the corner printer's marks are typically positioned at the upper left-hand, upper right-hand, lower left-hand, and lower right-hand corners of the outer perimeter of the document layout.

The corner printer's marks 3301 and 3303 are positioned at the upper left-hand and lower left-hand corners, abutting the left-hand page, while the corner printer's marks 3302 and 3304 are positioned at the upper right-hand and lower right-hand corners, abutting the right-hand page.

If it is determined in step S3302 that the first page is positioned on the right-hand side, i.e., step S3302 is "YES", the process proceeds to step S3303, wherein it is determined that the upper right-hand and lower right-hand corners of the first page are the drawing position of the trim printer's marks that are positioned at Nos. 3302 and 3304, i.e., the corner printer's marks, and that the upper left-hand and lower left-hand trim printer's marks 3301 and 3303 are not determined to be the drawing position. If, on the other hand, it is determined that the first page is positioned on the left-hand side, i.e., step S3302 is "NO", the process proceeds to step S3304, wherein only the upper left-hand and lower left-hand trim printer's marks, that is, the corner printer's marks 3301 and 3303 are targeted for drawing.

If it is determined in step S3301 that the document opens from top to bottom, the process proceeds to step S3305, wherein a determination is made as to whether the first page is positioned on either the top side or the bottom side of the printing paper.

Figure 33C:
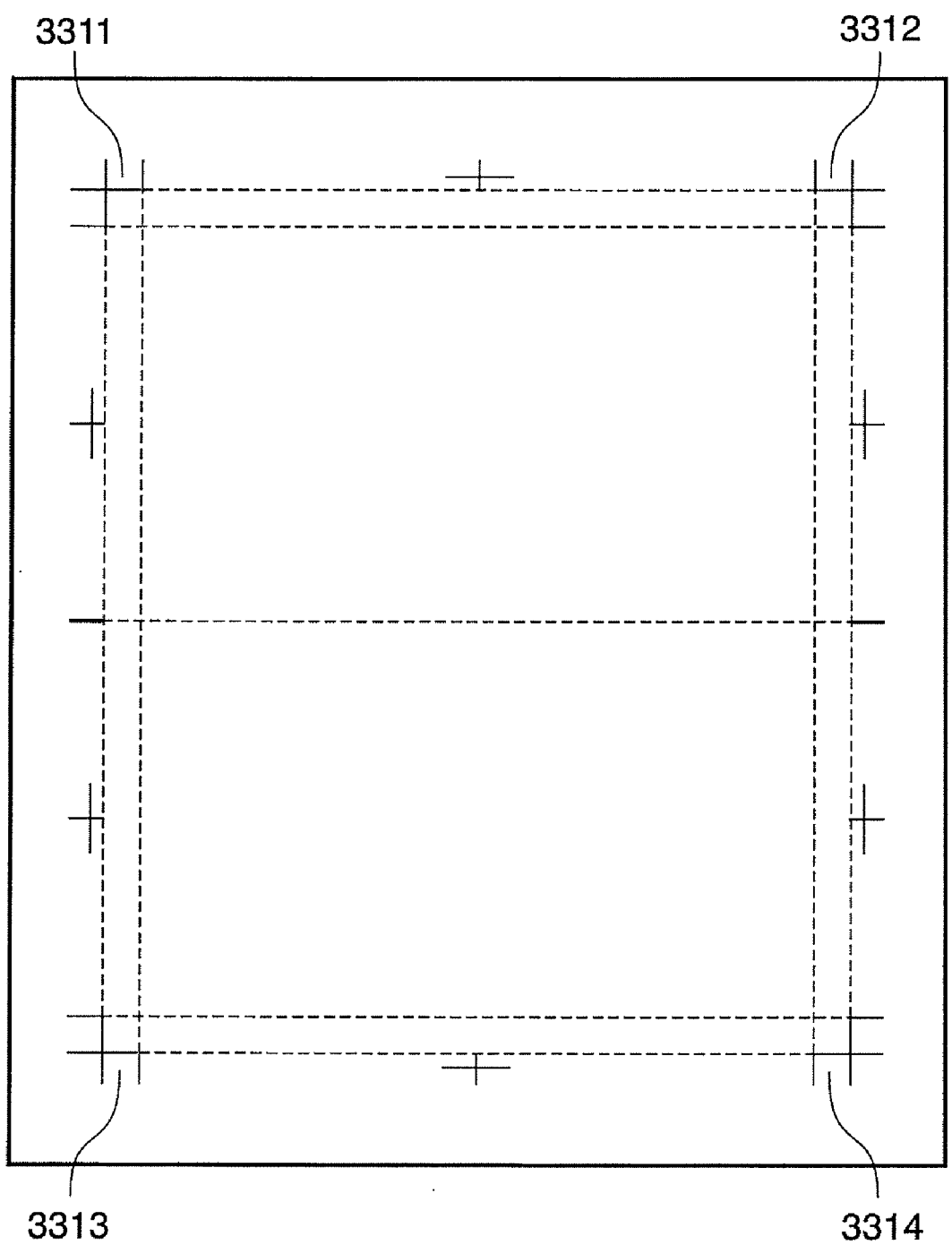
FIG. 33C depicts an example of a position of the printer's marks for trimming with a top-bottom opening, as a supplement to the flowchart shown in FIG. 33A.

FIG. 33C depicts an example of a position of the printer's marks for trimming with a top-bottom opening, in which the corner printer's marks are typically positioned at the upper left-hand, upper right-hand, lower left-hand, and lower right-hand corners of the outer perimeter of the document layout. The corner printer's marks 3301 and 3302 are positioned at the upper left-hand and upper right-hand corners, abutting the upper page, while the corner printer's marks 3303 and 3304 are positioned at the lower left-hand and lower right-hand corners, abutting the lower page.

If it is determined in step S3305 that the first page is positioned on the upper side, i.e., step S3305 is "YES", the process proceeds to step S3306, wherein it is determined that the upper left-hand and upper right-hand corners of the first page are the drawing position of the trim printer's marks that are positioned at Nos. 3301 and 3302, i.e., the corner printer's marks, and that the lower left-hand and lower right-hand trim printer's marks 3303 and 3304 are not determined to be the drawing position. If, on the other hand, it is determined that the first page is positioned on the lower side, i.e., step S3305 is "NO", the process proceeds to step S3307, wherein only the lower left-hand and lower right-hand trim printer's marks, that is, the corner printer's marks 3303 and 3304 are targeted for drawing.

While the flowchart describes the technique for determining the corner printer's marks to be drawn, a determination is made for the drawing for the first page based on a similar determination for the fold printer's marks and the center printer's marks. It is possible to use the saddle stitch printer's marks printing in accordance with the printer's marks position so determined.

With the quarto imposition method, it is necessary to perform a different process from the other imposition methods for the printer's marks drawing position. Following is a detailed description, with reference to FIG. 34A, of an overview of the process of determining the position of the printer's marks on only the first page with the quarto imposition method.

The drawing position of the document page varies under the quarto imposition method, depending on the type of post-processing folding involved, and thus, a determination is performed in step S3401 as to the type of fold process that applies. In the present circumstance, the fold type is divided into a head fold, wherein the initial fold position is at the upper end, and a foot fold, wherein the initial fold position is at the lower end. The second fold is the stitching position when performing the book binding. That is to say, with the right edge head fold, the first page is positioned at the lower left-hand portion of the printing paper, as a guideline for the orientation of the first page. With a right edge foot fold, the first page is positioned at the upper left-hand portion of the printing paper, as a guideline for the orientation of the first page. With the left edge head fold, the first page is positioned at the lower right-hand portion of the printing paper, as a guideline for the orientation of the first page. With a left edge foot fold, the first page is positioned at the upper right-hand portion of the printing paper, as a guideline for the orientation of the first page. The position placement is for the first page on the printing paper as the guideline for the orientation of the first page. The book binding application 104 is presumed to impose the first page on the left-hand side of the printing paper, that is, in the area from the upper left-hand to the lower left-hand, according to the embodiment. Consequently, with the left edge head fold, the orientation of the first page is rotated 180 degrees and placed at the upper left-hand of the printing paper, and with the left edge foot fold, the orientation of the first page is rotated 180 degrees and placed at the lower left-hand of the printing paper.

FIG. 34B depicts the positioning of the printer's marks with the quarto imposition. The page position is the left edge head fold. The upper left-hand page, i.e, page 1 in the figure, has, as the trim printer's marks, the upper left-hand corner printer's marks 3401 and the trim printer's marks 3405, that is somewhat above the center left. The two printer's marks are collectively referred to as the upper left-hand printer's marks. In like fashion, the lower left-hand corner printer's marks 3403 and the trim printer's marks 3407, that is somewhat below the center left, that bound the lower left-hand page, are collectively referred to as the lower left-hand printer's marks. The upper right-hand corner printer's marks 3402 and the trim printer's marks 3406, that is somewhat above the center right, that bound the upper right-hand page, are collectively referred to as the upper right-hand printer's marks. And the lower right-hand corner printer's marks 3404 and the trim printer's marks 3408, that is somewhat below the center right, that bound the lower right-hand page, are collectively referred to as the lower right-hand printer's marks.

If the fold method is the left edge head fold, in accordance with the determination made in step S3401, the first page is rotated 180 degrees to the upper left-hand placement, and thus, it is determined in step S3403 that the trim printer's marks drawing placement is to be only the upper left-hand printer's marks. If the fold method is the left edge foot fold, the first page is rotated 180 degrees to the lower left-hand placement, and thus, it is determined in step S3402 that the trim printer's marks drawing placement is to be only the lower left-hand printer's marks. If the fold method is the right edge head fold, the first page has the upper left-hand placement without an accompanying rotation process, and thus, it is determined in step S3404 that the trim printer's marks drawing placement is to be only the upper left-hand printer's marks. If the fold method is the right edge foot fold, the first page has the lower left-hand placement without an accompanying rotation process, and thus, it is determined in step S3405 that the trim printer's marks drawing placement is to be only the lower left-hand printer's marks.

Given that the exact same imposition results from rotating the sheet of printing paper 180 degrees, a circumstance may arise in which the first page is positioned at the lower right-hand, even if the fold method is the left edge head fold. The example depicted in the flowchart presumes that the pre-print processing imposition layout method is a layout protocol such that the first page is placed at the left side of the sheet of printing paper.

If the presumption is not used, it is possible to use a method that checks the document page information 1205 of the first page and inverts the top and bottom in the imposition, i.e., a method that comprehends that the first page is being imposed in the upper part of the sheet of printing paper, or a method that compares the four document page information that share a given sheet of printing paper to determine which page is in which position.

Figure 34A:
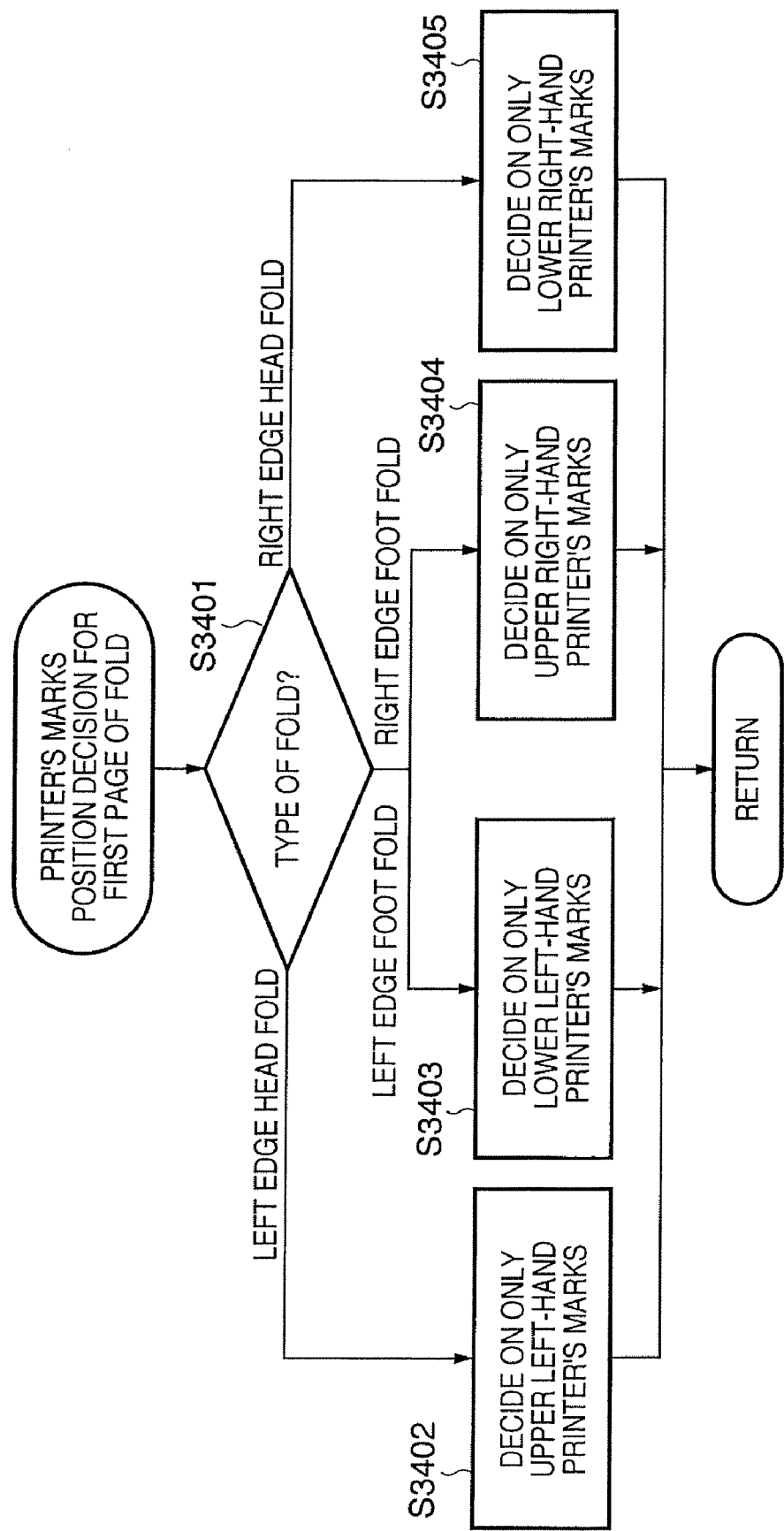
FIG. 34A is a flowchart depicting an example of a process of determining a position of printing the printer's marks for a folded first page, in step S3210 of FIG. 32.

While the process flow depicted in FIG. 34A determines, based on the imposition information, the position in which the first page is placed, it would also be permissible to use an embodiment that determines the position in which the first page is placed by checking an imposition coordinates.

Following is a description of a process when determining the position of the first page from the coordinates, with reference to FIG. 35. The process of determining the position of the first page from the coordinates determines the placement on the paper as the guideline of the orientation of the first page, and thus, the first page will not be rotated 180 degrees.

In step S3501, the coordinates of each of four respective pages on a given sheet of printing paper are extracted from the document page information 1205 and compared. It is presumed that in the coordinate scheme, the lower left-hand corner is the origin (0, 0), and the positive values continue from the origin to the lower right-hand corner. In such a circumstance, an upper left-hand coordinates that position the first page are designated as (x1, y1). The upper left-hand coordinates that position the fourth page are designated as (x4, y4). The upper left-hand coordinates that position the fifth page are designated as (x5, y5), and the upper left-hand coordinates that position the first page are designated as (x8, y8). If a result of a calculation 3x1−x4−x5−x8 is positive, the first page will be positioned on the right-hand side of the sheet of printing paper, and the first page will be positioned on the left-hand side of the sheet of printing paper if the result is negative. If the result of the calculation 3y1−y4−y5−y8 is positive, the first page will be positioned on the upper side of the sheet of printing paper, and the first page will be positioned on the lower side of the sheet of printing paper if the result is negative.

In step S3502, the book binding application 104 determines which position on the sheet of printing paper the first page takes, based on the positive or negative result of the calculation.

If the first page is in the upper left, the position of the printer's marks will be the upper left-hand printer's marks, per step S3503. If the first page is in the lower left, the position of the printer's marks will be the lower left-hand printer's marks, per step S3504. If the first page is in the upper right, the position of the printer's marks will be the upper right-hand printer's marks, per step S3505. And if the first page is in the lower right, the position of the printer's marks will be the lower right-hand printer's marks, per step S3506.

It would also be permissible to apply a variety of variations to the coordinate determination method for the determination that is performed in step S3501, rather than the positive or negative of the formula-based calculation result, which may include a method that determines one of the upper left, lower left, upper right, or lower right from the relation between the central coordinates of the sheet of printing paper and the position of the first page.

The process described with reference to FIG. 32 draws only the printer's marks for the first page. In fact, an instance may occur wherein a quantity of printouts are printed that exceeds the capacity of the trimming machine, and consequently, it may not be possible to trim a quantity of copies that exceeds the capacity, using the process that only prints one printer's marks for one job. Following is an example of an embodiment that prints the printer's marks at a cycle that fits within the trim range.

Figure 36:
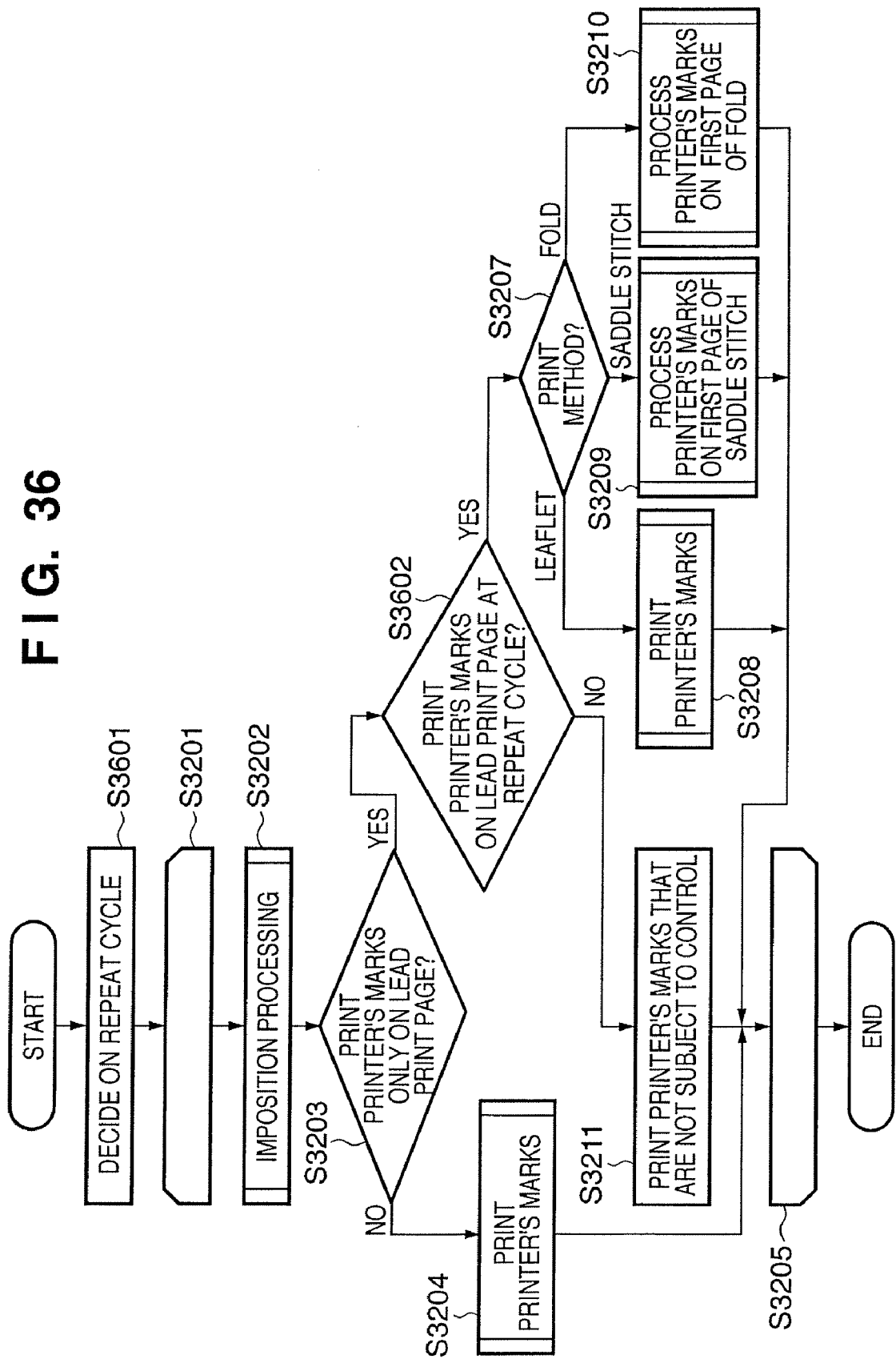
FIG. 36 is a flowchart describing a conceptual process when printing the printer's marks periodically, according to the embodiment of the present invention.

FIG. 36 is a flowchart describing a conceptual process when printing the printer's marks periodically. A step in the figure that is bounded by a bold line depicts a variance between itself and a step in FIG. 32. The process step that the flowchart has in common with FIG. 32 is designated with an identical reference number, and the description is omitted.

First, a repeat cycle is determined in step S3601. According to the embodiment that matches the shift function and the repeat cycle, as described in FIG. 31, the control 3101 specification that configures the shift unit is itself the repeat cycle. For example, if the shift unit 3101 is configured to 100 copies, the repeat cycle is configured to 100 copies. The process from step S3201 to step S3205 is repeated for all copies, as per FIG. 32.

In step S3204, a determination is made as to whether or not the setting to print the printer's marks on the lead sheet is set, and if the setting is set, i.e., step S3204 is "YES", the process proceeds to step S3602, wherein a determination is made as to whether or not the currently processed sheet of printing paper is the lead sheet of printing paper that was configured in step S3601. If performing double-sided printing, even the lead sheet of printing paper of the cycle has two sides, a front side and a reverse side, and thus, a determination is also performed as to whether or not the side of the lead sheet of printing paper is the front side.

If it is determined in step S3602 that printing the printer's marks is unnecessary, i.e., step S3602 is "NO", then only the printer's marks that are not targeted for control, which may include the fold printer's marks, are printed in step S3211. If, on the other hand, it is determined that the printer's marks should be printed, i.e., step S3602 is "YES", the process proceeds to step S3207.

The printer's marks are printed in the portion wherein they are placed in the outermost area of the printout, thus providing a guide for the post-processing, and it is therefore permissible to have a state in which the printer's marks are printed on the last page, rather than the lead page, according to the embodiment.

Figure 37:
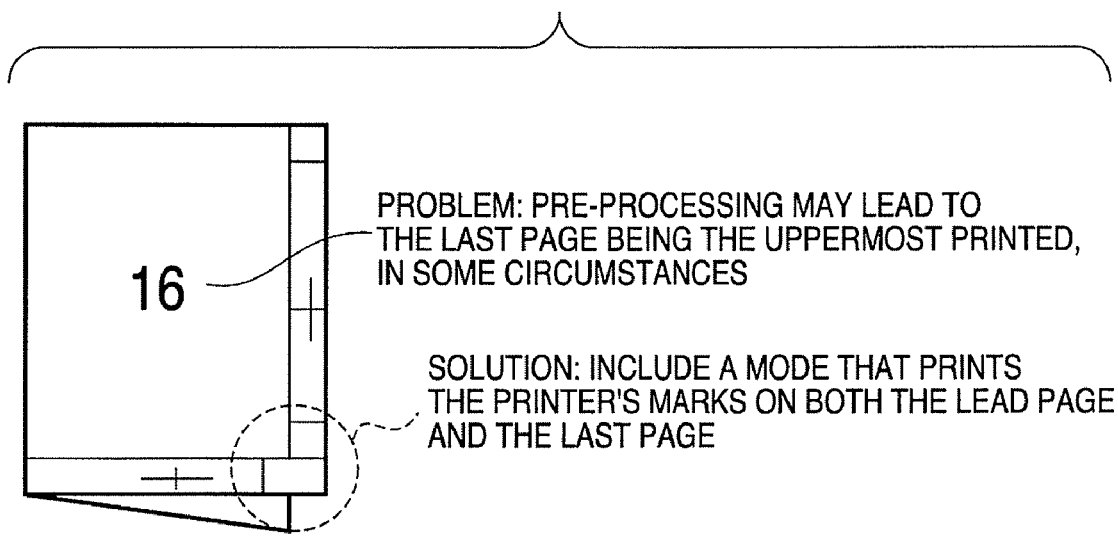
FIG. 37 depicts another example of an output result when printing the printer's marks, according to the embodiment of the present invention.

FIG. 37 depicts an output example when applying a process that prints the printer's marks on the last page of a 16-page data with the quarto book binding imposition. The figure depicts a state wherein two sheets are folded such that they overlap. The printer's marks are printed in a position 16 on the last page, and the printer's marks are not printed in another portion. In such a circumstance, the determination made in FIG. 32, step S3206, would be whether or not the page contains the last page, rather than whether or not the page is the first page. A circumstance may also occur with the saddle stitch book binding or the quarto, wherein no quadruple document is present, and thus, a whitespace may result in the position where the last page ought to be. Hence, the determination criterion should be whether or not the page is the last page in the imposition, rather than whether or not the printing of the printer's marks on the last page of the document is necessary. The determination in step S3602 will, in turn, be whether or not the page is the last page of the cycle, rather than whether or not the sheet of printing paper is the lead sheet of printing paper.

It is also necessary to change the process from step S3208 through step S3210 to a process that determines the position of the last page, rather than the first, and draws the printer's marks thereupon. In such a circumstance, the last page will still not be printed in the outermost area, with the saddle stitch book binding or the quarto, wherein no quadruple document is present. Accordingly, it is necessary to change to a process that draws the printer's marks in the position wherein a virtual last page is printed, when it is presumed that a printout will be in exact multiples of four.

It is permissible to make an interchange in the flowchart according to the embodiment, provided that the processes before and after are not left unfinished.

It is possible to control the printing of the trim printer's marks in accordance with the imposition, according to the embodiment. Hence, no undesirable drawing element will remain external to the source manuscript data as a result of the position misalignment in the printing step as well as the post-processing, allowing an obtainment of a high-quality finished product.

Second Embodiment

First Embodiment was an example of controlling only the printing of the trim printer's marks in accordance with the imposition. Second Embodiment is distinguished by including control of the center printer's marks or the fold printer's marks.

Figure 38:
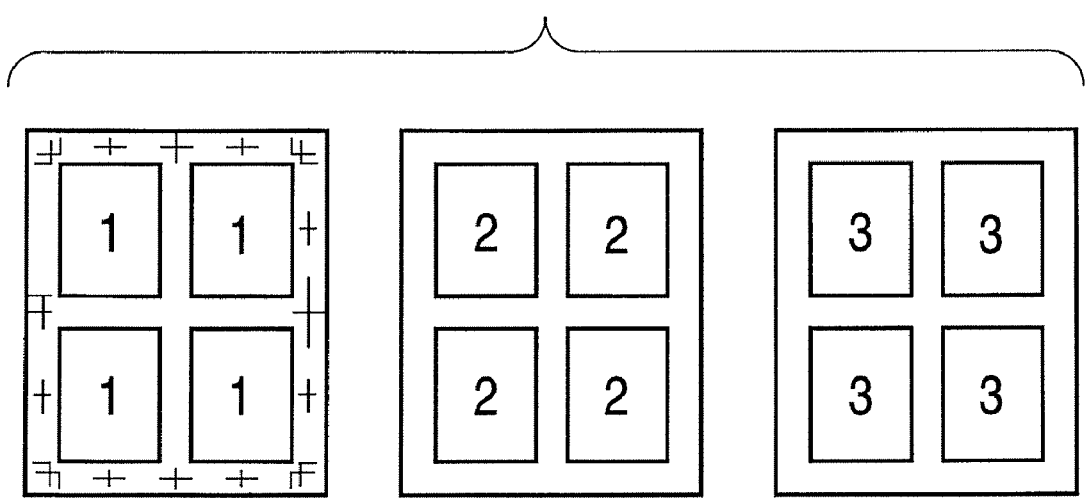
FIG. 38 depicts an example of an output result according to the second embodiment of the present invention.

FIG. 38 is an output example of a leaflet imposition. The corner printer's marks and the center printer's marks are printed only on the printed side of the first page of the lead sheet, and the printer's marks are not printed on any other page.

Figure 39:
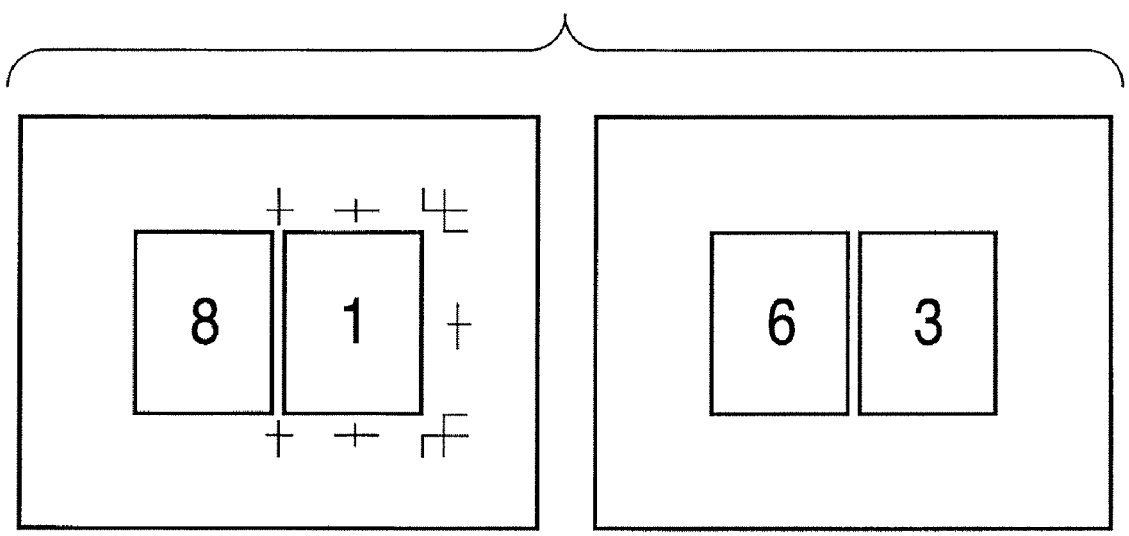
FIG. 39 depicts another example of an output result according to the second embodiment of the present invention.

FIG. 39 is an output example of a saddle stitch book binding. The fold printer's marks, the center printer's marks, and corner printer's marks are printed only on the periphery of the first page of the lead sheet, and there are no printer's marks on the adjoining eighth page. Nor are there any printer's marks printed on the second sheet of printing paper.

Figure 40:
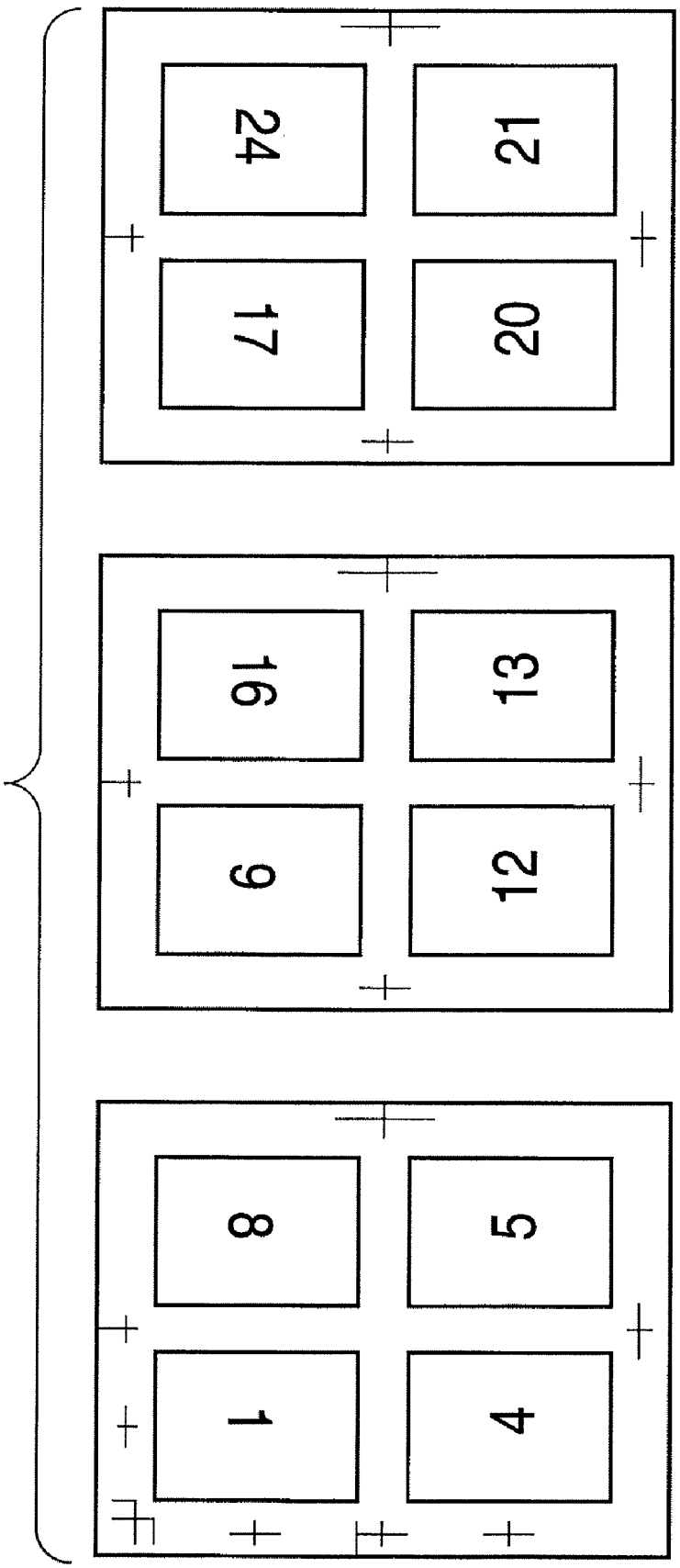
FIG. 40 depicts still another example of an output result according to the second embodiment of the present invention.

FIG. 40 is an output example of a quarto. The corner printer's marks and the center printer's marks are printed only on the periphery of the first page. It is necessary to print the fold printer's marks on all of the sheets of printing paper, because the fold processing is being carried out on a per sheet of printing paper basis.

The foregoing output product may be obtained via a process that is almost identical to the flow that is described in FIG. 32 or FIG. 36 according to first Embodiment, as well as the flow that is relevant thereto.

Figure 41:
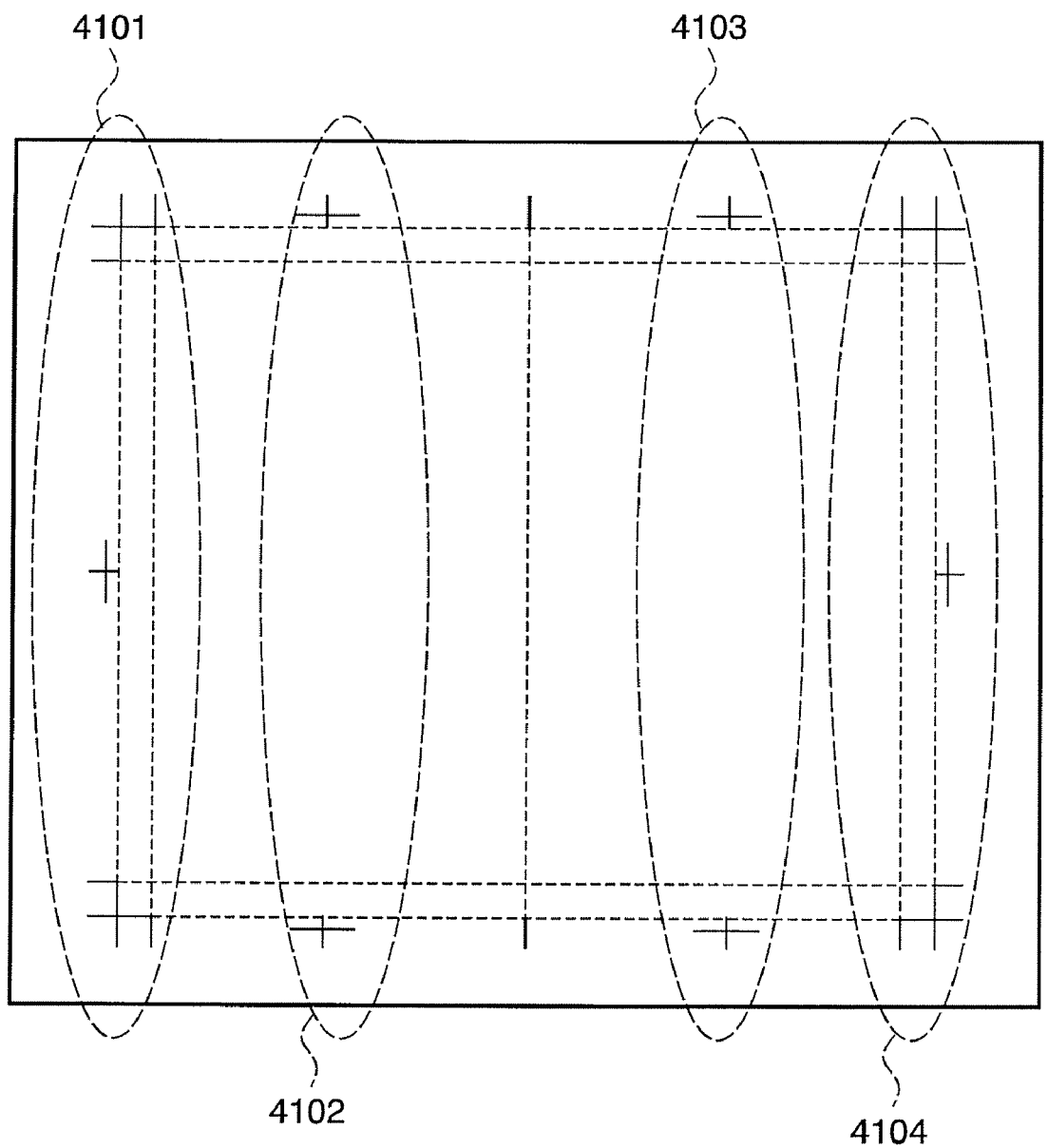
FIG. 41 depicts an example of the printer's marks set intended for control, according to the second embodiment of the present invention.

The process flow depicted in FIG. 33A, however, was intended for the control of each respective corner printer's marks 3301, 3302, 3303, and 3304, as depicted in FIG. 33B, while the target of the control is four groups of the corner printer's marks according to the embodiment, as depicted in FIG. 41. The two corner printer's marks and the center printer's marks that are printed on the left-hand edge are constituted as No. 4101. The two center printer's marks that are printed on the top and the bottom of the left-hand document are constituted as No. 4102. The two center printer's marks that are printed on the top and the bottom of the right-hand document are constituted as No. 4103. And the two corner printer's marks and the center printer's marks that are printed on the right-hand edge are constituted as No. 4104.

Figure 42:
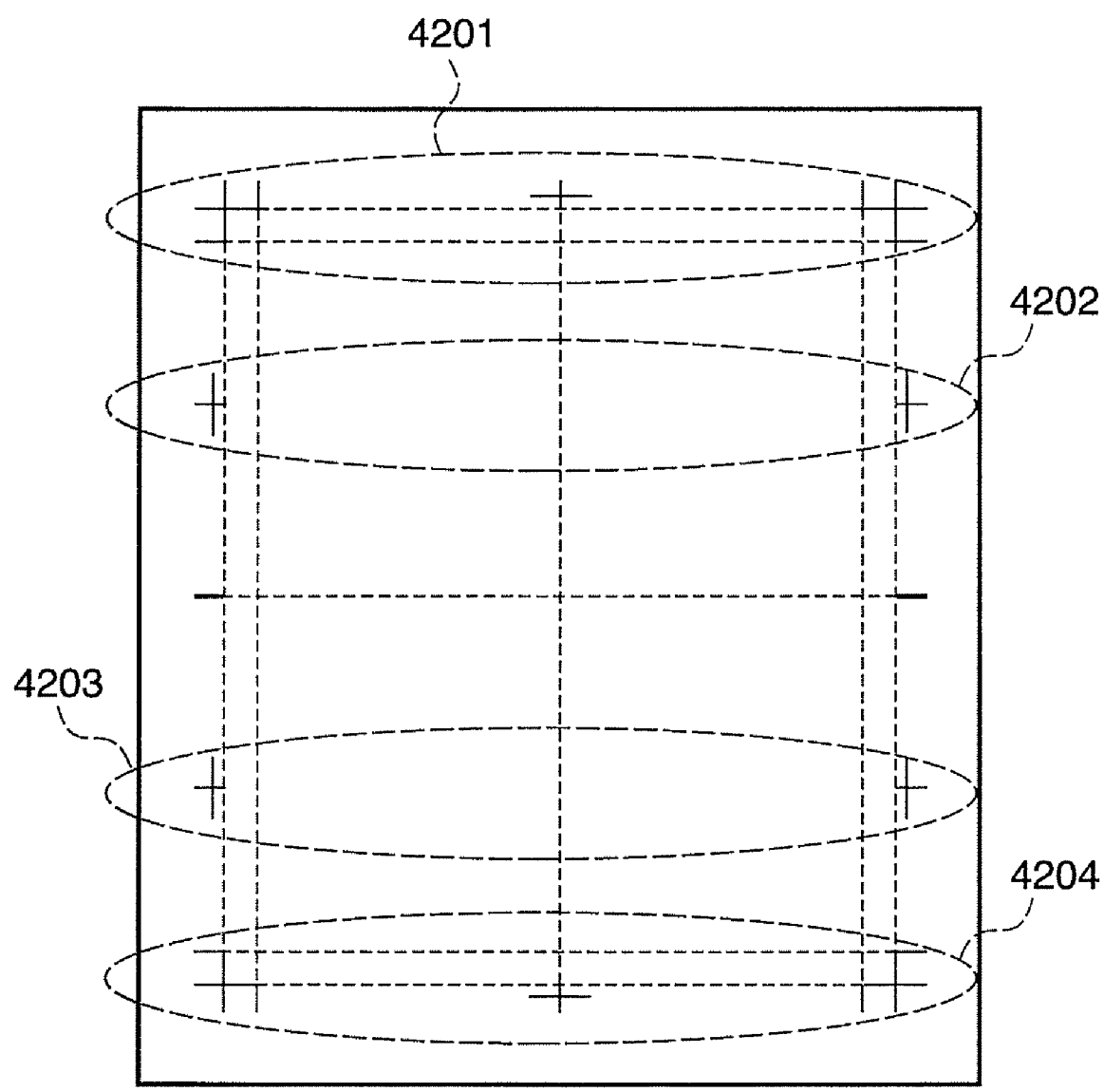
FIG. 42 depicts another example of the printer's marks set intended for control, according to the second embodiment of the present invention.

The respective corner printer's marks 3311, 3312, 3313, and 3314 that are depicted in FIG. 33C are exchanged for the four groups according to the embodiment, as depicted in FIG. 42. The two corner printer's marks and the center printer's marks that are printed on the upper edge are constituted as No. 4201. The two center printer's marks that are printed on the left-hand side and the right-hand side of the upper document are constituted as No. 4202. The two center printer's marks that are printed on the left-hand side and the right-hand side of the lower document are constituted as No. 4203. And the two corner printer's marks and the center printer's marks that are printed on the lower edge are constituted as No. 4204.

The upper left-hand printer's marks, the upper right-hand printer's marks, the lower left-hand printer's marks, and the lower right-hand printer's marks that are depicted in FIG. 34B and the process flow in FIG. 34A are constituted as follows, according to the embodiment.

Figure 43:
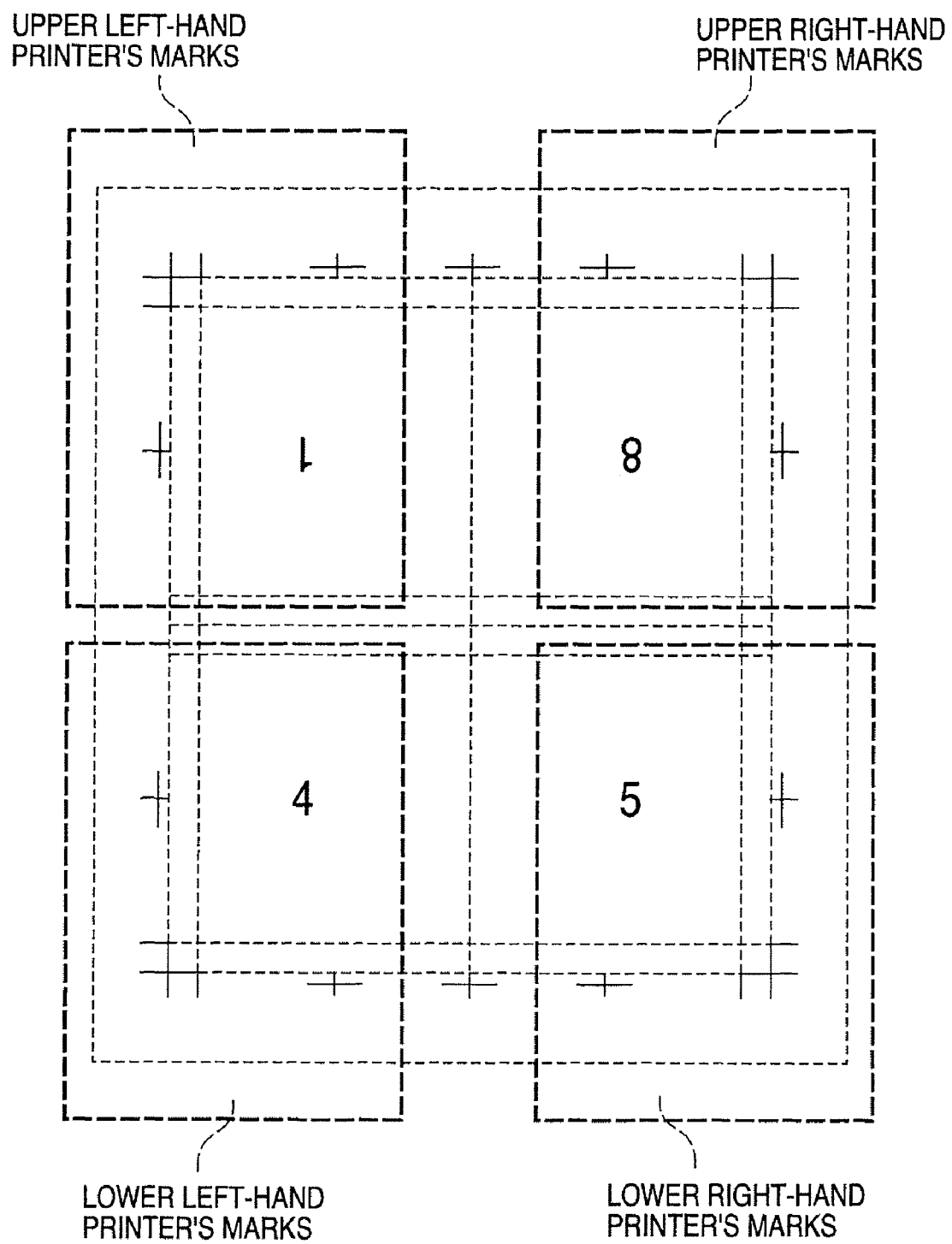
FIG. 43 depicts still another example of the printer's marks set intended for control, according to the second embodiment of the present invention.

As depicted in FIG. 43, the upper left-hand printer's marks are constituted of the upper left-hand corner printer's marks, the two center printer's marks that contact the upper left-hand of the document, which is the page one in the figure, and the trim printer's marks that is somewhat above the center left of the document. The upper right-hand printer's marks are constituted of the upper right-hand corner printer's marks, the two center printer's marks that contact the upper right-hand of the document, which is the page eight the in the figure, and the trim printer's marks that is somewhat above the center right of the document. The lower left-hand printer's marks are constituted of the lower left-hand corner printer's marks, the two center printer's marks that contact the lower left-hand of the document, which is the page four the in the figure, and the trim printer's marks that is somewhat below the center left of the document. And the lower right-hand printer's marks are constituted of the lower right-hand corner printer's marks, the two center printer's marks that contact the lower right-hand of the document, which is the page five the in the figure, and the trim printer's marks that is somewhat below the center right of the document.

Thus, it is possible to control the printing of the center printer's marks and the fold printer's marks, in addition to the trim printer's marks, and print only the printer's marks that are required, according to the embodiment.

Other Embodiments

It is permissible to apply the present invention to a system that is constituted of a plurality of devices, which may include a host computer, an interface device, a reader, or a printer, for example, and it is also permissible to apply the present invention to an apparatus that is constituted of a single device, which may include a copier, a printer, or a fax machine.

The objective of the present invention is also achieved by a computer, a CPU, or an MPU, in a system or an apparatus reading and executing a program code of a software that fulfills the function of the embodiment from a storage device upon which is stored the program code. In such a circumstance, the program code itself that is read out from the storage medium fulfills the function of the embodiment, and the storage medium upon which is stored the program code constitutes the present invention.

An example of a storage medium for providing the program code may include a floppy disk, a hard drive, an optical disk, a magneto-optical disk, a CD-ROM, a CD-R, a magnetic tape, a nonvolatile memory card, or a ROM.

Also included is a circumstance in which the operating system or other software running on the computer performs all or part of the actual process, which, in turn, fulfills the function of the embodiment, in addition to fulfilling the function of the embodiment by the computer executing the read out program code.

Also included is a circumstance in which the program code is read out from the storage medium and written to a memory that is built into either an expansion board that is inserted into the computer or an expansion unit that connected to the computer, the CPU or other device that is built into either the expansion board or the expansion unit performs the actual process in whole or in part, and the function of the embodiment is fulfilled by the process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100392, filed Mar. 31, 2006, which is hereby incorporated by reference herein in its entirety.

What is claimed is:

1. A print data generation apparatus, comprising:
   an acceptance unit adapted to accepting a setting as to whether or not to perform a position control of a trimming mark for a document data to be printed;
   a determination unit adapted to determining a type of imposition setting of the document data to be printed;
   a decision unit adapted to deciding a position of the trimming mark for a sheet of printing paper upon which is placed the document data to be printed, in accordance with a determination result from the determination unit, when accepting the setting to perform the position control;
   a first generation unit adapted to generating a drawing data that represents the trimming mark in order to generate a print data according to the position of the trimming mark that is decided by the decision unit; and
   a second generation unit adapted to generating the print data from the document data and the drawing data,
   wherein the first generation unit generates the drawing data that represents the trimming mark such that the trimming mark is added to a front sheet of printing paper of a batch of sheets of printing paper and the trimming mark isn't added to other sheets of the printing paper.

2. The print data generation apparatus according to claim 1, wherein the imposition setting is a fold, and the decision unit decides the position of the trimming mark in an area that becomes a front page when trimming, after a fold process.

3. The print data generation apparatus according to claim 1, wherein the decision unit decides the position of the trimming mark for the front page or a last page of the document data, that is the front page in the trimming after the fold process, when the determination unit determines that the imposition setting is to be a saddle stitch.

4. The print data generation apparatus according to claim 1, wherein the decision unit decides the position of the trimming mark for a page that possess a number of a page of the document data that is the front page in the trimming after the fold process except for a page that does not possess the number of the page of the document data that is the front page in the trimming after the fold process, when the determination unit determines that the imposition setting is to be a fold.

5. The print data generation apparatus according to claim 1, wherein the decision unit decides the position of the trimming mark for all pages of the document data that are positioned on a front sheet of a printing paper of a batch of printing paper that are trimmed, when the determination unit determines that the imposition setting is to be a leaflet.

6. The print data generation apparatus according to claim 1, wherein the front sheet of the printing paper is a sheet of the printing paper that is positioned at an uppermost page when trimming a finished product in the trim process that is printed from the print data.

7. The print data generation apparatus according to claim 1, further comprising:
   a setting unit adapted to accepting a print cycle setting,
   wherein the decision unit decides the position of the trimming mark on a sheet of a printing paper that is positioned as a front page of the print cycle; and
   the second generation unit generates a print data that includes the trimming mark on the sheet of the printing paper that is positioned as the front page of the print cycle, according to the position so decided.

8. The print data generation apparatus according to claim 7, wherein the second generation unit generates a print data that includes a placement position change command that instructs a change of a discharge position of the sheet of the printing paper that is positioned as the front page of the print cycle.

9. The print data generation apparatus according to claim 1, wherein the trimming mark includes at least a first mark that signifies a trimming position between pages of the document data to be printed, or a second mark that signifies a trimming position for a corner of the page.

10. The print data generation apparatus according to claim 1,
    wherein the decision unit decides the position of the trimming mark, including a third mark that signifies a central position of a page and a fourth mark that signifies a fold position of a sheet of printing paper; and
    the second generation unit generates the print data, including the third mark and the fourth mark on only the sheet of printing paper that includes the trimming mark.

11. The print data generation apparatus according to claim 1,
    wherein the decision unit decides the position of the trimming mark for all sheets of printing paper corresponding to all pages of the document data to be printed, when the acceptance unit accepts a setting not to perform the position control; and
    the second generation unit generates the print data that includes the trimming mark for all sheets of printing paper, according to the position of the trimming mark so decided.

12. A method for controlling a print data generation apparatus, comprising the steps of:
    accepting a setting as to whether or not to perform a position control of a trimming mark for a document data to be printed;
    determining a type of imposition setting of the document data to be printed;
    deciding a position of the trimming mark for a sheet of printing paper upon which is placed the document data to be printed, in accordance with a determination result in the determination step, when accepting the setting to perform the position control;
    first generating a drawing data that represents the trimming mark in order to generate a print data according to the position of the trimming mark that is decided in the decision step; and
    second generating the print data from the document data and the drawing data,
    wherein the first generation step includes a step of generating the drawing data that represents the trimming mark is generated such that the trimming mark is added to a front sheet of printing paper of a batch of sheets of printing paper and the trimming mark isn't added to other sheets of the printing paper.

13. The method according to claim 12,
wherein the imposition setting is a fold, and the decision step includes a step of deciding the position of the trimming mark in an area that becomes a front page when trimming, after a fold process.

14. The method according to claim 12,
wherein the decision step includes a step of deciding the position of the trimming mark for the front page or a last page of the document data that is the front page in the trimming after the fold process, when it is determined in the determination step that the imposition setting is to be a saddle stitch.

15. The method according to claim 12,
wherein the decision step includes a step of deciding the position of the trimming mark for a page that possess a number of a page of the document data that is the front page in the trimming after the fold process, except for a page that does not possess the number of the page of the document data that is the front page in the trimming after the fold process, when it is determined in the determination step that the imposition setting is to be a fold.

16. The method according to claim 12,
wherein the decision step includes a step of deciding the position of the trimming mark for all pages of the document data that are positioned on a front sheet of a printing paper of a batch of printing paper that are trimmed, when it is determined in the determination step that the imposition setting is to be a leaflet.

17. The method according to claim 12,
wherein the front sheet of the printing paper is a sheet of the printing paper that is positioned at an uppermost page when trimming a finished product in the trim process that is printed from the print data.

18. The method according to claim 12, further comprising the steps of:
accepting a print cycle setting,
wherein the decision step includes a step of deciding the position of the trimming mark on a sheet of a printing paper that is positioned as a front page of the print cycle; and
the second generation step includes a step of generating a print data that includes the trimming mark on the sheet of the printing paper that is positioned as the front page of the print frequency, according to the position so decided.

19. The method according to claim 18,
wherein the second generation step further includes a step of generating a print data that includes a placement position change command that instructs a change of a discharge position of the sheet of the printing paper that is positioned as the front page of the print cycle.

20. The method according to claim 12,
wherein the trimming mark includes at least a first mark that signifies a trimming position between pages of the document data to be printed, or a second mark that signifies a trimming position for a corner of the page.

21. The method according to claim 12,
wherein the decision step includes a step of deciding the position of the trimming mark, including a third mark that signifies a central position of a page and a fourth mark that signifies a fold position of a sheet of printing paper; and the second generation step includes a step of generating the print data, including the third mark and the fourth mark on only the sheet of printing paper that includes the trimming mark.

22. The method according to claim 12,
wherein the decision step includes a step of deciding the position of the trimming mark for all sheets of printing paper corresponding to all pages of the document data to be printed, when a setting not to perform the position control is accepted in the acceptance step; and
the second generation step includes a step of generating the print data that includes the trimming mark for all sheets of printing paper, according to the position of the trimming mark so decided.

23. A computer program, that is stored in a computer-readable storage medium, caused a computer to execute a method for controlling a print data generation apparatus, the method comprising the steps of:
accepting a setting as to whether or not to perform a position control of a trimming mark for a document data to be printed;
determining a type of imposition setting of the document data to be printed;
deciding a position of the trimming mark for a sheet of printing paper upon which is placed the document data to be printed, in accordance with a determination result in the determination step, when accepting the setting to perform the position control;
first generating a drawing data that represents the trimming mark in order to generate a print data according to the position of the trimming mark that is decided in the decision step; and
second generating the print data from the document data and the drawing data,
wherein the first generation step includes a step of generating the drawing data that represents the trimming mark is generated such that the trimming mark is added to a front sheet of printing paper of a batch of sheets of printing paper and the trimming mark isn't added to other sheets of the printing paper.

24. A computer-readable storage medium that stores the computer program which caused a computer to execute a method for controlling a print data generation apparatus, the method comprising the steps of:
accepting a setting as to whether or not to perform a position control of a trimming mark for a document data to be printed;
determining a type of imposition setting of the document data to be printed;
deciding a position of the trimming mark for a sheet of printing paper upon which is placed the document data to be printed, in accordance with a determination result in the determination step, when accepting the setting to perform the position control;
first generating a drawing data that represents the trimming mark in order to generate a print data according to the position of the trimming mark that is decided in the decision step; and
second generating the print data from the document data and the drawing data,
wherein the first generation step includes a step of generating the drawing data that represents the trimming mark is generated such that the trimming mark is added to a front sheet of printing paper of a batch of sheets of printing paper and the trimming mark isn't added to other sheets of the printing paper.

* * * * *